United States Patent
Thomsen et al.

(10) Patent No.: US 12,442,244 B2
(45) Date of Patent: *Oct. 14, 2025

(54) VACUUM INSULATED PANEL SEAL DENSITY

(71) Applicant: LuxWall, Inc., Ypsilanti, MI (US)

(72) Inventors: Scott V. Thomsen, Glen Arbor, MI (US); Jun Huh, Ann Arbor, MI (US)

(73) Assignee: LuxWall, Inc., Ypsilanti, MI (US)

( * ) Notice: Subject to any disclaimer, the term of this patent is extended or adjusted under 35 U.S.C. 154(b) by 179 days.

This patent is subject to a terminal disclaimer.

(21) Appl. No.: 18/376,490

(22) Filed: Oct. 4, 2023

(65) Prior Publication Data

US 2024/0167312 A1 May 23, 2024

Related U.S. Application Data

(60) Provisional application No. 63/540,729, filed on Sep. 27, 2023, provisional application No. 63/427,670,
(Continued)

(51) Int. Cl.
*E06B 3/66* (2006.01)
*B01J 20/02* (2006.01)
(Continued)

(52) U.S. Cl.
CPC ......... *E06B 3/6612* (2013.01); *B01J 20/0211* (2013.01); *B01J 20/0214* (2013.01);
(Continued)

(58) Field of Classification Search
CPC .. C03C 8/22; C03C 8/24; C03C 27/06; C03C 27/08; C03C 27/10; C03C 3/12;
(Continued)

(56) References Cited

U.S. PATENT DOCUMENTS

| 3,433,611 | A | 3/1969 | Saunders et al. |
| 4,040,808 | A | 8/1977 | Kahn et al. |

(Continued)

FOREIGN PATENT DOCUMENTS

| EP | 1 563 952 B1 | 6/2013 |
| WO | WO 2017/019837 A1 | 2/2017 |

(Continued)

OTHER PUBLICATIONS

PCT International Search Report dated Dec. 18, 2023 for PCT/US2023/077868.

(Continued)

*Primary Examiner* — Z. Jim Yang
(74) *Attorney, Agent, or Firm* — Nixon & Vanderhye P.C.

(57) ABSTRACT

A vacuum insulating panel may include: a first substrate; a second substrate; a plurality of spacers provided in a gap between at least the first and second substrates, wherein the gap is at a pressure less than atmospheric pressure; a seal provided between at least the first substrate and the second substrate, the seal comprising a first seal layer; wherein the first seal layer comprises tellurium oxide and vanadium oxide; wherein the first seal layer comprises, on a wt. %, more tellurium oxide than vanadium oxide, and has a density of from about 2.8-4.0 g/cm³.

50 Claims, 34 Drawing Sheets

Related U.S. Application Data filed on Nov. 23, 2022, provisional application No. 63/427,661, filed on Nov. 23, 2022, provisional application No. 63/427,645, filed on Nov. 23, 2022, provisional application No. 63/427,657, filed on Nov. 23, 2022.

(51) Int. Cl.

| | | |
|---|---|---|
| *B23K 26/20* | (2014.01) | |
| *B23K 26/324* | (2014.01) | |
| *C03B 23/24* | (2006.01) | |
| *C03C 3/062* | (2006.01) | |
| *C03C 3/12* | (2006.01) | |
| *C03C 4/00* | (2006.01) | |
| *C03C 8/02* | (2006.01) | |
| *C03C 8/24* | (2006.01) | |
| *C03C 27/06* | (2006.01) | |
| *E06B 3/663* | (2006.01) | |
| *E06B 3/673* | (2006.01) | |
| *F16J 15/06* | (2006.01) | |
| *B23K 26/57* | (2014.01) | |
| *B23K 103/00* | (2006.01) | |
| *E06B 3/677* | (2006.01) | |

(52) U.S. Cl.
CPC ......... *B01J 20/0248* (2013.01); *B23K 26/206* (2013.01); *B23K 26/324* (2013.01); *C03B 23/245* (2013.01); *C03C 3/062* (2013.01); *C03C 3/122* (2013.01); *C03C 4/0071* (2013.01); *C03C 8/02* (2013.01); *C03C 27/06* (2013.01); *E06B 3/66304* (2013.01); *E06B 3/66333* (2013.01); *E06B 3/66342* (2013.01); *E06B 3/673* (2013.01); *E06B 3/67334* (2013.01); *E06B 3/6736* (2013.01); *F16J 15/062* (2013.01); *B23K 26/57* (2015.10); *B23K 2103/52* (2018.08); *B23K 2103/54* (2018.08); *C03C 2204/00* (2013.01); *C03C 2207/00* (2013.01); *E06B 2003/66338* (2013.01); *E06B 3/6775* (2013.01)

(58) Field of Classification Search
CPC . C03C 3/122; C03C 3/062; E06B 3/66; E06B 3/6608; E06B 3/6612; E06B 3/6617; E06B 3/663–66371; E06B 3/67; E06B 3/6715; E06B 3/677; E06B 3/6775; B32B 17/10055; Y02A 30/249; Y02B 80/22
See application file for complete search history.

(56) References Cited

U.S. PATENT DOCUMENTS

| | | | |
|---|---|---|---|
| 4,704,626 A * | 11/1987 | Mahulikar | H01L 23/10 257/729 |
| 5,124,185 A | 6/1992 | Kerr et al. | |
| 5,489,321 A | 2/1996 | Tracy et al. | |
| 5,657,607 A | 8/1997 | Collins | |
| 5,664,395 A | 9/1997 | Collins | |
| 5,935,702 A | 8/1999 | Macquart et al. | |
| 6,042,934 A | 3/2000 | Guiselin et al. | |
| 6,106,798 A | 8/2000 | Kambe et al. | |
| 6,165,632 A * | 12/2000 | Blum | C03C 29/00 429/510 |
| 6,322,881 B1 | 11/2001 | Boire et al. | |
| 6,352,749 B1 | 3/2002 | Aggas | |
| 6,533,632 B1 | 3/2003 | Dynka | |
| 6,558,494 B1 | 5/2003 | Wang et al. | |
| 6,641,689 B1 | 11/2003 | Aggas | |
| 6,946,171 B1 | 9/2005 | Aggas | |
| 7,045,181 B2 | 5/2006 | Yoshizawa et al. | |
| 7,115,308 B2 | 10/2006 | Amari et al. | |
| 7,314,668 B2 | 1/2008 | Lingle et al. | |
| 7,342,716 B2 | 3/2008 | Hartig | |
| 7,407,423 B2 | 8/2008 | Aitken et al. | |
| 7,425,166 B2 | 9/2008 | Burt et al. | |
| 7,560,402 B2 | 7/2009 | Thomsen | |
| 7,632,571 B2 | 12/2009 | Hartig et al. | |
| 7,858,193 B2 | 12/2010 | Ihlo et al. | |
| 7,910,229 B2 | 3/2011 | Medwick et al. | |
| 7,919,157 B2 | 4/2011 | Cooper | |
| 8,490,434 B2 | 7/2013 | Watanabe et al. | |
| 8,500,933 B2 | 8/2013 | Cooper | |
| 8,590,343 B2 | 11/2013 | Wang | |
| 8,821,999 B2 | 9/2014 | Grzybowski et al. | |
| 8,833,105 B2 | 9/2014 | Dennis et al. | |
| 8,951,617 B2 | 2/2015 | Reymond et al. | |
| 9,169,155 B2 | 10/2015 | Dennis et al. | |
| 9,215,760 B2 | 12/2015 | Fischer et al. | |
| 9,290,984 B2 | 3/2016 | Hogan et al. | |
| 9,388,628 B2 | 7/2016 | Petrmichl et al. | |
| 9,428,952 B2 | 8/2016 | Dennis et al. | |
| 9,441,416 B2 | 9/2016 | Veerasamy et al. | |
| 9,458,052 B2 | 10/2016 | Dennis | |
| 9,593,527 B2 | 3/2017 | Hogan et al. | |
| 9,752,375 B2 | 9/2017 | Jones | |
| 9,776,910 B2 | 10/2017 | Dennis | |
| 9,822,580 B2 | 11/2017 | Cooper | |
| 9,908,811 B2 | 3/2018 | Gross et al. | |
| 10,011,525 B2 | 7/2018 | Logunov et al. | |
| 10,017,417 B2 | 7/2018 | Dejneka et al. | |
| 10,077,204 B2 | 9/2018 | Maschmeyer et al. | |
| 10,087,676 B2 | 10/2018 | Dennis | |
| 10,107,028 B2 | 10/2018 | Dennis | |
| 10,125,045 B2 | 11/2018 | Dennis | |
| 10,153,389 B2 | 12/2018 | Godeke et al. | |
| 10,267,085 B2 | 4/2019 | Dennis et al. | |
| 10,280,680 B2 | 5/2019 | Veerasamy et al. | |
| 10,421,684 B2 | 9/2019 | Hogan et al. | |
| 10,435,938 B2 | 10/2019 | Dennis et al. | |
| 10,465,433 B2 | 11/2019 | Hogan et al. | |
| 10,611,664 B2 | 4/2020 | Lezzi et al. | |
| 10,731,403 B2 | 8/2020 | Krisko et al. | |
| 10,745,317 B2 | 8/2020 | Godeke et al. | |
| 10,752,535 B2 | 8/2020 | Dennis | |
| 10,759,693 B2 | 9/2020 | Xu et al. | |
| 10,829,984 B2 | 11/2020 | Dennis et al. | |
| 10,858,880 B2 | 12/2020 | Dennis | |
| 10,954,160 B2 | 3/2021 | Streltsov et al. | |
| 11,014,847 B2 | 5/2021 | Dennis | |
| 11,028,009 B2 | 6/2021 | Dennis | |
| 11,028,637 B2 | 6/2021 | Abe et al. | |
| 11,124,450 B2 | 9/2021 | Miki et al. | |
| 11,285,703 B2 | 3/2022 | Jorgensen et al. | |
| 12,338,677 B2 | 6/2025 | Thomsen et al. | |
| 12,365,164 B2 | 7/2025 | Thomsen et al. | |
| 12,377,639 B2 | 8/2025 | Thomsen | |
| 12,377,640 B2 | 8/2025 | Thomsen et al. | |
| 2003/0066311 A1 * | 4/2003 | Li | H10K 59/8722 65/58 |
| 2008/0245011 A1 * | 10/2008 | Friedl | E06B 3/66342 52/745.19 |
| 2009/0142669 A1 * | 6/2009 | Shinohara | H01M 10/0562 65/45 |
| 2009/0155500 A1 | 6/2009 | Cooper et al. | |
| 2009/0155555 A1 | 6/2009 | Botelho et al. | |
| 2010/0330308 A1 * | 12/2010 | Cooper | E06B 3/66333 428/192 |
| 2011/0209813 A1 * | 9/2011 | Shibuya | C03C 8/14 156/89.12 |
| 2012/0131959 A1 | 5/2012 | No et al. | |
| 2012/0202049 A1 | 8/2012 | Valladeau et al. | |
| 2013/0101759 A1 | 4/2013 | Jones | |
| 2014/0013804 A1 * | 1/2014 | Ono | C03C 27/10 65/60.5 |
| 2014/0023803 A1 * | 1/2014 | Kawanami | C03C 8/04 428/34 |
| 2014/0037870 A1 | 2/2014 | Petrmichl et al. | |

(56) References Cited

U.S. PATENT DOCUMENTS

| | | | |
|---|---|---|---|
| 2014/0196502 A1* | 7/2014 | Masuda | C03C 17/008 65/33.2 |
| 2014/0299256 A1* | 10/2014 | Sridharan | C03C 8/24 156/109 |
| 2014/0356558 A1* | 12/2014 | Hasegawa | E06B 3/66 428/34 |
| 2015/0218042 A1* | 8/2015 | Hogan | E06B 3/6775 501/15 |
| 2015/0270508 A1* | 9/2015 | Naito | C03C 27/06 257/40 |
| 2015/0357489 A1* | 12/2015 | König | H10F 77/20 438/57 |
| 2016/0297706 A1 | 10/2016 | Naito et al. | |
| 2017/0016270 A1* | 1/2017 | Kayaba | B32B 7/14 |
| 2017/0243995 A1* | 8/2017 | Gödeke | C03C 8/16 |
| 2018/0094475 A1* | 4/2018 | Naito | C03C 8/14 |
| 2018/0238104 A1 | 8/2018 | Mikkelsen et al. | |
| 2019/0035951 A1 | 1/2019 | Lee et al. | |
| 2019/0106931 A1 | 4/2019 | Krisko et al. | |
| 2019/0177208 A1* | 6/2019 | Gödeke | C03C 8/24 |
| 2019/0367405 A1* | 12/2019 | Naito | C03C 8/20 |
| 2020/0392036 A1 | 12/2020 | Naito et al. | |
| 2021/0254395 A1 | 8/2021 | Nielsen et al. | |
| 2021/0262279 A1 | 8/2021 | Hedeby et al. | |
| 2021/0270084 A1 | 9/2021 | Abe et al. | |
| 2022/0025697 A1 | 1/2022 | Nielsen | |
| 2022/0065029 A1* | 3/2022 | Andersen | E06B 3/67334 |
| 2022/0074258 A1 | 3/2022 | Andersen et al. | |
| 2022/0235601 A1 | 7/2022 | Krisko et al. | |
| 2022/0289621 A1* | 9/2022 | Naito | C03C 8/24 |
| 2024/0025798 A1* | 1/2024 | Gong | E06B 3/66333 |
| 2024/0426168 A1* | 12/2024 | Miki | E06B 3/6775 |

FOREIGN PATENT DOCUMENTS

| | | | | |
|---|---|---|---|---|
| WO | WO-2019035328 A1 * | 2/2019 | | H01L 23/02 |
| WO | WO-2020118781 A1 * | 6/2020 | | H10F 77/20 |
| WO | WO-2021038906 A1 * | 3/2021 | | C03C 8/16 |

OTHER PUBLICATIONS

PCT Written Opinion dated Dec. 18, 2023 for PCT/US2023/077868.
Li et al., "Glass forming region and bonding mechanism of low meting V2O5TeO2Bi2O3 glass applied in vacuum glazing sealing", Mar. 9, 2021, pp. 1-17, American Ceramic Society.
Modeling of Vacuum Insulating Glazing, Published by Ashrae; by Hart et al.; 7pgs. (Dec. 2013).
Laser Assisted Frit Sealing for High Thermal Expansion Glasses; *JLMN-Journal of Laser Micro/Nanoengineering* vol. 7, No. 3, 2012, by Logunov et al.; 8 pgs (Dec. 2012).
Vacuum Insulated Glazing under the Influence of a Thermal Load; 2 pgs; by Aronen et al. (Jul. 2020).
Edge Conduction in Vacuum Glazing; Presented at Thermal Performance of the Exterior Envelopes of Buildings VI, Clearwater Beach, FL, Dec. 4-8, 1995, by Simko et al.; 14pgs (Dec. 1995).
U.S. Appl. No. 18/376,897, filed Oct. 5, 2023.
U.S. Appl. No. 18/376,473, filed Oct. 4, 2023.
U.S. Appl. No. 18/376,900, filed Oct. 5, 2023.
U.S. Appl. No. 18/376,907, filed Oct. 5, 2023.
U.S. Appl. No. 18/376,479, filed Oct. 4, 2023.
U.S. Appl. No. 18/376,483, filed Oct. 4, 2023.
U.S. Appl. No. 18/376,490, filed Oct. 4, 2023.
U.S. Appl. No. 18/376,495, filed Oct. 4, 2023.
U.S. Appl. No. 18/376,926, filed Oct. 5, 2023.
U.S. Appl. No. 18/376,914, filed Oct. 5, 2023.
U.S. Appl. No. 18/376,503, filed Oct. 4, 2023.
U.S. Appl. No. 18/379,275, filed Oct. 12, 2023.
U.S. Appl. No. 18/379,285, filed Oct. 12, 2023.
U.S. Appl. No. 18/376,932, filed Oct. 5, 2023.
U.S. Appl. No. 18/377,328, filed Oct. 6, 2023.
U.S. Appl. No. 18/377,335, filed Oct. 6, 2023.
U.S. Appl. No. 18/517,044, filed Nov. 22, 2023.
U.S. Appl. No. 18/513,944, filed Nov. 20, 2023.
U.S. Appl. No. 18/510,777, filed Nov. 16, 2023.
U.S. Appl. No. 18/616,420, filed Mar. 26, 2024.
U.S. Appl. No. 18/636,472, filed Apr. 16, 2024.
U.S. Appl. No. 18/632,364, filed Apr. 11, 2024.
U.S. Appl. No. 18/617,736, filed Mar. 27, 2024.
U.S. Appl. No. 18/619,266, filed Mar. 28, 2024.
U.S. Appl. No. 18/623,109, filed Apr. 1, 2024.
U.S. Appl. No. 18/626,359, filed Apr. 4, 2024.
U.S. Appl. No. 18/633,733, filed Apr. 12, 2024.
U.S. Appl. No. 18/629,996, filed Apr. 9, 2024.
U.S. Appl. No. 18/650,204, filed Apr. 30, 2024.
U.S. Appl. No. 18/654,040, filed May 3, 2024.
U.S. Appl. No. 18/664,462, filed May 15, 2024.
U.S. Appl. No. 18/668,374, filed May 20, 2024.
Tellurite Glass and Its Application in Lasers, Wang et al. (2020).
Moawad et al. "Electrical Conductivity of Silver Vanadium Tellurite Glasses", J. Am. Ceram. Soc., 85 [11] 2655-59 (2002), 5 pages.
Marple et al., "Structure of TeO2 Glass: Results from 2D Te NMR Spectroscopy", Dept. of Materials Science & Engineering, Univ. of Calif. at Davis (2019).

* cited by examiner

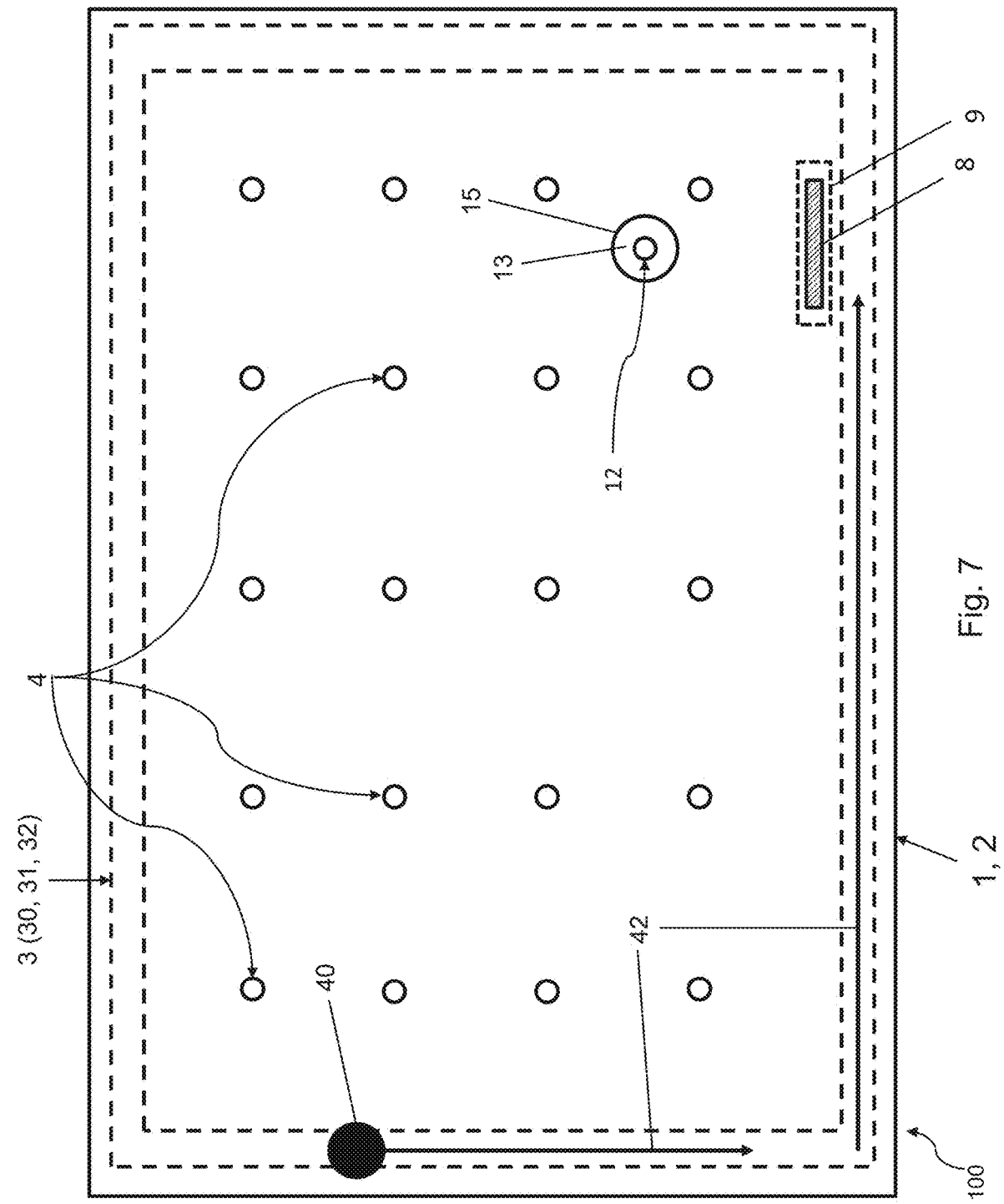

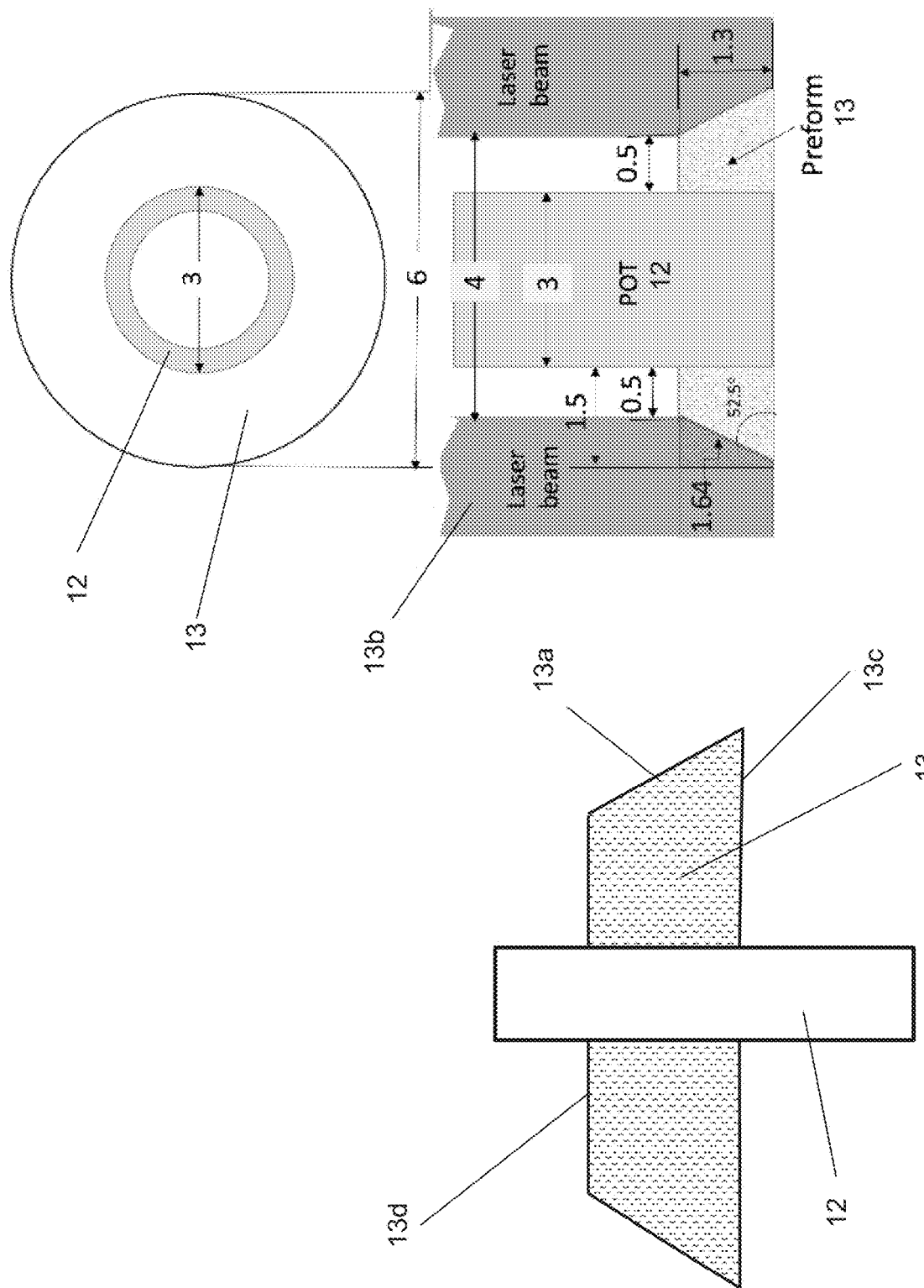

Example Main Seal Material (Weight % and Mol %)
(non-carbon detecting XRF)

| Oxide | Mol % (Avg) | Wt % (Avg) |
|---|---|---|
| Te oxide | 35.84% | 46.65% |
| V oxide | 17.83% | 26.45% |
| Al oxide | 14.37% | 11.95% |
| SiO2 | 19.23% | 9.43% |
| MgO | 9.45% | 3.11% |
| MnO | 2.06% | 1.19% |
| BaO | 0.46% | 0.57% |
| ZrO2 | 8.05% | 0.08% |
| K2O | 0.06% | 0.05% |
| Na2O | 0.17% | 0.09% |
| CaO | 0.18% | 0.08% |
| Fe2O3 | 0.07% | 0.09% |
| P2O5 | 0.02% | 0.05% |
| Bi2O3 | 0.01% | 0.06% |
| SO3 | 0.05% | 0.03% |
| PbO | 0.01% | 0.03% |
| CuO | 0.01% | 0.01% |
| ZnO | 0.02% | 0.01% |
| SnO2 | 0.05% | 0.07% |

Fig. 11

Example Main Seal Material (Weight % and Mol %)
(carbon detecting XRF)

| | Main Powder (wt%) | Main Post Laser (wt%) | | Main Powder (Mol%) | Main Post Laser (Mol%) |
|---|---|---|---|---|---|
| TeO$_4$ | 28.10 | 8.50 | TeO$_4$ | 21.23 | 7.95 |
| TeO$_3$ | 20.30 | 47.26 | TeO$_3$ | 15.39 | 44.57 |
| TeO$_{3+1}$ | 0.70 | 2.81 | TeO$_{3+1}$ | 0.54 | 2.65 |
| V$_2$O$_5$ | 17.57 | 3.40 | V$_2$O$_5$ | 12.40 | 5.82 |
| VO$_2$ | 4.40 | 23.80 | VO$_2$ | 2.20 | 14.67 |
| V$_2$O$_3$ | 0.35 | 0.95 | V$_2$O$_3$ | 0.24 | 2.80 |
| Al$_2$O$_3$ | 13.93 | 7.18 | Al$_2$O$_3$ | 16.51 | 10.59 |
| SiO$_2$ | 9.73 | 2.39 | SiO$_2$ | 19.57 | 5.99 |
| MgO | 3.22 | 0.33 | MgO | 9.65 | 1.25 |
| BaO | 0.57 | - | BaO | 0.45 | - |
| MnO | 1.03 | 1.32 | MnO | 1.75 | 2.81 |
| Fe$_2$O$_3$ | 0.10 | - | Fe$_2$O$_3$ | 0.08 | - |
| ZrO$_2$ | - | 0.28 | ZrO$_2$ | - | 0.35 |
| Bi$_2$O$_3$ | - | 1.77 | Bi$_2$O$_3$ | - | 0.57 |

Fig. 12

Example Primer Material (Weight % and Mol %)
(carbon detecting XRF)

| | Primer As-Received (wt%) | Primer Post-Laser (wt%) | | Primer As-Received (Mol%) | Primer Post-Laser (Mol%) |
|---|---|---|---|---|---|
| $Bi_2O_3$ | 20.00 | 34.50 | $Bi_2O_3$ | 3.08 | 6.52 |
| $SiO_2$ | 17.76 | 18.81 | $SiO_2$ | 21.20 | 27.56 |
| $B_2O_3$ | 27.74 | 17.80 | $B_2O_3$ | 28.59 | 22.51 |
| $TiO_2$ | 5.42 | 8.32 | $TiO_2$ | 4.87 | 9.17 |
| ZnO | 1.59 | 2.43 | ZnO | 1.40 | 2.63 |
| $Na_2O$ | 4.21 | 2.54 | $Na_2O$ | 4.88 | 3.61 |
| $Al_2O_3$ | 0.34 | 0.18 | $Al_2O_3$ | 0.24 | 0.16 |
| $ZrO_2$ | 0.69 | 1.16 | $ZrO_2$ | 0.40 | 0.83 |
| $Cr_2O_3$ | 0.17 | 0.33 | $Cr_2O_3$ | 0.08 | 0.19 |
| MnO | 0.09 | 0.13 | MnO | 0.09 | 0.17 |
| $Fe_2O_3$ | 0.32 | 0.44 | $Fe_2O_3$ | 0.14 | 0.24 |
| NiO | 0.20 | 0.30 | NiO | 0.19 | 0.35 |
| $SO_3$ | 0.21 | - | $SO_3$ | 0.19 | - |
| $CO_2$ | 21.26 | 13.05 | $CO_2$ | 34.65 | 26.10 |

Fig. 13

Main Seal | Pump-out Tube Seal | Primer

| | Main Powder Weight % | Main Powder Mol% | Main Post-Laser Weight % | Main Post-Laser Mol % | | Preform Weight % | Preform Mol % | Preform Post-Laser Weight % | Preform Post Laser (Mol%) | | Primer Powder (Weight %) | Primer Powder (Mol%) | Primer Tempered (Weight %) | Primer Tempered (Mol%) |
|---|---|---|---|---|---|---|---|---|---|---|---|---|---|---|
| Te | 44.90 | 13.05 | 60.30 | 27.30 | Te | 52.20 | 16.78 | 51.10 | 16.64 | Bi | 19.70 | 1.92 | 33.30 | 4.15 |
| V | 14.30 | 10.41 | 20.20 | 23.02 | V | 11.60 | 9.34 | 9.35 | 7.63 | Si | 9.73 | 7.06 | 10.10 | 9.37 |
| O | 23.20 | 53.77 | 9.28 | 33.51 | O | 18.90 | 48.45 | 18.70 | 48.56 | B | 10.10 | 19.03 | 6.35 | 15.30 |
| Al | 8.43 | 11.58 | 4.89 | 10.47 | Al | 7.29 | 11.08 | 4.63 | 7.13 | Ti | 3.81 | 1.62 | 5.73 | 3.12 |
| Si | 5.20 | 6.87 | 1.44 | 2.96 | Si | 4.93 | 7.20 | 7.22 | 10.68 | Zn | 1.50 | 0.47 | 2.24 | 0.89 |
| Mg | 2.22 | 3.40 | 0.26 | 0.62 | Mg | 2.38 | 4.03 | 0.77 | 1.32 | C | 6.80 | 11.53 | 4.09 | 8.87 |
| Ba | 0.58 | 0.16 | - | - | Ba | 0.56 | 0.17 | 2.25 | 0.68 | O | 42.80 | 54.48 | 33.80 | 55.02 |
| Na | 0.03 | 0.05 | - | - | Na | 0.57 | 1.02 | 1.55 | 2.80 | Na | 3.66 | 3.24 | 2.16 | 2.45 |
| P | 0.00 | 0.00 | - | - | P | 0.06 | 0.08 | 0.11 | 0.15 | Al | 0.21 | 0.16 | 0.11 | 0.11 |
| S | 0.01 | 0.01 | - | - | S | 1.32 | 1.69 | 1.73 | 2.24 | Zr | 0.60 | 0.13 | 0.99 | 0.28 |
| Cl | - | - | - | - | Cl | 0.04 | 0.05 | 0.14 | 0.16 | Cr | 0.14 | 0.05 | 0.26 | 0.13 |
| K | - | - | - | - | K | - | - | 0.52 | 0.55 | Mn | 0.08 | 0.03 | 0.12 | 0.06 |
| Ca | 0.04 | 0.04 | - | - | Ca | 0.07 | 0.07 | 0.16 | 0.17 | Fe | 0.26 | 0.09 | 0.35 | 0.16 |
| Mn | 0.91 | 0.61 | 1.32 | 1.39 | Mn | - | - | - | - | Co | 0.04 | 0.01 | 0.06 | 0.03 |
| Fe | 0.08 | 0.05 | - | - | Fe | 0.06 | 0.04 | 1.69 | 1.26 | Ni | 0.18 | 0.06 | 0.27 | 0.12 |
| Ni | 0.01 | 0.00 | - | - | Ni | - | - | - | - | P | 0.02 | 0.01 | - | - |
| Cu | 0.01 | 0.00 | - | - | Cu | - | - | - | - | S | 0.10 | 0.06 | - | - |
| Zn | - | - | - | - | Zn | - | - | - | - | Cl | 0.03 | 0.02 | - | - |
| Ge | - | - | 0.04 | 0.04 | Ge | - | - | 0.06 | 0.04 | K | 0.04 | 0.02 | - | - |
| Zr | 0.01 | 0.00 | - | - | Zr | 0.01 | 0.00 | 0.03 | 0.01 | Ca | 0.01 | 0.00 | 0.01 | 0.00 |
| Sr | - | - | - | - | Sr | - | - | - | - | Nb | 0.01 | 0.00 | - | - |
| Mo | - | - | - | - | Mo | 0.01 | 0.00 | - | - | Cu | 0.003 | 0.00 | - | - |
| Pb | 0.01 | 0.00 | - | - | Pb | - | - | - | - | Y | 0.001 | 0.00 | - | - |
| Bi | 0.01 | 0.00 | 1.91 | 0.53 | Bi | - | - | - | - | | | | | |

Example Materials for Main Seal, Primer(s), and Pump-out Tube Seal (Wt. % & Mol %) Based on Elemental Analysis (non-oxide analysis) [WDXRF]

Fig. 14

Example Getter Material

| Element | Pre-Activation | | Laser Activated | |
|---|---|---|---|---|
| | Weight % | Atomic % | Weight % | Atomic % |
| Ti | 66.06 | 62.44 | 64.19 | 60.27 |
| V | 12.11 | 10.76 | 11.59 | 10.24 |
| Si | 7.45 | 12.01 | 6.69 | 10.72 |
| Al | 2.98 | 5.00 | 2.52 | 4.20 |
| Zr | - | - | 2.05 | 1.01 |
| P | 0.87 | 1.27 | 0.22 | 0.32 |
| Fe | 10.26 | 8.32 | 9.89 | 7.97 |
| Co | 0.27 | 0.21 | 0.24 | 0.18 |
| Na | - | - | 2.61 | 5.10 |

Fig. 24b

SCALP Data: Average Compressive Stress, Corner of Unit
Post-Firing/Sintering & Post Evacuation Example Pump-Out Tube Seal Material Pre and Post Sintered (Weight % and Mol %) (carbon detecting XRF)

| | Preform Pre-Laser (wt%) | Preform Post-Laser (wt%) | | | Pre-Laser (Mol%) | Preform Post-Laser (Mol%) |
|---|---|---|---|---|---|---|
| $TeO_4$ | 6.00 | 8.30 | | $TeO_4$ | 4.60 | 6.17 |
| $TeO_3$ | 46.20 | 43.10 | | $TeO_3$ | 34.80 | 32.07 |
| $TeO_{3+1}$ | 2.50 | 2.50 | | $TeO_{3+1}$ | 1.86 | 1.83 |
| $V_2O_5$ | 5.90 | 2.92 | | $V_2O_5$ | 5.05 | 2.48 |
| $VO_2$ | 11.00 | 10.04 | | $VO_2$ | 5.85 | 5.97 |
| $V_2O_3$ | 0.50 | 1.08 | | $V_2O_3$ | 0.57 | 0.74 |
| $Al_2O_3$ | 11.55 | 7.38 | | $Al_2O_3$ | 13.62 | 8.59 |
| $SiO_2$ | 8.85 | 13.02 | | $SiO_2$ | 17.70 | 25.75 |
| MgO | 3.31 | 1.08 | | MgO | 9.88 | 3.17 |
| BaO | 0.52 | 2.12 | | BaO | 0.41 | 1.64 |
| $Na_2O$ | 0.64 | 1.76 | | $Na_2O$ | 1.25 | 3.38 |
| $P_2O_5$ | 0.12 | 0.21 | | $P_2O_5$ | 0.05 | 0.09 |
| $SO_3$ | 2.76 | 3.64 | | $SO_3$ | 4.15 | 5.41 |
| Cl | - | - | | Cl | - | - |
| $K_2O$ | - | 0.54 | | $K_2O$ | - | 0.69 |
| CaO | 0.08 | 0.19 | | CaO | 0.18 | 0.40 |
| $Fe_2O_3$ | 0.07 | 2.04 | | $Fe_2O_3$ | 0.05 | 1.52 |
| $GeO_2$ | - | 0.08 | | $GeO_2$ | - | 0.09 |

Fig. 29

VACUUM INSULATED PANEL SEAL DENSITY

CROSS-REFERENCE TO RELATED APPLICATIONS

This application is related to and claims priority on U.S. Provisional Application No. 63/540,729, filed Sep. 27, 2023, the disclosure of which is hereby incorporated herein by reference in its entirety for all purposes. This application is also related to and claims priority on U.S. Provisional Application No. 63/427,645, filed Nov. 23, 2022, to U.S. Provisional Application No. 63/427,657, filed Nov. 23, 2022, and to U.S. Provisional Application No. 63/427,661, filed Nov. 23, 2022.

FIELD

Certain example embodiments are generally related to vacuum insulated devices such as vacuum insulating panels that may be used for windows or the like, and/or methods of making same.

BACKGROUND AND SUMMARY

Vacuum insulated panels are known in the art. For example, and without limitation, vacuum insulating panels are disclosed in U.S. Pat. Nos. 5,124,185, 5,657,607, 5,664,395, 7,045,181, 7,115,308, 8,821,999, 10,153,389, and 11,124,450, the disclosures of which are all hereby incorporated herein by reference in their entireties.

As discussed and/or shown in one or more of the above patent documents, a vacuum insulating panel typically includes an outboard substrate, an inboard substrate, a hermetic edge seal, a sorption getter, a pump-out port, and spacers (e.g., pillars) sandwiched between at least the two substrates. The gap between the substrates may be at a pressure less than atmospheric pressure to provide insulating properties. Providing a vacuum in the space between the substrates reduces conduction and convection heat transport, and thus provides insulating properties. For example, a vacuum insulating panel provides thermal insulation resistance by reducing convective energy between the two substrates, reducing conductive energy between the two transparent substrates, and reducing radiative energy with a low-emissivity (low-E) coating provided on one of the substrates. Vacuum insulating panels may be used in window applications (e.g., for commercial and/or residential windows), and/or for other applications such as commercial refrigeration and consumer appliance applications.

In certain example embodiments, there may be provided a vacuum insulating panel comprising: a first substrate; a second substrate; a plurality of spacers provided in a gap between at least the first and second substrates, wherein the gap is at a pressure less than atmospheric pressure; a seal provided at least partially between at least the first and second substrates, wherein the seal may comprise a first seal layer and a second seal layer; and wherein the first seal layer may have a density of from about 2.8-4.0 g/cm$^3$, the second seal layer may have a density of from about 3.0-4.2 g/cm$^3$, and wherein the density of the second seal layer may be at least about 0.20 g/cm$^3$ greater, more preferably at least about 0.30 g/cm$^3$ greater, more preferably at least about 0.40 g/cm$^3$ greater, than the density of the first seal layer.

In certain example embodiments, there may be provided a method of making a vacuum insulating panel, the method comprising: having a first glass substrate; having a second glass substrate; providing a plurality of spacers in a gap between at least the first and second glass substrates; forming a hermetic edge seal, comprising a first seal layer, at least partially between at least the first and second substrates, the first seal layer comprising tellurium oxide and vanadium oxide, and wherein the first seal layer may comprise, on a wt. %, more tellurium oxide than vanadium oxide, and wherein the tellurium oxide may comprise $TeO_4$ and $TeO_3$, and the vanadium oxide may comprise $VO_2$ and $V_2O_5$, wherein the first seal layer may comprise more $VO_2$ than $V_2O_5$ by wt. %, and more $TeO_3$ than $TeO_4$ by wt. %; and wherein said forming the hermetic edge seal may comprise using a laser (e.g., near-IR laser) to fire and/or sinter the first seal layer, so that after evacuation of the gap to a pressure less than atmospheric pressure the first seal layer may have a density of from about 2.8-4.0 g/cm$^3$.

In certain example embodiments, there may be provided a vacuum insulating panel comprising: a first substrate; a second substrate; a plurality of spacers provided in a gap between at least the first and second substrates, wherein the gap is at a pressure less than atmospheric pressure; a seal provided at least partially between at least the first and second substrates, wherein the seal may comprise a first ceramic seal layer, a second ceramic seal layer, and a third ceramic seal layer, and wherein the seal may be substantially lead-free; and wherein the first seal layer may have a density of from about 2.9-3.9 g/cm$^3$, the second seal layer may have a density of from about 3.0-4.2 g/cm$^3$, and the third seal layer may have a density of from about 3.0-4.2 g/cm$^3$, and wherein the density of the second seal layer may be at least about 0.20 g/cm$^3$ greater than the density of the first seal layer.

In certain example embodiments, there may be provided a vacuum insulating panel comprising: a first substrate; a second substrate; a plurality of spacers provided in a gap between at least the first and second substrates, wherein the gap is at a pressure less than atmospheric pressure; a seal provided between at least the first substrate and the second substrate, the seal comprising a first seal layer; wherein the first seal layer may comprise tellurium oxide and vanadium oxide; wherein the first seal layer may comprise, on a wt. %, more tellurium oxide than vanadium oxide, and may have a density of from about 2.8-4.0 g/cm$^3$.

Technical advantages, for example, include one or more of: improved moisture resistance for the seal, improved durability for the seal, improved strength for the seal, improved seal hermiticity, and/or improved thermal diffusivity.

BRIEF DESCRIPTION OF THE DRAWINGS

These and/or other aspects, features, and/or advantages will become apparent and more readily appreciated from the following description of various example embodiments, taken in conjunction with the accompanying drawings. Thicknesses of layers/elements, and sizes of components/elements, are not necessarily drawn to scale or in actual proportion to one another, but rather are shown as example representations. Like reference numerals may refer to like parts throughout the several views. Each embodiment herein may be used in combination with any other embodiment(s) described herein.

FIG. 7 is a schematic top view of a vacuum insulating unit/panel according to an example embodiment, showing a laser used in forming the edge seal during manufacturing, which may be used in combination with any embodiment herein including those of FIGS. 1-6, 8-9, 11-31.

FIG. 8b is a cross-sectional view of a ceramic preform seal of FIG. 8a, surrounding a pump-out tube, according to an example embodiment, which may be used in combination with any embodiment herein including those of FIGS. 1-7, 9, 11-31.

FIG. 8c is a schematic cross-sectional diagram of the seal preform of FIGS. 8a-8b being laser sintered, according to an example embodiment, which may be used in combination with any embodiment herein including those of FIGS. 1-7, 9, 11-31.

FIG. 11 is a table/graph showing weight % and mol % of various compounds/elements in a main seal material according to an example embodiment (measured via non-carbon detecting XRF), which main seal material may be used in combination with any embodiment herein including those of FIGS. 1-9, 12-31.

FIG. 12 is a table/graph showing weight % and mol % of various compounds/elements in a main seal material according to an example embodiment (measured via carbon detecting XRF), before and after laser treatment using an 808 or 810 nm continuous wave laser for edge seal formation, which main seal material may be used in combination with any embodiment herein including those of FIGS. 1-9, 11, 13-31.

FIG. 13 is a table/graph showing weight % and mol % of various compounds/elements in a primer seal material according to an example embodiment (measured via carbon detecting XRF), before and after substrate tempering, which primer material may be used in combination with any embodiment herein (e.g., for one or both primer layers) including those of FIGS. 1-9, 11-12, 14-31.

FIG. 14 is a table/graph showing an elemental analysis (non-oxide analysis) of weight % and mol % of various elements in each of a main seal material (left side in the figure), a pump-out tube seal material (center in the figure), and a primer seal material (right side in the figure), according to an example embodiment(s) (measured via WDXRF), before and after laser treatment using an 808 or 810 nm continuous wave laser to fire/sinter the main seal layer for seal formation, which various seal materials may be used in combination with any embodiment herein including those of FIGS. 1-9, 11-13, 15-31.

FIG. 24b illustrates an example of getter material, before and after activation, measure via EDS, for an example embodiment, which may be used in combination with any embodiment herein including those of FIGS. 1-9, 11-23, 25-31.

FIG. 29 is a table/graph showing weight % and mol % of various compounds/elements in a pump-out tube seal material according to an example embodiment (measured via carbon detecting XRF), before and after laser sintering/firing, which pump-out tube seal material may be used in combination with any embodiment herein including those of FIGS. 1-9, 11, 13-28, 30.

DETAILED DESCRIPTION

Figure 1:
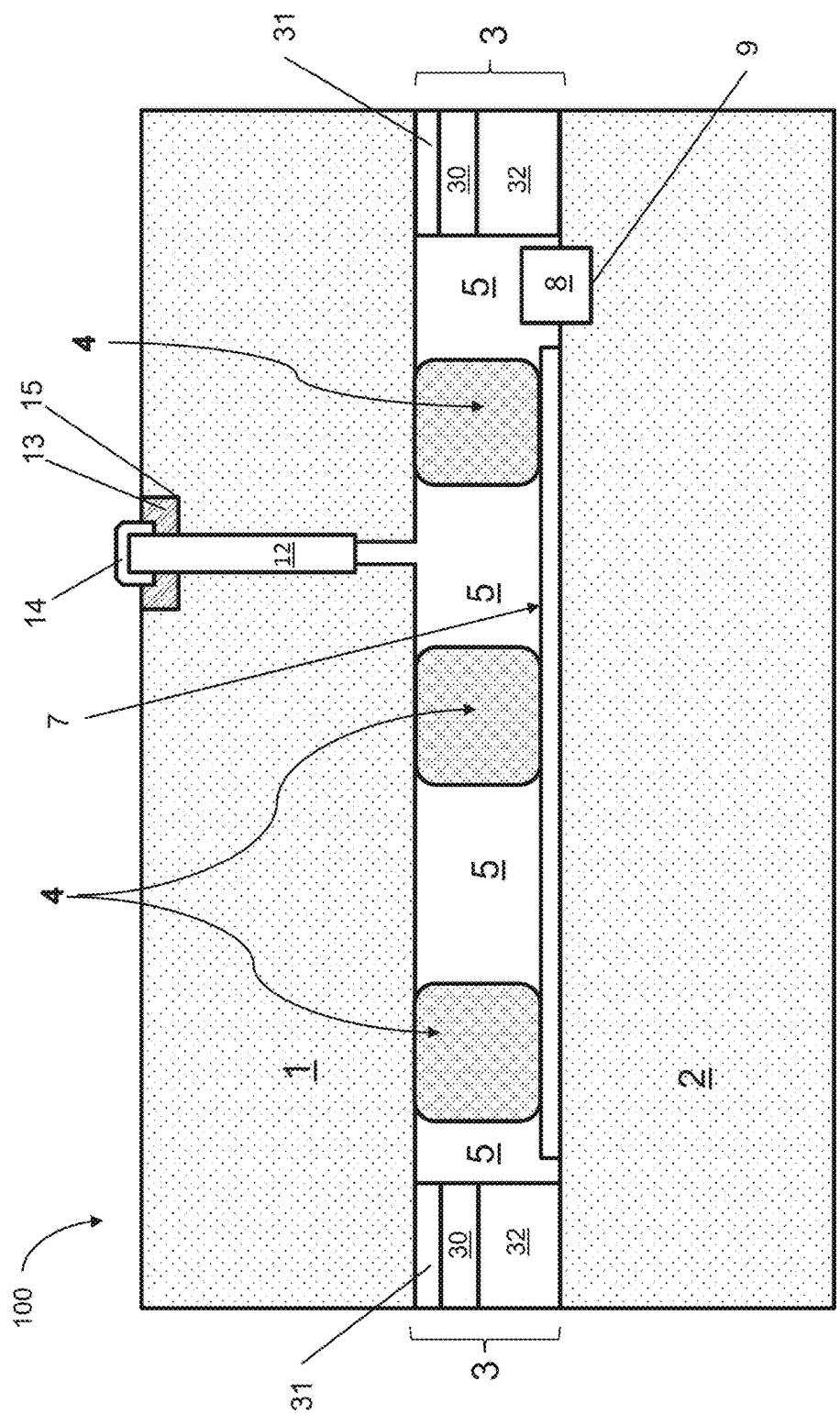
FIG. 1 is a side cross sectional view of a vacuum insulating unit/panel according to an example embodiment.

The following detailed structural and/or functional description(s) is/are provided as examples only, and various alterations and modifications may be made. The example embodiments herein do not limit the disclosure and should be understood to include all changes, equivalents, and replacements within ideas and the technical scope herein. Hereinafter, certain examples will be described in detail with reference to the accompanying drawings. When describing various example embodiments with reference to the accompanying drawings, like reference numerals may refer to like components and a repeated description related thereto may be omitted.

Conventional insulated glass edge sealing systems and associated sintering and/or firing processes have shown it is possible to create a hermetically sealed vacuum insulating panel. However, conventional vacuum insulated glass perimeter sealing systems may suffer from one or more of the following drawbacks that hinder use of such products commercially: (1) significant de-tempering of the glass substrate(s) preventing or reducing a likelihood of the vacuum insulated panel meeting mandatory tempered glass safety codes due to overall reduction in the compressive surface stress across the device and/or the internal tensile stress; (2) significantly higher de-tempering rates around the periphery of the device relative to the center of the vacuum insulated panel resulting in a large compressive stress gradient that upon physical impact does not meet safety fragmentation requirements, due for example and without limitation at least to variations in resonant vibration frequencies; (3) lack of durability, for example due to thermally induced breakage or flaws from large asymmetric thermal stress across the unit and/or spacer induced cracks causing glass breakage; (4) lack of durability and/or hermiticity due to edge seal damage, cracks and/or flaws; (5) slow processing times, for example for seal sintering resulting in high manufacturing costs; (6) increased need for heat soak testing to ensure that the unit contains no latent defects; and/or (7) significant thermal de-tempering of tempered glass resulting in higher unit breakage rates such as when installed in a final application. Certain example embodiments herein may overcome at least one of these problems.

Thermal heating methods and/or processes have been employed to sinter and/or fire ceramic sealing glass materials around the perimeter of the vacuum insulated glass panels. Such methods include batch oven systems using a combination of radiation and convective heating, in-line oven systems using a combination of radiation and convective heating, millimeter microwave selective perimeter heating, short wave infrared selective perimeter heating and laser perimeter heating. While each of these heating techniques may be used, for different type(s) of heating in various example embodiments, they do have one or more drawbacks in certain instances. Batch and in-line thermal processes that employ no selective heating techniques are sometimes not viable options for achieving tempered vacuum insulated glass units when the unit is exposed to high temperatures for long durations of time which significantly de-tempers the glass substrates, and/or may have high manufacturing costs due to low output and high utility costs related to thermal heating. Millimeter microwave involves high capital equipment costs, and long process cycle times, resulting in high manufacturing costs. Short wave infrared energy often cannot be directed to a narrow enough band around the perimeter of the glass, and thus can result in high levels of de-tempering of tempered glass at the perimeter which results in a high center to perimeter gradient and a lack of durability for the final panel, and resulting products have difficulty with safety impact tests (e.g., safety bag impact and/or fragmentation tests) and/or pass edge of glass compressive stress standards. Prior efforts to utilize laser heating of the perimeter seal have also been problematic. An example issue with prior laser heating is that extremely rapid heating and cooling from the laser beam over large temperature ranges creates high transient stress conditions in the perimeter sealing glass material(s) and/or glass substrate thereby leading to micro-cracks in the sealing structure which leads to one or more of hermeticity issues (loss of vacuum), structural issues during asymmetric thermal loading (e.g., unit failure resulting in loss of vacuum), poor moisture and/or high humidity resistance resulting in premature failure (e.g., loss of vacuum) in the product end application, and/or high manufacturing costs due to low lasing speeds. Past laser selective approaches have not employed sufficient structures and/or techniques to significantly reduce transient stress and/or final residual stress.

Need(s) exist in the field for a vacuum insulated glass panel/device and/or corresponding technique(s), so that one or more of the above identified problems can be solved. For example, it may be desirable to provide a vacuum insulating panel capable of one or more of: (a) maintaining vacuum hermeticity, (b) maintaining in one or both glass substrates, when thermally tempered, a surface compressive stress of at least about 10,000 psi, more preferably of at least about 11,000 psi, more preferably of at least about 12,000 psi, more preferably of at least about 13,000 psi, and sometimes at least about 14,000 psi, after fabrication of the vacuum insulated glass panel, (c) maintaining in one or both glass substrates, when thermally tempered, an internal tensile stress of at least about 5,200 psi, more preferably at least about 5,500 psi, more preferably at least about 6,000 psi, more preferably at least about 6,500 psi, and most preferably at least about 7,000 psi and/or at least about 7,500 psi, after fabrication of the vacuum insulating panel, (d) maintaining in one or both glass substrates, when thermally tempered, an edge stress of at least about 9,700 psi after fabrication of the vacuum insulated panel, (e) maintaining in one or both glass substrates, when thermally tempered, a maximum center to edge and/or a center to corner stress gradient of no more than 2,000 psi, more preferably of no more than 1,000 psi, or no more than 500 psi, in a panel capable of maintaining structural integrity such as during extended exposure to an asymmetric thermal differential of 70 degrees C., more preferably 90 degrees C., (f) providing an improved edge seal structure, (g) providing improved processing for forming the edge seal, (h) providing structure and/or processing technique(s) for reducing chances of significant de-tempering of glass substrate(s), (i) providing structure and/or processing for reducing induced transient thermal stress in glass substrate(s) and/or sealing material, (j) providing structure and/or processing for improving sealing functionality and/or strength of a seal, (k) providing structure and/or processing for improving durability and/or aesthetics of a vacuum insulating panel, and/or (1) providing structure and/or processing permitting the product to be cost effectively produced in a time efficient manner. Various example embodiments herein address different need(s), such that any given embodiment may address at least one of the above needs in certain example instances.

Figure 4:
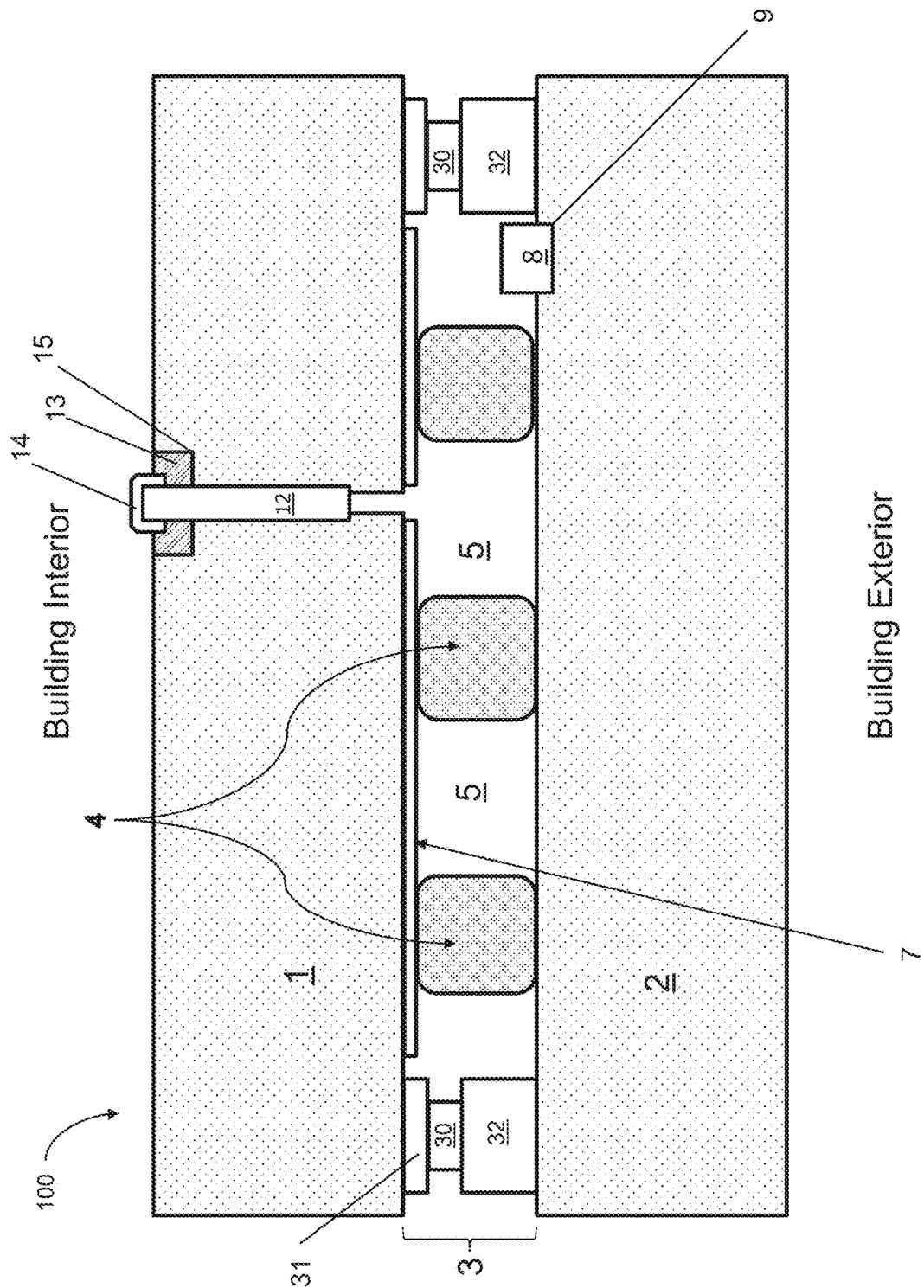
FIG. 4 is a side cross sectional view of a vacuum insulating unit/panel according to an example embodiment.
Figure 5:
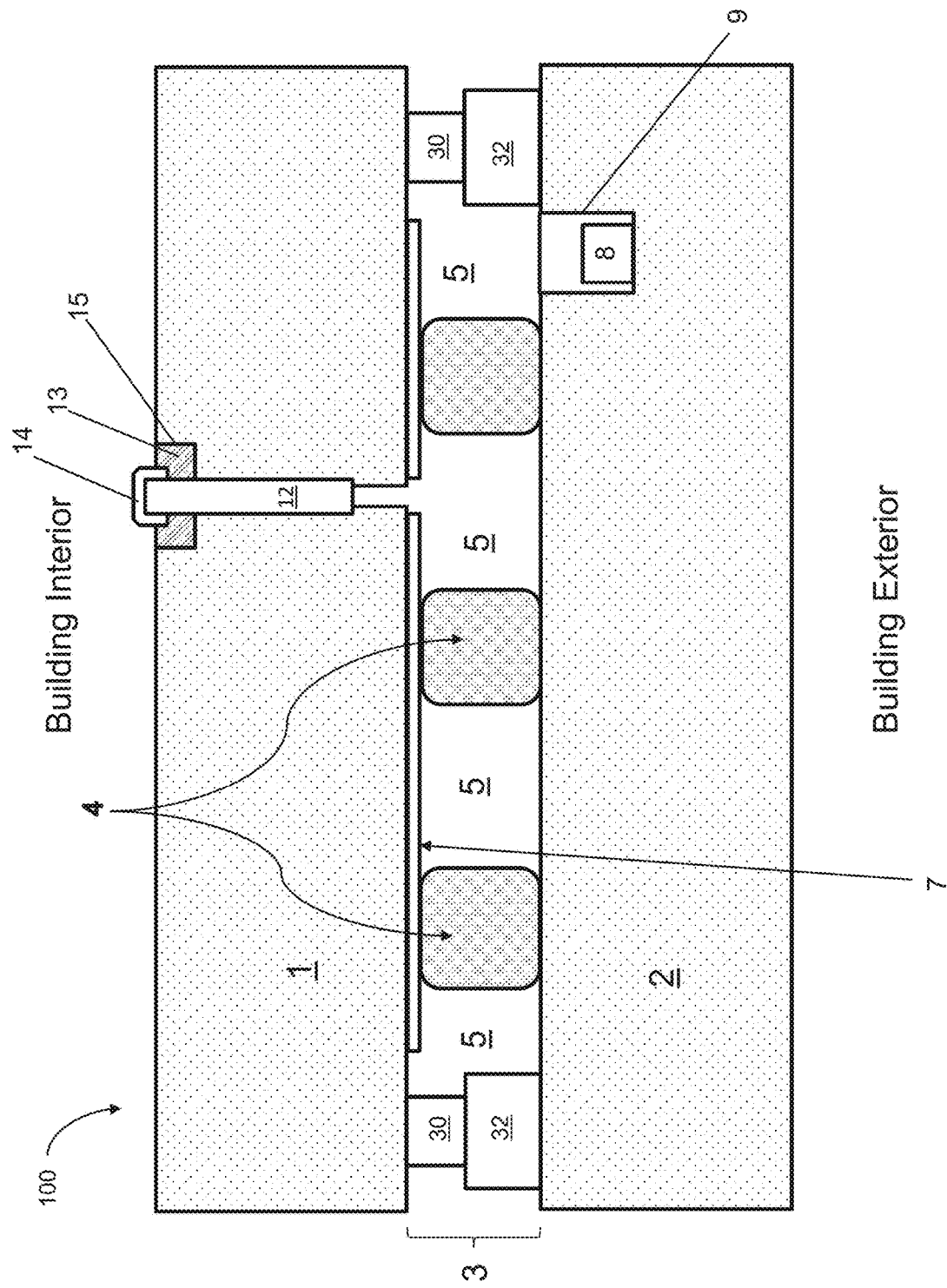
FIG. 5 is a side cross sectional view of a vacuum insulating unit/panel according to an example embodiment.
Figure 6:
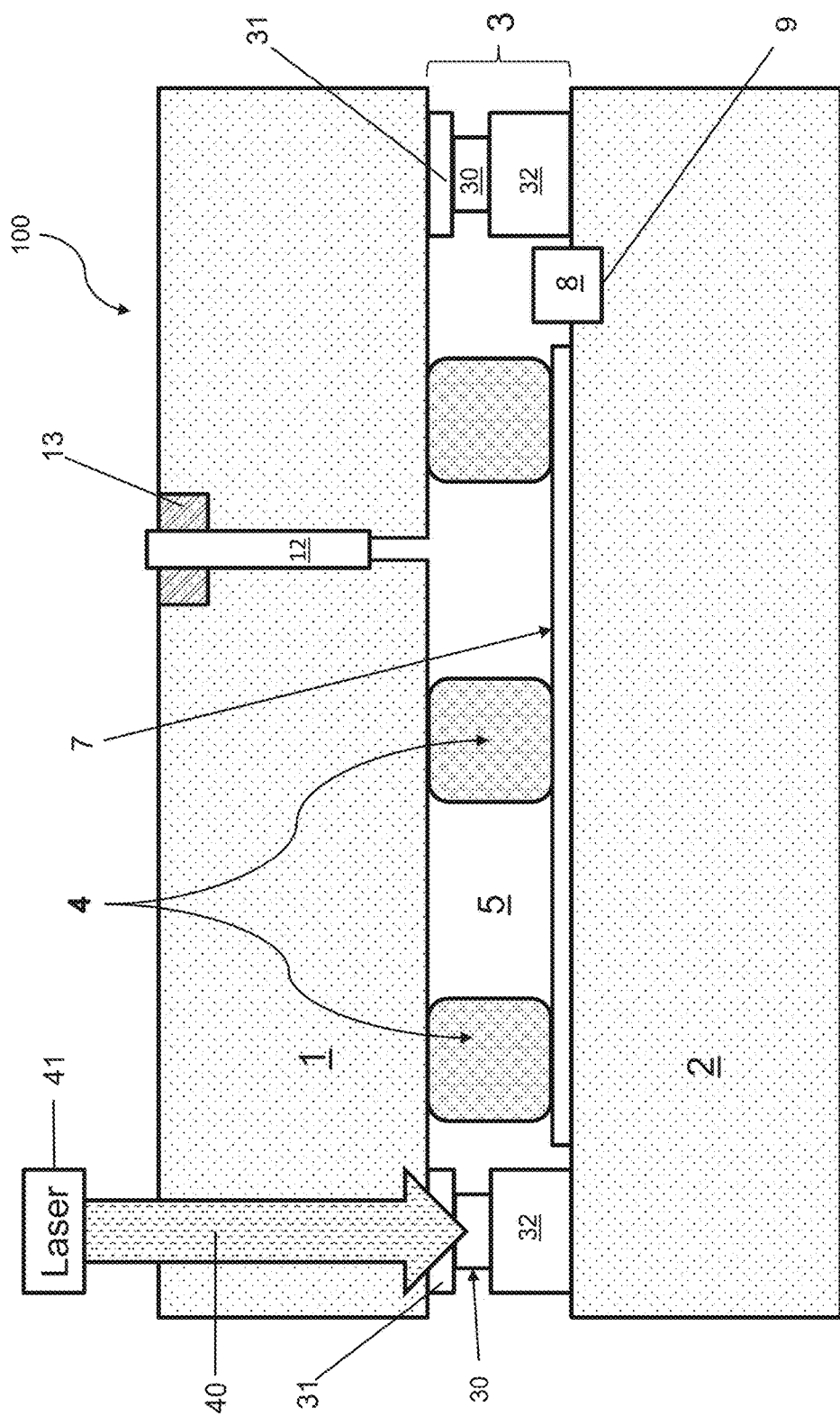
FIG. 6 is a side cross sectional schematic view of a vacuum insulating unit/panel according to an example embodiment, showing a laser being used in forming the edge seal during manufacturing, which may be used in combination with any embodiment herein including those of FIGS. 1-5, 7-9, 11-31.

FIGS. 1-5 are side cross sectional views each illustrating a vacuum insulating panel 100 according to various example embodiments, FIG. 6 is a side cross sectional view of an example vacuum insulating unit/panel 100 showing a laser used in sintering/firing the main seal layer 30 when forming the edge seal 3 during manufacturing (which may be used in combination with any embodiment herein, and FIG. 7 is a schematic top view of an example vacuum insulating unit/panel 100 showing a laser used in sintering/firing the main seal layer 30 when forming the edge seal 3 during manufacturing (which may be used in combination with any embodiment herein). It should be noted that, in practice, such vacuum insulating panels/units may be oriented upside down or sideways from the orientations illustrated in FIGS. 1-7. Vacuum insulating panel 100 may be used in window applications (e.g., for commercial and/or residential windows), and/or for other applications such as commercial refrigeration and consumer appliance applications.

Figure 2:
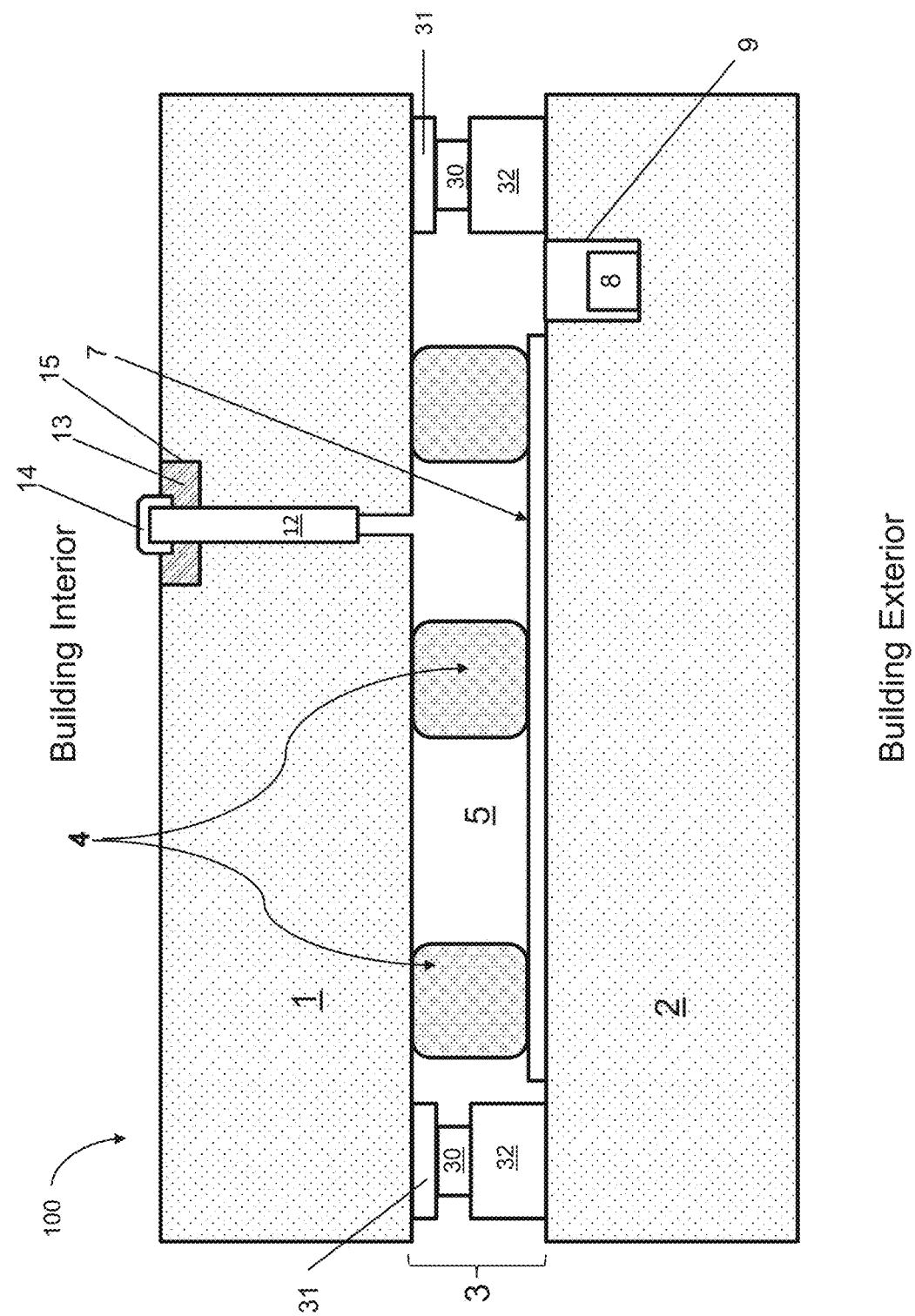
FIG. 2 is a side cross sectional view of a vacuum insulating unit/panel according to an example embodiment.
Figure 3:
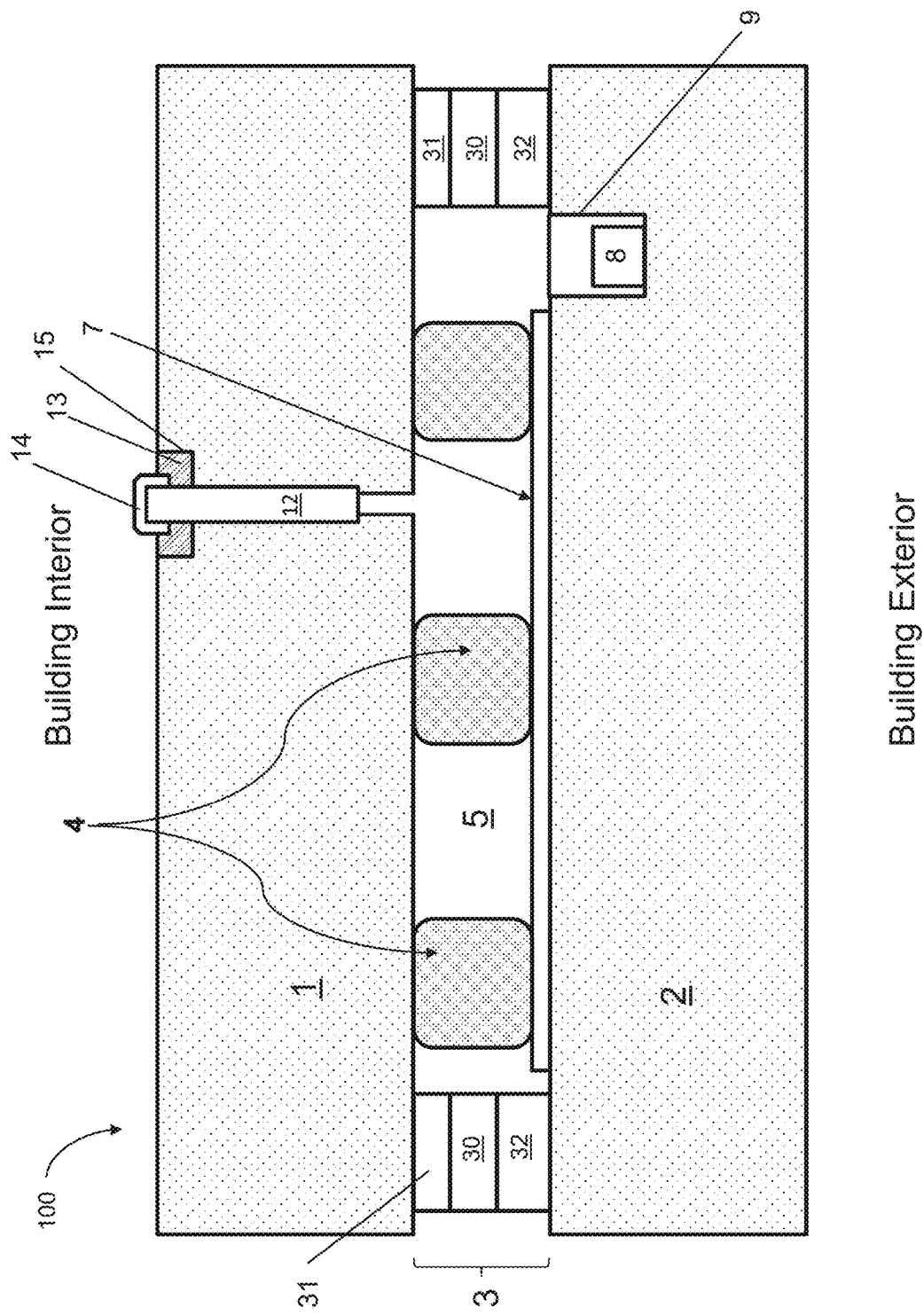
FIG. 3 is a side cross sectional view of a vacuum insulating unit/panel according to an example embodiment.

Referring to FIGS. 1-7, each vacuum insulating panel 100 may include a first substrate 1 (e.g., glass substrate), a second substrate 2 (e.g., glass substrate), a hermetic edge seal 3 at least partially provided proximate the edge of the panel 100, and a plurality (e.g., an array) of spacers 4 provided between at least the substrates 1 and 2 for spacing the substrates from each other and so as to help provide low-pressure space/gap 5 between at least the substrates. Each glass substrate 1, 2 may be flat, or substantially flat, in certain example embodiments. Support spacers 4, sometimes referred to as pillars, may be of any suitable shape (e.g., round, oval, disc-shaped, square, rectangular, rod-shaped, etc.) and may be of or include any suitable material such as stainless steel, aluminum, ceramic, solder glass, metal, and/or glass. Certain example support spacers 4 shown in the figures are substantially circular as viewed from above and substantially rectangular as viewed in cross section, and may have rounded edges. The hermetic edge seal 3 may include one or more of main seal layer 30, upper primer layer 31, and lower primer layer 32. Each "layer" herein may comprise one or more layers. At least one thermal control and/or solar control coating 7, such as a multi-layer low-emittance (low-E) coating, may be provided on at least one of the substrates 1 and 2 in order to further improve insulating properties of the panel. The solar control coating 7 may be provided on substrate 1 or substrate 2, or such a solar control coating may be provided on both substrates 1 and 2. For example, FIGS. 1-3 and 6 illustrate such a coating 7 (e.g., low-E coating) provided on substrate 2, whereas FIGS. 4-5 illustrate the coating 7 provided on substrate 1. Each substrate 1 and 2 is preferably of or including glass, but may instead be of other material such as plastic or quartz. For example, one or both glass substrates 1 and 2 may be soda-lime-silica based glass substrates, borosilicate glass substrates, lithia aluminosilicate glass substrates, or the like, and may be clear or otherwise tinted/colored such as green, grey, bronze, or blue tinted. Substrates 1 and 2, in certain example embodiments, may each have a visible transmission of at least about 40%, more preferably of at least about 50%, and most preferably of from about 60-80%. The vacuum insulating panel 100, in certain example embodiments, may have a visible transmission of at least 40%, more preferably of at least 50%, and most preferably of at least 60%. The substrates 1 and 2 may be substantially parallel (parallel plus/minus ten degrees, more preferably plus/minus five degrees) to each other in certain example embodiments. Substrates 1 and 2 may or may not have the same thickness, and may or may not be of the same size and/or same material, in various example embodiments. When glass is used for substrates 1 and 2, each of the glass substrates may be from about 2-12 mm thick, more preferably from about 3-8 mm thick, and most preferably from about 4-6 mm thick. When glass is used for substrates 1 and 2, the glass may or may not be tempered (e.g., thermally tempered). Although thermally tempered glass substrates are desirable in certain environments, the glass substrate(s) may be heat strengthened. As known in the art, thermal tempering of glass typically involves heating the glass to a temperature of at least 585 degrees C., more preferably to at least 600 degrees C., more preferably to at least 620 degrees C. (e.g., to a temperature of from about 6209-650 degrees C.), and then rapidly cooling the heated glass so as to compress surface regions of the glass to make it stronger. The glass substrates may be thermally tempered to increase compressive surface stress and to impart safety glass properties including small fragmentation upon breakage. When tempered glass substrates 1 and/or 2 are used, the substrate(s) may be tempered (e.g., thermally or chemically tempered) prior to firing/sintering of main edge seal material 30 (e.g., via laser) to form the edge seal 3.

When heat strengthened glass substrates 1 and/or 2 are used, the substrate(s) may be heat strengthened prior to firing/sintering of the main edge seal material 30 (e.g., via laser) to form the edge seal 3. When a vacuum insulated glass panel/unit has one tempered glass substrate and one heat strengthened substrate, the substrate(s) may be tempered (e.g., thermally or chemically tempered) and heat strengthened prior to firing/sintering of the main edge seal material 30 (e.g., via laser) to form the edge seal 3.

In various example embodiments, each vacuum insulating panel 100, still referring to FIGS. 1-7, optionally may also include at least one sorption getter 8 (e.g., at least one thin film getter) for helping to maintain the vacuum in low pressure space 5 by using reactive material for soaking up and/or bonding to gas molecules that remain in space 5, thus providing for sorption of gas molecules in low pressure space 5. The getter 8 may be provided directly on either glass substrate 1 or 2, or may be provided on a low-E coating 7 in certain example embodiments. In certain example embodiments, the getter 8 may be laser-activated and/or activated using inductive heating techniques, and/or may be positioned in a trough/recess 9 that may be formed in the supporting substrate (e.g., substrate 2) via laser etching, laser ablating, and/or mechanical drilling.

A vacuum insulating panel 100 may also include a pump-out tube 12 used for evacuating the space 5 to a pressure(s) less than atmospheric pressure, where the elongated pump-out tube 12 may be closed/sealed after evacuation of the space 5. Pump-out seal 13 may be provided around tube 12, and a cap 14 may be provided over the top of the tube 12 after it is sealed. Tube 12 may extend part way through the substrate 1, for example part way through a double countersink hole drilled in the substrate as shown in FIGS. 1-6. However, tube 12 may extend all the way through the substrate 1 in alternative example embodiments. Pump-out tube 12 may be of any suitable material, such as glass, metal, ceramic, or the like. In certain example embodiments, the pump-out tube 12 may be located on the side of the vacuum insulating panel 100 configured to face the interior of the building when the panel is used in a commercial and/or residential window. In certain example embodiments, the pump-out tube 12 may instead be located on the side of the vacuum insulating panel 100 configured to face the exterior of the building. The pump-out tube 12 may be provided in an aperture defined in either substrate 1 or 2 in various example embodiments. Pump-out seal 13 may be of any suitable material. In certain example embodiments, the pump-out seal 13 may be provided in the form of a substantially donut-shaped pre-form which may be positioned in a recess 15 formed in a surface of the substrate 1 or 2, so as to surround an upper portion of the tube 12, so that the pre-form can be laser treated/fired/sintered (e.g., after formation of the edge seal 3) to provide a seal around the pump-out tube 12. Alternatively, the pump-out seal 13 may be of any suitable material and/or may be dispensed in paste and/or liquid form to surround at least part of the tube 12 and may be sealed before and/or after evacuation of space 5. The pump-out seal material 13 may be directly applied to the glass substrate material or to a primer layer applied to the glass substrate surface prior to the pump-out seal material being applied to the substrate, in certain example embodiments. After evacuation of space 5, the tip of the tube 15 may be melted via laser to seal same, and hermetic sealing of the space 5 in the panel 100 can be provided both by the edge seal 3 and by the sealed upper portion of the pump-out tube 12 together with seal 13 and/or cap 14. In certain example embodiments, as shown in FIGS. 1-7 for example, the elongated pump-out tube 12 may be substantially perpendicular (perpendicular plus/minus ten degrees, more preferably plus/minus five degrees) to the substrates 1 and 2. Any of the elements/components shown in FIGS. 1-7 may be omitted in various example embodiments.

The evacuated gap/space 5 between the substrates 1 and 2, in the vacuum insulating panel 100, is at a pressure less than atmospheric pressure. For example, after the edge seal 3 has been formed, the cavity 5 evacuated to a pressure less than atmospheric pressure, and the pump-out tube 12 closed/sealed, the gap 5 between at least the substrates 1 and 2 may be at a pressure no greater than about $1.0 \times 10^{-2}$ Torr, more preferably no greater than about $1.0 \times 10^{-3}$ Torr, more preferably no greater than about $1.0 \times 10^{-4}$ Torr, and for example may be evacuated to a pressure no greater than about $1.0 \times 10^{-6}$ Torr. The gap 5 may be at least partially filled with an inert gas in various example embodiments. In certain example embodiments, the evacuated vacuum gap/space 5 may have a thickness (in a direction perpendicular to planes of the substrates 1 and 2) of from about 100-1,000 μm, more preferably from about 200-500 μm, and most preferably from about 230-350 μm. Providing a vacuum in the gap/space 5 is advantageous as it reduces conduction and convection heat transport, so as to reduce temperature fluctuations inside buildings and the like, thereby reducing energy costs and needs to heat and/or cool buildings. Thus, panels 100 can provide high levels of thermal insulation.

Example low-emittance (low-E) coatings 7 which may be used in the vacuum insulating panel 100 are described in U.S. Pat. Nos. 5,935,702, 6,042,934, 6,322,881, 7,314,668, 7,342,716, 7,632,571, 7,858,193, 7,910,229, 8,951,617, 9,215,760, and 10,759,693, the disclosures of which are all hereby incorporated herein by reference in their entireties. Other low-E coatings may also, or instead, be used. A low-E coating 7 typically includes at least one IR reflecting layer (e.g., of or including silver, gold, or the like) sandwiched between at least first and second dielectric layer(s) of or including materials such as silicon nitride, zinc oxide, zinc stannate, and/or the like. A low-E coating 7 may have one or more of: (i) a hemispherical emissivity/emittance of no greater than about 0.20, more preferably no greater than about 0.04, more preferably no greater than about 0.028, and most preferably no greater than about 0.015, and/or (ii) a sheet resistance ($R_s$) of no greater than about 15 ohms/square, more preferably no greater than about 2 ohms/square, and most preferably no greater than about 0.7 ohms/square, so as to provide for solar control. In certain example embodiments, the low-E coating 7 may be provided on the interior surface of the glass substrate to be closest to the building exterior, which is considered surface two (e.g., see FIGS. 2-3), whereas in other example embodiments the low-E coating 7 may be provided on the interior surface of the glass substrate to be closest to the building interior, which is considered surface three (e.g., see FIGS. 4-5).

FIG. 1 illustrates an embodiment where the edge seal 3 is provided in the vacuum insulated glass panel 100 at the absolute edge, the seal layers 30, 31 and 32 all have substantially the same width (e.g., between about 6 mm and 12 mm), and a thickness of the main seal layer 30 is less than a thickness of primer layer 31 but greater than a thickness of the other primer layer 32. FIG. 2 illustrates an embodiment where the edge seal 3 is spaced inwardly from the absolute edge of the panel 100, the width of the main seal layer 30 is less than a width(s) of the primer layers 31 and 32, and a thickness of the main seal layer 30 is greater than a thickness of primer layer 31 but less than a thickness of the other primer layer 32. FIG. 3 illustrates an embodiment where the edge seal 3 is spaced inwardly from the absolute edge of the panel 100, the seal layers 30, 31 and 32 all have substantially the same width (e.g., between about 6 mm and 12 mm), and the seal layers 30, 31 and 32 all have substantially the same thickness. FIG. 4 illustrates an embodiment where the edge seal 3 is spaced inwardly from the absolute edge of the panel 100, the width of the main seal layer 30 is less than a width(s) of the primer layers 31 and 32, a thickness of the main seal layer 30 is greater than a thickness of primer layer 31 but less than a thickness of primer layer 32, and the low-E coating 7 is provided on substrate 1 (as opposed to the low-E coating being on substrate 2 in FIGS. 1-3). FIG. 5 illustrates an embodiment similar to FIG. 4, except that primer layer 31 is omitted in the FIG. 5 embodiment. FIG. 6 provides an example where a laser beam 40 from laser 41 is being used to heat the edge seal structure for sintering/firing the main seal layer 30 to form the hermetic edge seal 3, and FIG. 7 is a top view illustrating the laser beam 40 proceeding around the entire periphery of the panel along path 42 over the edge seal layers 30-32 to fire/sinter the main edge seal layer 30 in forming the hermetic edge seal 3. The laser beam 40 performs localized heating of the edge seal area, so as to not unduly heat certain other areas of the panel thereby reducing chances of significant de-tempering of the glass substrates. Each of these embodiments may be used in combination with any other embodiment described herein, in whole or in part.

Edge seal 3, which may include one or more of ceramic layers 30-32, may be located proximate the periphery or edge of the vacuum insulated panel 100 as shown in FIGS. 1-7. Edge seal 3 may be a ceramic edge seal in certain example embodiments. Referring to FIGS. 1-6, in certain example embodiments, layer 30 of the edge seal may be considered a main or primary seal layer, and layers 31 and 32 may be considered primer layers. One or more of seal layers 30-32, of the edge seal 3, may be of or include ceramic frit in certain example embodiments, and/or may be lead-free or substantially lead-free (e.g., no more than about 15 ppm Pb, more preferably no more than about 5 ppm Pb, even more preferably no more than about 2 ppm Pb) in certain example embodiments. In certain example embodiments, each primer layer 31 and 32 may be of a material having a coefficient of thermal expansion (CTE) that is between that of the main seal layer 30 and the closest glass substrate 1, 2. For example, referring to FIGS. 1-4, primer layers 31 and 32 may each have a CTE (e.g., from about 8.0 to $8.8 \times 10^{-6}$ mm/(mm*deg. C.), more preferably from about 8.3 to $8.6 \times 10^{-6}$ mm/(mm*deg. C.)) which is between a CTE (e.g., from about 8.7 to $9.3 \times 10^{-6}$ mm/(mm*deg. C.), more preferably from about 8.8 to $9.2 \times 10^{-6}$ mm/(mm*deg. C.)) of the adjacent float glass substrate 1 and a CTE (e.g., from about 7.0 to $7.9 \times 10^{-6}$ mm/(mm*deg. C.), more preferably from about 7.2 to $7.9 \times 10^{-6}$ mm/(mm*deg. C.), with an example being about $7.6 \times 10^{-6}$ mm/(mm*deg. C.)) of the main seal layer 30. The main seal layer 30 may have a CTE of at least 15% less than CTE(s) of the glass substrate(s) 1 and/or 2 in certain example embodiments. Thus, the multi-layer edge seal 3, via primer(s) 31 and/or 32, may provide for a graded CTE from the main seal 30 moving toward each glass substrate 1, 2, which provides for improved bonding of the edge seal to the glass and a more durable resulting vacuum insulating panel 100 such as capable of surviving exposure to asymmetric thermal loading and/or wind loads in the end application. The main seal layer 30, in certain example embodiments, need not contain significant amounts of CTE filler material (although it may contain significant amounts of filler in other example embodiments), which can result in an improved hermetic edge seal 3 and durability. A primer(s) 31 and/or 32 may be omitted in certain example embodiments. In certain example embodiments, primer layers 31 and 32 may be of or include different material(s) compared to the main seal layer 30.

In certain example embodiments, before and/or after sintering/firing, one or both primer layer(s) 31 and/or 32 may have a melting point (Tm) higher than the melting point of the main seal layer 30. For example, in certain example embodiments, one or both primer layers 31 and/or 32 may have a melting point (Tm) of from about 500-750 degrees C. (more preferably from about 575-680 degrees C., and most preferably from about 600-650 degrees C.), whereas the main seal layer 30 may have a lower melting point (Tm) of from about 300 to 450 degrees C. (more preferably from about 350-430 degrees C., and most preferably from about 380-420 degrees C. or from about 390-410 degrees C.). In certain example embodiments, one or both of the primer layers 31 and/or 32 may have a melting point (Tm) at least 100 degrees C. higher, more preferably at least 150 degrees C. higher, and most preferably at least 200 degrees C. higher, than the melting point of the main seal material 30. For purposes of example, in an example embodiment the main seal layer 30 may have a melting point of from about 390-410 degrees C. or from about 390-395 degrees C., whereas the primer layers 31 and 32 may each have a melting point of from about 585-625 degrees C. or from about 610-625 degrees C. In certain example embodiments, before and/or after sintering/firing, one or both primer layer(s) 31 and/or 32 may have a transition point (Tg) higher than the transition point of the main seal layer 30. For example, in certain example embodiments, before and/or after sintering/firing, one or both primer layer(s) 31 and/or 32 may have a transition point of from about 400-600 degrees C. (more preferably from about 425-550 degrees C., and most preferably from about 450 to 510 degrees C.), whereas the main seal layer 30 may have a lower transition point of from about 200 to 350 degrees C. (more preferably from about 230-330 degrees C., and most preferably from about 260 to 310 degrees C.). In a similar manner, in certain example embodiments, before and/or after sintering/firing, one or both primer layer(s) 31 and/or 32 may have a softening point (Ts) higher than the softening point of the main seal layer 30. For example, in certain example embodiments, one or both primer layer(s) 31 and/or 32 may have a softening point of from about 425-650 degrees C. (more preferably from about 475-620 degrees C., and most preferably from about 520 to 590 degrees C.), whereas the main seal layer 30 may have a lower softening point of from about 220 to 410 degrees C. (more preferably from about 270-380 degrees C., and most preferably from about 300 to 340 degrees C.). In certain example embodiments, before and/or after sintering/firing, one or both of the primer layer(s) 31 and/or 32 may have a softening point (Ts) at least 100 degrees C. higher, more preferably at least about 150 degrees C. higher, and most preferably at least about 150 or 200 degrees C. higher, than the softening point (Ts) of the main seal layer material 30. For purposes of example, in an example embodiment the main seal layer 30 may have a softening point of from about 310-330 degrees C., whereas the primer layers 31 and 32 may each have a softening point of from about 540-560 degrees C. For purposes of example, in an example embodiment the main seal layer 30 may have a melting point of from about 390-395 degrees C., whereas the primer layers 31 and 32 may each have a melting point of from about 610-625 degrees C. These feature(s) advantageously may allow each high melting point primer layers 31 and 32 to provide strong mechanical bonding with the supporting glass substrate (1 and/or 2) via sintering/firing in a first bulk heating step in an oven or other heater (e.g., heating above the melting point and/or softening point of the primer(s) while thermally tempering the glass substrate 1, 2 on which the primer is provided), and thereafter sintering/firing the lower melting point main seal material 30 in a different second heating step (e.g., via laser) to bond the main seal layer 30 to the previously sintered/fired primers 31 and 32 and form the edge seal 3 without significantly de-tempering the glass substrates. Thus, the main seal layer 30 and primers 31 and 32 can be sintered/fired in different heating steps, in a manner which allows thermal tempering of the glass substrates 1 and 2 when sintering/heating the primers on the respective glass substrates, and which allows the main seal layer 30 to thereafter be sintered and bonded to the primers 31 and 32 without significantly de-tempering the glass substrates 1 and 2. This advantageously results in more efficient processing, reduction in damage (e.g., micro-cracking, adhesive failure, cohesive failure, and/or significant de-tempering), and a more durable and longer lasting vacuum insulating panel with much of its temper strength retained allowing for example compliance with industry safety testing for bag impact and/or point impact fragmentation.

The edge seal 3, in certain example embodiments, may be located at an edge-deleted area (where the solar control coating 7 has been removed) of the substrate as shown in FIGS. 1-6. Thus, the edge seal 3 may be positioned so that it does not overlap the low-E coating 7 in certain example embodiments. The edge seal 3 may be located at the absolute edge of the panel 100 (e.g., FIG. 1), or may be spaced inwardly from the absolute edge of the panel 100 as shown in FIGS. 2-7 and 9, in different example embodiments. An outer edge of the hermetic edge seal 3 may be located within about 50 mm, more preferably within about 25 mm, and more preferably within about 15 mm, of an outer edge of at least one of the substrates 1 and/or 2. Thus, an "edge" seal does not necessarily mean that the edge seal 3 is located at the absolute edge or absolute periphery of a substrate(s) or overall panel 100.

The low-E coating 7 may be edge deleted around the periphery of the entire unit so as to remove the low-e coating material from the coated glass substrate. The low-E coating 7 edge deletion width (edge of glass to edge of low-E coating 7), in certain example embodiments, in at least one area may be from about 0-100 mm, with examples being no greater than about 6 mm, no greater than about 10 mm, no greater than about 13 mm, no greater than about 25 mm, with an example being about 16 mm. In certain example embodiments, there may be a gap between the primer seal layers 31 and 32 and/or main layer 30, and the low-E coating 7, of at least about 0.5 mm, more preferably a gap of at least about 1.0 mm, and for example a gap of at least about 5 mm so that the low-E coating 7 is not contiguous with the main seal layer 30 and/or the primer seal layers 31 and 32.

Figure 18:
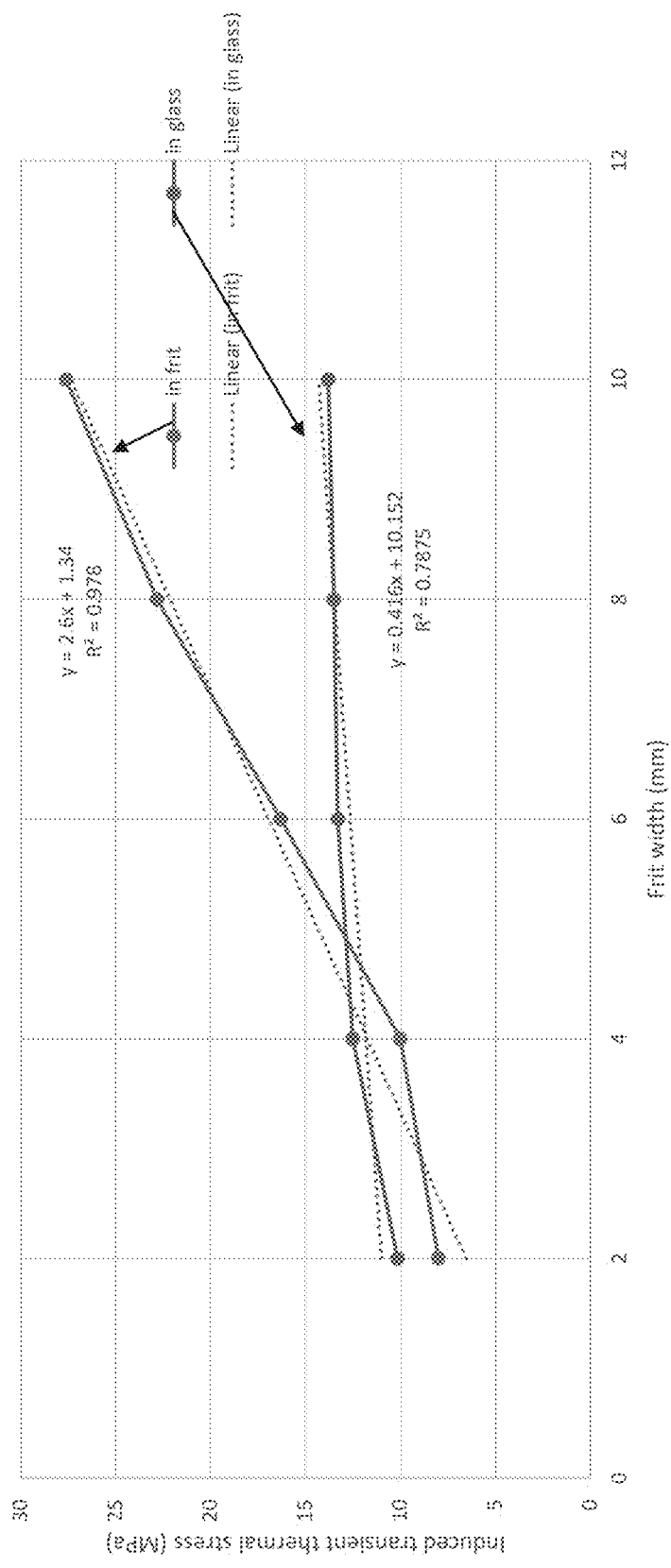
FIG. 18 is a graph plotting width of the main seal layer (mm) vs. induced transient thermal stress (MPa) in the main seal layer and glass substrate, after sintering of the main seal layer using the main seal and primer materials shown in FIGS. 11-14, which may be used in combination with any embodiment herein including those of FIGS. 1-9, 11-17, 19-31.

It has surprisingly and unexpectedly been found that adjusting the width (as viewed from above and/or in cross-section) of the main seal layer 30, of the edge seal, can be technically advantageous. It has been found that when the main seal layer 30 is too wide, this results in undesirably high induced transient thermal stress in the main seal layer 30 which can lead to seal failures (e.g., one or more of moisture vapor transmission, mechanical failure, adhesive failure, and/or cohesive failure) and a non-durable product. FIG. 18 is a graph plotting main seal layer 30 width (mm) vs. induced transient thermal stress (MPa) in the main seal layer 30 and glass substrate 1 and/or 2, after firing/sintering of the main seal layer 30. It can be seen in FIG. 18 that by making the main seal layer 30 narrower (smaller or reduced width), induced transient thermal stress in the layer 30 (and possibly the glass substrate) can be reduced which allows one to realize fast production times in combination with reduced chances of micro-cracking of the edge seal and/or adhesive or cohesive delamination problems. For example, FIG. 18 illustrates that a main seal layer 30 having a width "W" (e.g., see "W" in FIG. 9) of 6 mm realized an induced transient thermal stress of about 16-17 MPa, whereas a main seal layer 30 having a width "W" of 10 mm realized a higher induced transient thermal stress of about 28 MPa (the lower the induced transient thermal stress, the better). Reduced width of the main seal layer 30 can also improve U-value/U-factor performance of panel 100. FIGS. 2, 4, 7 and 9, for example, illustrate that the main edge seal layer 30 has a width less than the width of one or both of the adjacent primer layers 31 and 32. For example, see the width "W" of the main seal layer 30 in FIG. 9. In an example embodiment, the width of the main seal layer 30 may be about 6 mm.

It has also surprisingly and unexpectedly been found that adjusting the width (as viewed from above and/or in cross-section) of one or both of the primer layers 31 and/or 32 can be technically advantageous. For example, see the width "Wp" of the primer layer 32, and the width "W" of the main seal layer 30, in FIG. 9; primer layer 31 may have a width similar to the width Wp of primer layer 32 in certain example embodiments. It has surprisingly been found that when the primer layers 31 and 32 are too narrow (e.g., Wp is too small), defects such as fish scales, glass micro-cracking, or the like, tend to occur in the final product which can lead to seal failures and/or a non-durable product. Thus, by making one or both of the primer layers 31 and/or 32 wider, induced transient thermal stress, defects and seal failures can be reduced. It is believed that the primer layers 31 and 32 may act as heat sinks during laser sintering/firing of the main seal layer 30, thereby allowing heat to be dissipated from the glass and the main seal layer, and thus induced stress and/or de-tempering to be reduced. Thus, wider primer layers allow more heat to be dissipated during the laser sintering/firing process of the main seal layer 30, thereby resulting in less glass substrate and seal layer defects, and less de-tempering of the glass substrate(s). Wider primer layers 31 and/or 32 also may advantageously block or reduce some ultraviolet (UV) radiation from reaching the main seal layer 30 and interacting with residual carbon in the main seal layer 30. Moreover, if the primer layer(s) 31 and/or 32 is/are made too narrow, this can reduce the bonding area resulting in edge seal failures for that reason such as during a lap shear strength test. FIGS. 2, 4, 7 and 9, for example, illustrate that the main edge seal layer 30 has a width "W" less than the width (e.g., "Wp") of the adjacent primer layers 31 and 32. In an example embodiment, the width of the main seal layer 30 may be about 6 mm and the width of the primer layers 31 and 32 may be about 10 mm, so that the width of one or both of the primer layers is greater than the width of the main seal layer (e.g., see FIGS. 2, 4, 5, 7 and 9). In certain example embodiments, the width of the ceramic sealing glass primer layer 31 may be about 8 mm, the width of the ceramic sealing glass primer layer 32 may be about 8 mm, and the width of the ceramic main seal layer 30 may be about 6 mm or about 3-4 mm.

Thus, in certain example embodiments and referring to FIGS. 1-7 and 9 for example, in the manufactured vacuum insulating panel 100, the main seal layer 30 of the edge seal 3 may have an average width W of from about 2-20 mm, more preferably from about 4-10 mm, more preferably from about 4-8 mm, still more preferably from about 5-7 mm, and with an example main seal layer 30 average width being about 6 mm; and/or one or both of the primer layers 31 and 32 may have an average width Wp of from about 2-20 mm, more preferably from about 6-14 mm, more preferably from about 8-12 mm, still more preferably from about 9-11 mm, and with an example primer average width being about 10 mm. In certain example embodiments, the respective width(s) of each layer 30, 31, and 32 may be substantially the same (the same plus/minus 10%, more preferably plus/minus 5%) along the length of the edge seal 3 around the periphery of the entire panel 100. In certain example embodiments, the ratio Wp/W of the width Wp of one or both primer layers 31, 32 to the width W of the main seal layer 30 may be from about 1.2 to 2.2, more preferably from about 1.4 to 1.9, and most preferably from about 1.5 to 1.8 (e.g., the ratio Wp/W is 1.67 when a primer layer 31 and/or 32 is 10 mm wide and the main seal layer 30 is 6 mm wide: 10/6=1.67). In certain example embodiments, one or both primer layers 31 and/or 32 is/are at least about 1 mm wider, more preferably at least about 2 mm wider, and most preferably at least about 3 mm wider, than the main seal layer 30 at one or more locations around the periphery of the panel 100 and possibly around the entire periphery of the panel. These desirable widths for ceramic seal layers 30-32 in the panel 100 may be appropriate when using the materials for seal layers 30-32 discussed herein (e.g., see FIGS. 11-14), and may be adjusted in an appropriate manner if different seal materials are instead used which is possible in certain example embodiments. Other widths for one or more of seal layers 30-32, not discussed herein, may be used in various other example embodiments.

Figure 9:
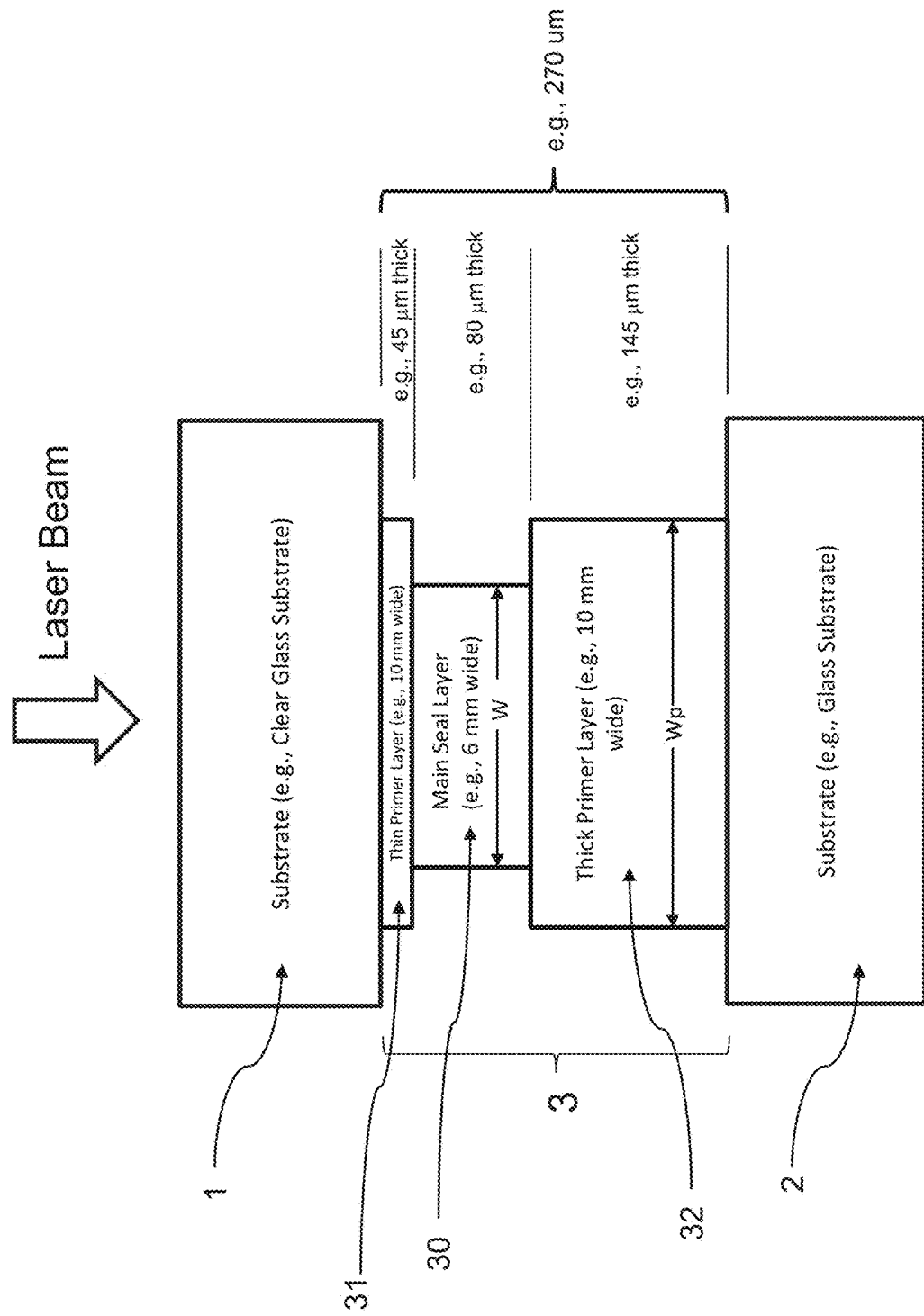
FIG. 9 is a side cross sectional view of an example edge seal for a vacuum insulating unit/panel according to an example embodiment, taken at the edge of a panel, with example layer thicknesses, which may be used in combination with any embodiment herein including those of FIGS. 1-8, 11-31.

In certain example embodiments, as viewed from above and/or in cross-section as shown in FIG. 9 for example, the lateral edge(s) 30a and/or 30b of the main seal layer 30 may be spaced inwardly an offset distance "D" from the respective lateral edges of the primer seal layer 31 and/or the primer seal layer 32 on each side of the main seal layer 30. In certain example embodiments, the offset distance "D" on one or both sides of the main seal layer 30 may be from about 0.5 to 6.0 mm, more preferably from about 0.5 to 3.0 mm, more preferably from about 0.5 to 2.5 mm, more preferably from about 1.0 to 2.5 mm, and most preferably from about 1.5 to 2.5 mm, with an example being about 2.0 mm on each side, although the offset distance "D" may be different on the left and right sides of the main seal layer as viewed in FIG. 9 for example. In certain example embodiments, the offset distance "D" on one or both sides of the main seal layer 30 may be at least about 0.5 mm, more preferably at least about 1.0 mm, and most preferably at least about 1.5 mm, as shown in FIG. 9 for example. See also FIGS. 2, 4 and 6.

The multi-layer edge/perimeter seal 3 stack may be designed regarding one or more of moisture vapor transmission rate, hydrogen transmission rate, oxygen transmission rate, mechanical strength, thermal expansion, thermal diffusivity (TD), and/or thermal conductivity (TC). For example, the main seal layer 30 may be narrower in width than at least one primer to reduce thermal conductance between the opposing substrates. For example, thermal conductivity of soda lime silicate float glass (e.g., which may be used for one or more of the substrates 1, 2) may be about 1.11 W/mK. In certain example embodiments, layer 30 may have a lower thermal conductivity than traditional amorphous glass materials, e.g., 0.88 W/mK versus 1.10 W/mK. In certain example embodiments, one or both of the ceramic sealing primer layers 31-32 of the edge seal 3 may have a thermal conductivity(ies) of from about 1.00 to 1.90, or from about 1.40 W/mK to 1.80 W/mK, with an example being about 1.60 W/mK, which may be higher than the thermal conductivity of the glass substrates 1 and 2. Certain example embodiments may provide a ratio: TCml<TCg<TCpl, where TCml is the thermal conductivity of the main seal layer 30, TCg is the thermal conductivity of one or more of the glass substrates 1 and/or 2, and TCpl is the thermal conductivity of one or both primer layers 31 and/or 32. This ratio arrangement may advantageously improve the end of glass U-factor when reducing width(s) of a seal layer(s) (e.g., compared to a traditional 12 mm width), so as to optimize the volumetric amount(s) of one or more of the edge seal layer(s) for improving the overall U-factor of the glazing.

Regarding the thickness of the edge seal 3, it has surprisingly and unexpectedly been found that adjusting the physical thickness of the main seal layer 30 can be technically advantageous. It has been found that when the main seal layer 30 is too thick, this can result in significant de-tempering of the glass substrate(s) 1 and/or 2 (e.g., due to increased thermal heating and/or lasing time), hermiticity problems with the edge seal 3, and/or cohesive strength problems (e.g., due to reduction in density with firing/sintering of the main seal layer 30), which can lead to seal failures and a non-durable product. For example, if the main seal layer 30 is too thick, there would be too much material for a laser to create sufficient heat to fuse/sinter and provide adequate bonding to the glass substrate(s) and/or primer layer(s). And if one were to heat such a thick layer long enough via laser to generate sufficient heat for sintering, this may significantly degrade seal density which may result in one or more of seal failures (e.g., from one or more of water exposure, moisture vapor transmission, hydrogen and/or oxygen permeation, asymmetric thermal shock and/or wind load) and a non-durable product, cause excessive heat which may lead to significant glass de-tempering, cause excess heat to crack the glass (e.g., fish scales), and/or take too long to be commercially viable from a commercial cost point of view. On the other hand, if the main seal layer 30 is too thin, this may cause bonding problems and/or increase the manufacturing cost of the panel. FIGS. 1-2, 4, 6, and 9, for example, illustrate that the main seal layer 30 may have a thickness which is: (a) less than a thickness of adjacent primer layer 32, and (b) greater than a thickness of the other adjacent primer layer 31. For example, see the example 80 μm thickness of the main seal layer 30 in FIG. 9, which is: (a) less than the example 145 μm thickness of adjacent primer layer 32, and (b) greater than the example 45 μm thickness of the other adjacent primer layer 31. In the FIG. 9 example embodiment, the total thickness of the overall edge seal is about 270 μm.

A vacuum insulating panel was built with a 270 μm edge seal 3 made of only a main seal layer 30 (no primers were used), so that the layer 30 directly contacted both glass substrates. The main seal layer 30 was made of the ceramic tellurium (Te) oxide-based seal material shown in FIGS. 11-12 and 14. Unfortunately, this edge seal failed. This edge seal suffered from separation from the glass substrates at multiple locations around the unit, indicating failure and loss of vacuum. The defects included fish scaling from the laser, adhesive delamination associated with the main seal layer 30. Thus, it has been found that using a 240-280 μm thick edge seal made of only the main seal layer material shown in FIGS. 11-12 and 14 is prone to failure and high manufacturing costs.

However, this same ceramic tellurium (Te) oxide-based seal material shown in FIGS. 11-12 and 14 provides for excellent results when its thickness is reduced and it is used as a main seal layer 30 together with at least one primer(s) 31 and/or 32 of different material(s). For example, see FIGS. 1-6 and 9. Reducing the thickness of this material and using it as a main seal layer 30, together with primer(s) 31 and/or 32, has solved the aforesaid problems of separation, delamination, significant de-tempering, seal failure, and significant fish scaling. In certain example embodiments, it has been found that a main seal layer 30 (e.g., of the main seal material shown in FIGS. 11-12, 14) having a thickness of from about 30-120 μm, more preferably from about 40-100 μm, and most preferably from about 50-85 μm, provides for excellent results and a durable vacuum insulating panel 100 (e.g., see FIGS. 1-6 and 9).

It has also surprisingly and unexpectedly been found that adjusting the physical thickness of one or both of the primer layer(s) 31 and/or 32 can be technically advantageous. The primers 31-32 may be made of opaque or semi-opaque material, so that some of the laser beam 40 is blocked from reaching layer 30 during firing/sintering, with the amount blocked being based on the thickness of the primer 31 in the FIG. 6 embodiment for instance. Thus, it may be desirable to make the primer layer 31 thinner, so that more of the laser beam 40 can pass throughout and accomplish sintering of the main seal layer 30. On the other hand, the beam 40 need not pass through primer layer 32, and it would be desirable to make primer layer 32 thicker because it does not have a bearing on the laser beam 40, and so that it can provide good adhesion and act as a better heat sink during sintering/firing of layer 30.

Thus, in certain example embodiments and referring to FIGS. 1-7 and 9 for example, in the manufactured vacuum insulating panel 100, the main seal layer 30 of the edge seal 3 may have an average thickness of from about 30-120 μm, more preferably from about 40-100 μm, and most preferably from about 50-85 μm, with an example main seal layer 30 average thickness being from about 60-80 μm as shown in FIG. 9. In certain example embodiments, in the manufactured vacuum insulating panel 100, the primer layer 31 of the edge seal 3 may have an average thickness of from about 10-80 μm, more preferably from about 20-70 μm, and most preferably from about 20-55 μm, with an example primer layer 31 average thickness being about 45 μm as shown in FIG. 9. In certain example embodiments, in the manufactured vacuum insulating panel 100, the primer layer 32 (opposite the side from which the laser beam 40 is directed) of the edge seal 3 may have an average thickness of from about 100-220 μm, more preferably from about 120-200 μm, and most preferably from about 120-170 μm, with an example primer layer 32 average thickness being about 145 μm as shown in FIG. 9. In certain example embodiments, the thickness of the main seal layer 30 may be at least about 30 μm thinner (more preferably at least about 45 μm thinner) than the thickness of the primer seal layer 32, and may be at least about 10 μm thicker (more preferably at least about 20 μm, and more preferably at least about 30 μm thicker) than the thickness of the primer seal layer 31. In certain example embodiments, in the manufactured vacuum insulating panel 100, the overall average thickness of the edge seal 3 may be from about 150-330 μm, more preferably from about 200-310 μm, and most preferably from about 240-290 μm, with an example overall edge seal 3 average thickness being about 270 μm as shown in FIG. 9. In certain example embodiments, the respective thicknesses of each layer 30, 31, and 32 are substantially the same (the same plus/minus 10%, more preferably plus/minus 5%) along the length of the edge seal 3 around the periphery of the entire panel 100.

In certain example embodiments, a vacuum insulating panel 100 having an improved multi-layer perimeter seal structure 3 provides for improved manufacturing of tempered units using localized laser firing and/or methods of making the same. A first ceramic sealing glass material 31 may acts as primer layer, $t_1$, a second ceramic sealing glass material 32 may act as a second primer layer, $t_2$, and a third ceramic sealing glass material 30 with a thickness, $t_3$, may be applied onto the first sealing glass material and seals together the vacuum insulating unit using localized laser sintering and melting of the third ceramic sealing glass material. In certain example embodiments, such layer thicknesses may be characterized by $t_3=t_2<t_1$ or $t_2<t_3<t_1$. In certain example embodiments, ceramic sealing glass material for primer layer 31 is semi-transparent to laser energy (e.g., 808 or 810 nm energy) due to the limited thickness of the thin primer layer, and may have a physical thickness from about 10 μm to about 80 μm with a preferred thickness of about 40 μm. The overall perimeter seal 3 thickness can range between about 100-400 μm, more preferably from 150-330 μm, with an example total thickness of about 270 or 280 μm. The thickness of the ceramic sealing glass primer layer 32 may can range from about 100-250 or 100-220 μm, with an example thickness of about 145 or 200 μm. The thickness of the other ceramic sealing glass primer layer 31 may range between about 10-100 or 10-80 μm, with an example thickness of about 40 or 45 μm. The thickness of the main seal layer 30 may range from about 10-100 μm or 30-120 μm, with an example thickness of about 40 or 45 μm. The primer layer 31 and/or main seal layer 30 may be designed and optimized to have a high thermal diffusivity to transfer heat from the laser source through the primer layer 31 and main seal layer 30 to fully sinter the main sealing layer 30 and wet the interfaces between the main layer 30 and opposing primer layers 31-32.

In certain example embodiments, in the manufactured vacuum insulating panel 100, the ratio $T_M/T_{P1}$ of the thickness $T_M$ of the main seal layer 30 to the thickness $T_{P1}$ of thin primer layer 31 may be from about 1.2 to 2.2, more preferably from about 1.4 to 2.0, and most preferably from about 1.5 to 1.9 (e.g., the ratio $T_M/T_{P1}$ is 1.78 when a primer layer 31 is 45 μm thick and the main seal layer 30 is 80 μm thick as shown in FIG. 9: 80/45=1.78). In certain example embodiments, in the manufactured vacuum insulating panel 100, the ratio $T_M/T_{P2}$ of the thickness $T_M$ of the main seal layer 30 to the thickness $T_{P2}$ of the primer layer 32 may be from about 0.25 to 0.90, more preferably from about 0.40 to 0.75, and most preferably from about 0.45 to 0.65 (e.g., the ratio $T_M/T_{P2}$ is 0.55 when a primer layer 32 is 145 μm thick and the main seal layer 30 is 80 μm thick as shown in FIG. 9: 80/145=0.55). In certain example embodiments, in the manufactured vacuum insulating panel 100, the ratio $T_M/T_S$ of the thickness $T_M$ of the main seal layer 30 to the total thickness Ts of the overall edge seal 3 may be from about 0.15 to 0.60, more preferably from about 0.20 to 0.50, and most preferably from about 0.25 to 0.35 (e.g., the ratio $T_M/T_S$ is 0.30 when the overall seal 3 is 270 μm thick and the main seal layer 30 is 80 μm thick as shown in FIG. 9: 80/270=0.30). These thicknesses for ceramic seal layers 30-32 in the panel 100 may be appropriate when using the materials for seal layers 30-32 discussed herein (e.g., see FIGS. 11-14), and may be adjusted in an appropriate manner such as if different seal materials are instead used which is possible in certain example embodiments. Other thicknesses for layers 30-32, not discussed herein, may be used in various other example embodiments.

In various example embodiments, laser 41 may be selected to emit a laser beam 40 having a wavelength (λ) of from about 550 nm to 1064 nm, more preferably from about 780-1064 nm. Laser 41 may be a near IR laser in certain example embodiments. Laser 41 may be a continuous wave laser, a pulsed laser, and/or other suitable laser in various example embodiments. In various example embodiments, the laser 41 may be a scanning laser system comprising diode, ND:YAG, $CO_2$ and/or other laser devices/sources. In certain example embodiments, laser 41 may emit a laser beam 40 at or having a wavelength of about 800 nm, 808 nm, 810 nm, 940 nm, or 1090 nm (e.g., YVO4 laser). In certain example embodiments, more than one laser may be utilized to increase the sealing speed, lower effective laser power levels and/or reduce laser spot size. Two lasers operating in a serial, overlapping manner can increase the effective irradiation spot time to achieve for example 0.5 seconds while achieving for example a 20 mm per second linear laser rate, as an example. Two 9-mm laser diameter beams 40, for example, can operate in a serial fashion for a 0.5 second to 1.0 second irradiation time.

FIGS. 11-12 and 14 illustrate an example material(s) that may be used for the main seal layer 30 in various example embodiments, including for example in any of the embodiments of FIGS. 1-9. However, other suitable materials (vanadium oxide based ceramic materials with little or no Te oxide, solder glass, or the like) may instead be used for layer 30 in various example embodiments. FIG. 11 is a table/graph showing weight % and mol % of various compounds/elements in an example main seal 30 material, prior to sintering of layer 30, according to an example embodiment (measured via non-carbon detecting XRF); FIG. 12 is a table/graph showing weight % and mol % of various compounds/elements in an example main seal 30 material according to an example embodiment (measured via carbon detecting XRF), before and after laser treatment/sintering of the main seal layer 30 for edge seal formation; and the left side of FIG. 14 sets forth a table/graph showing an elemental analysis (non-oxide analysis) of weight % and mol % of various elements in an example main seal 30 material, before and after laser treatment for edge seal formation. Regarding FIG. 14, X-ray Fluorescence (XRF) is a non-destructive technique that can identify and quantify the elemental constituents of a sample using the secondary fluorescence signal produced by irradiation with high energy x-rays, and wavelength dispersive spectrometer (WDXRF) is capable of detecting elements from atomic number (Z) 4 (beryllium) through atomic number 92 (uranium) at concentrations from the low parts per million (ppm) range up to 100% by weight.

This ceramic tellurium (Te) oxide based main seal material, shown in FIGS. 11-12 and 14, was used for main seal layer 30 in examples tested for obtaining data herein for various figures/tables unless otherwise specified. This ceramic tellurium (Te) oxide based main seal material, shown in FIGS. 11-12 and 14, for example may be considered to have a melting point (Tm) of 390 or 395 degrees C., a softening point (Ts) of 320 degrees C., and a glass transition point (Tg) of 290 degrees C.

Table 1A sets forth example ranges for various elements and/or compounds for this example tellurium (Te) oxide based main seal 30 material according to various example embodiments, for both mol % and weight %, prior to firing/sintering thereof and thus prior to hermetic edge seal 3 formation. In certain example embodiments, the main seal layer 30 may comprise mol % and/or wt. % of the following compounds in one or more of the following orders of magnitude: tellurium oxide>vanadium oxide>aluminum oxide, tellurium oxide>vanadium oxide>silicon oxide, tellurium oxide>vanadium oxide>aluminum oxide>magnesium oxide, and/or tellurium oxide>vanadium oxide>silicon oxide>magnesium oxide, before and/or after firing/sintering of the layer 30. It will be appreciated that other materials may be used together, or in place of, those shown below, and that the example percentages may be different in alternate embodiments.

TABLE 1A (example material for main seal layer 30 prior to firing/sintering)

|  | General (Mol %) | More Preferred (Mol %) | Most Preferred (Mol %) | General (Wt. %) | More Preferred (Wt. %) | Most Preferred (Wt. %) |
|---|---|---|---|---|---|---|
| Tellurium oxide (e.g., $TeO_4$ and/or other stoichiometry) | 20-60% or 40-90% | 25-50% or 40-70% | 30-42% | 20-70% | 30-65% | 40-55% |
| Vanadium oxide (e.g., $VO_2$ and/or other stoichiometry) | 5-45% or 5-58% | 10-30% or 5-37% | 15-21% | 5-50% | 8-38% | 18-28% |
| Aluminum oxide (e.g., $Al_2O_3$ and/or other stoichiometry) | 0-45% or 1-25% | 5-30% or 6-25% | 10-20% | 0-45% | 5-30% | 10-20% |
| Silicon oxide (e.g., $SiO_2$ and/or other stoichiometry) | 0-50% or 0-5% | 10-30% | 15-25% | 0-50% | 3-30% | 5-20% |
| Magnesium oxide (e.g., MgO and/or other stoichiometry) | 0-50% or 0-10% | 3-30% | 5-15% | 0-50% | 1-12% | 2-7% |

TABLE 1A-continued (example material for main seal layer 30 prior to firing/sintering)

|  | General (Mol %) | More Preferred (Mol %) | Most Preferred (Mol %) | General (Wt. %) | More Preferred (Wt. %) | Most Preferred (Wt. %) |
|---|---|---|---|---|---|---|
| Barium oxide (e.g., BaO and/or other stoichiometry) | 0-20% | 0-10% | 0.10-5% | 0-20% | 0-10% | 0.10-5% |
| Manganese oxide (e.g., MnO and/or other stoichiometry) | 0-20% | 0-10% | 0.50-5% | 0-20% | 0-10% | 0.50-5% |

Tellurium Vanadate based and/or inclusive glasses (including tellurium oxide and vanadium oxide), such as those in Table 1A, in certain example embodiments are ideally suited for the main seal functionality when utilizing laser irradiation for the firing/sintering of the main seal layer 30. The base main seal material may comprise tellurium oxide (e.g., a combination of $TeO_3$, $TeO_{3+1}$, and $TeO_4$) and vanadium oxide (e.g., a combination of $V_2O_5$, $VO_2$, and $V_2O_3$) per the weight % and/or mol % described in Table 1A. In certain example embodiments, it may be desirable to have a higher amount of tellurium oxide compared to vanadium oxide, in order to increase the material density in the sintered state and thus improve hermiticity of the seal. With respect to main seal material(s) in Table 1A for the main seal layer 30, the Te oxide (e.g., one or more of $TeO_4$, $TeO_3$, $TeO_{3+1}$, and/or other stoichiometry(ies) involving Te and O) and V oxide (e.g., one or more of $VO_2$, $V_2O_5$, $V_2O_3$, and/or other stoichiometry(ies) involving V and O) in the material may be made up of about the following stoichiometries before/after sintering as shown below in Table 1B (tellurium oxide stoichiometries prior to firing/sintering), Table 1C (tellurium oxide stoichiometries after firing/sintering), Table 1D (vanadium oxide stoichiometries prior to firing/sintering), Table 1E (vanadium oxide stoichiometries after firing/sintering), respectively, measured via XPS.

TABLE 1B (example stoichiometries of Te oxide in material for main seal layer 30 prior to laser firing/sintering)

|  | General | More Preferred | Most Preferred | Example |
|---|---|---|---|---|
| $TeO_4$ | 35-85% | 45-70% | 55-60% | 57% |
| $TeO_3$ | 20-65% | 30-55% | 35-45% | 42% |
| $TeO_{3+1}$ | 0-15% | 0.2-7% | 0.5-3% | 1% |

TABLE 1C (example stoichiometries of Te oxide in material for main seal layer 30 after laser firing/sintering)

|  | General | More Preferred | Most Preferred | Example |
|---|---|---|---|---|
| $TeO_4$ | 3-35% | 5-25% | 10-20% | 14% |
| $TeO_3$ | 60-95% or 50-95% | 70-90% | 78-85% | 81% |
| $TeO_{3+1}$ | 0-15% | 1-9% | 3-7% | 5% |

TABLE 1D (example stoichiometries of V oxide in material for main seal layer 30 prior to laser firing/sintering)

|  | General | More Preferred | Most Preferred | Example |
|---|---|---|---|---|
| $V_2O_5$ | 50-97% | 70-95% | 80-90% | 84% |
| $VO_2$ | 5-35% | 10-20% | 12-18% | 15% |
| $V_2O_3$ | 0-15% | 0.2-7% | 0.5-3% | 1% |

TABLE 1E (example stoichiometries of V oxide in material for main seal layer 30 after laser firing/sintering)

|  | General | More Preferred | Most Preferred | Example |
|---|---|---|---|---|
| $V_2O_5$ | 5-45% | 10-35% | 20-30% | 25% |
| $VO_2$ | 35-85% | 50-75% | 58-67% | 63% |
| $V_2O_3$ | 2-30% | 6-20% | 9-15% | 12% |

For example, the "Example" column in Table 1B indicates that 57% of the Te present in the material prior to sintering/firing was in an oxidation state of $TeO_4$, 42% of the Te present in the material prior to sintering/firing was in an oxidation state of $TeO_3$, and 1% of the Te present in the material prior to sintering/firing was in an oxidation state of $TeO_{3+1}$. And the "Example" column in Table 1C indicates that after the laser firing/sintering of the main seal layer 30 just 14% of the Te present in the main seal layer 30 material was in an oxidation state of $TeO_4$, but 81% of the Te present in the material was in an oxidation state of $TeO_3$, and 5% of the Te present in the material prior to sintering/firing was in an oxidation state of $TeO_{3+1}$. Accordingly, in certain example embodiments, it will be appreciated that the laser firing/sintering of the main seal layer 30 may cause much of the $TeO_4$ to transform/convert into $TeO_3$ and $TeO_{3+1}$, which is advantageous because it increases the material's absorption in the near infrared (e.g., 808 or 810 nm for example, which may be used for the laser during sintering/firing) which provides for increased heating efficiency and reducing the chances of significantly de-tempering the glass substrate (s) due to improved heating efficiency during the firing/sintering.

Figure 30:
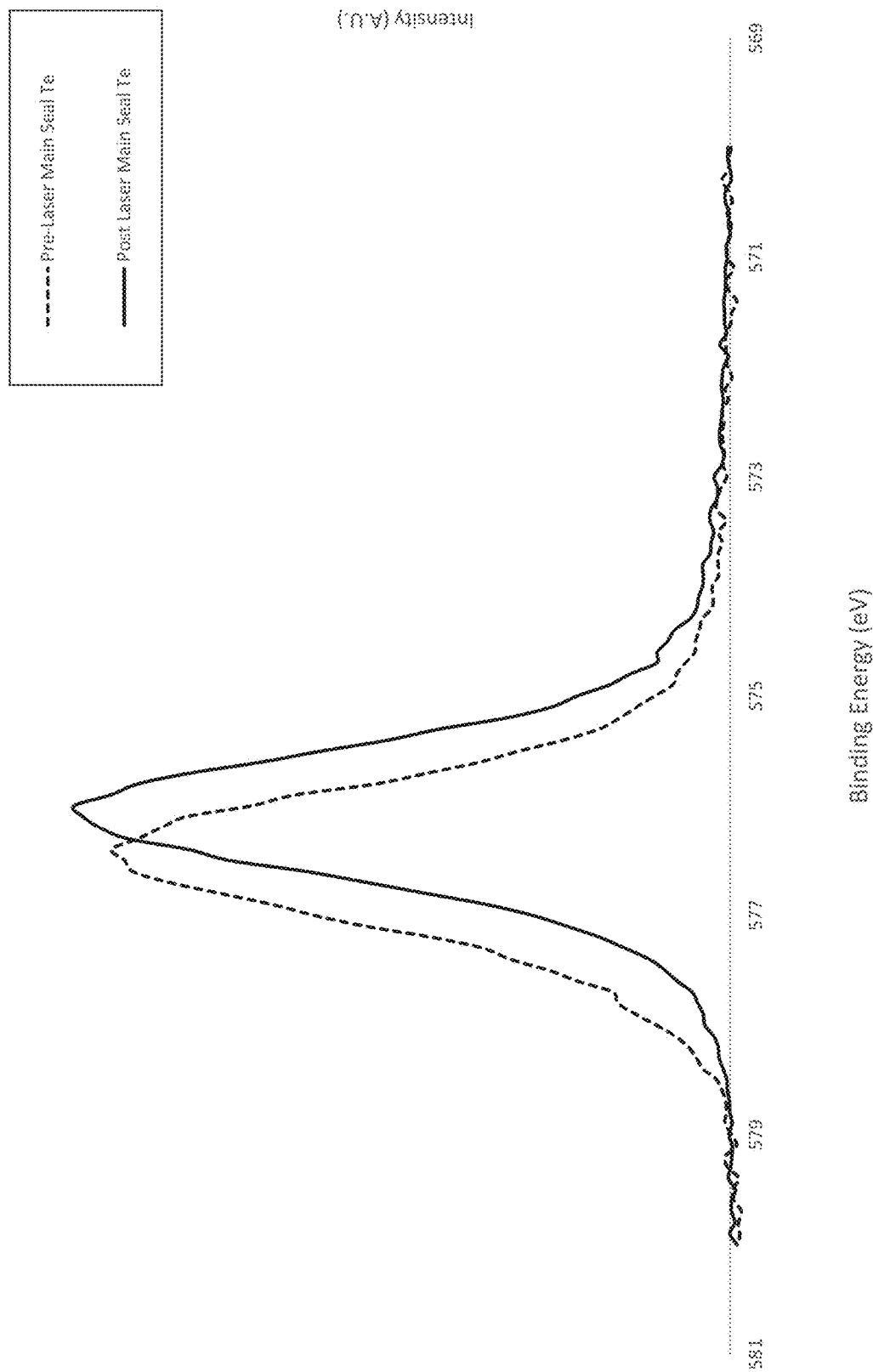
FIG. 30 is a Binding Energy (eV) vs. Intensity graph illustrating the shift in binding energy for Te in the main seal layer caused by laser sintering/firing thereof, which may be used in combination with any embodiment herein.

Regarding Tables 1B-1C, FIG. 30 is a Binding Energy (eV) vs. Intensity graph illustrating the shift in binding energy for Te in the main seal layer 30 caused by laser sintering/firing thereof according to an example embodiment. It can be seen that the laser sintering/firing led to a distinct shift in binding energy associated with Te in main seal layer 30. A binding energy shift toward depolymerized tellurite structures. The laser sintering/firing of the main seal layer 30 also caused the binding energy peak for V to shift in a distinct manner, corresponding to a reduction of $V^{5+}$ to $V^{4+}/V^{3+}$ in the main seal layer 30. For example, in certain example embodiments, the laser sintering/firing of the main seal layer 30 may cause at least one of in the main seal layer 30: (a) a binding energy shift of the Te peak of at least about 0.15 eV, more preferably of at least about 0.20 eV, and most preferably of at least about 0.25 or 0.30 eV, which resulted in the stoichiometry changes discussed in Tables 1B-1C and the related advantages discussed above, and/or (b) a binding energy shift of the V peak of at least about 0.10 eV, more preferably of at least about 0.15 eV, which resulted in the stoichiometry changes discussed in Tables 1D-1E and the related advantages discussed above. In contrast, in certain example embodiments, the laser sintering/firing of the preform seal 13 for the pump-out tube seal did not result in a distinct binding energy shift of the Te peak or the V peak for preform 13, demonstrating that not all laser sintering/firing techniques have such an effect.

In certain example embodiments, prior to firing/sintering, the material for the main seal layer 30 may include tellurium oxide with the following stoichiometry/oxidation state ratio (s) in terms of what oxidation state(s) are used by the Te in the material (e.g., see Table 1B): $TeO_4 > TeO_3 > TeO_{3+1}$. But the laser sintering/firing of the main seal layer may then cause the Te stoichiometry ratios/states to change to the following during/after sintering/firing: $TeO_3 > TeO_4 > TeO_{3+1}$, which is advantageous in vacuum insulating panels as discussed above. The $TeO_4$ is a trigonal bipyramid structure, $TeO_3$ is a trigonal pyramid structure, and $TeO_{3+1}$ is a polyhedral structure. In certain example embodiments, due to optimized laser treatment for firing/sintering of the main seal layer as discussed herein, the $TeO_4$ largely converts to $TeO_3$ and marginally to $TeO_{3+1}$ with increasing temperature with a concurrent increase in the number of Te=O sites resulting from cleavage within the network structure. Tellurium oxide may have, for example, a Tg of about 305 degrees C., a crystallization temperature (Tx) of about 348 degrees C., and a Tm about 733 degrees C.

For example, the "Example" column in Table 1D indicates that 84% of the V present in the material prior to sintering/firing was in an oxidation state of $V_2O_5$, 15% of the V present in the material prior to sintering/firing was in an oxidation state of $VO_2$, and 1% of the V present in the material prior to sintering/firing was in an oxidation state of $V_2O_3$. And the "Example" column in Table 1E indicates that after the laser firing/sintering of the main seal layer just 25% of the V present in the main seal layer 30 material was in an oxidation state of $V_2O_5$, but 63% of the V present in the material was in an oxidation state of $VO_2$, and 12% of the V present in the material prior to sintering/firing was in an oxidation state of $V_2O_3$. The other columns in Tables 1B-1E represent the same, with different values as shown. Accordingly, in certain example embodiments, it will be appreciated that the laser firing/sintering of the main seal layer 30 may cause much of the $V_2O_5$ to transform/convert into $VO_2$ and $V_2O_3$, which is advantageous because it increases the material's density and thus the hermiticity and durability of the seal (e.g., $VO_2$ results in a more dense layer than does $V_2O_5$). In certain example embodiments, it is desirable to reduce the $V_2O_5$ content in the final sintered/fired state of the main seal 30 because the glass network becomes more closed with decreasing $V_2O_5$ concentration, e.g., due to the reduction of non-bridging oxygen resulting in a higher density seal which improves water/moisture resistance, mechanical strength (adhesive and cohesive), and/or hermeticity. The Tg of the main seal 30 material may also slightly increase with a reduction in $V_2O_5$.

In certain example embodiments, the vanadium oxide in the main seal layer material, before firing/sintering of the main seal layer 30, may include the following stoichiometry/ oxidation state ratio(s): $V_2O_5 > VO_2 > V_2O_3$. But the laser sintering/firing of the main seal layer 30 may then cause the V stoichiometry ratios/states to change to the following during/after sintering/firing: $VO_2 > V_2O_5 > V_2O_3$, which is advantageous in vacuum insulating panels as discussed at least because it allows for higher density in the final seal layer. The $V_2O_5$ is an orthorhombic structure, $VO_2$ is a tetragonal structure, and $V_2O_3$ is corundum structured in the monoclinic C2/c space group. Vanadium is an insulator in a base form due to empty d-bands and acts as a network former/network modifier in the presence of tellurium oxide in the main seal material for layer 30 and/or the pump-out tube seal in certain example embodiments. Vanadium oxide may have, for example, a Tg about 250 degrees C., a crystallization temperature (Tx) about 300 degrees C., and a Tm about 690 degrees C.

Figure 22:
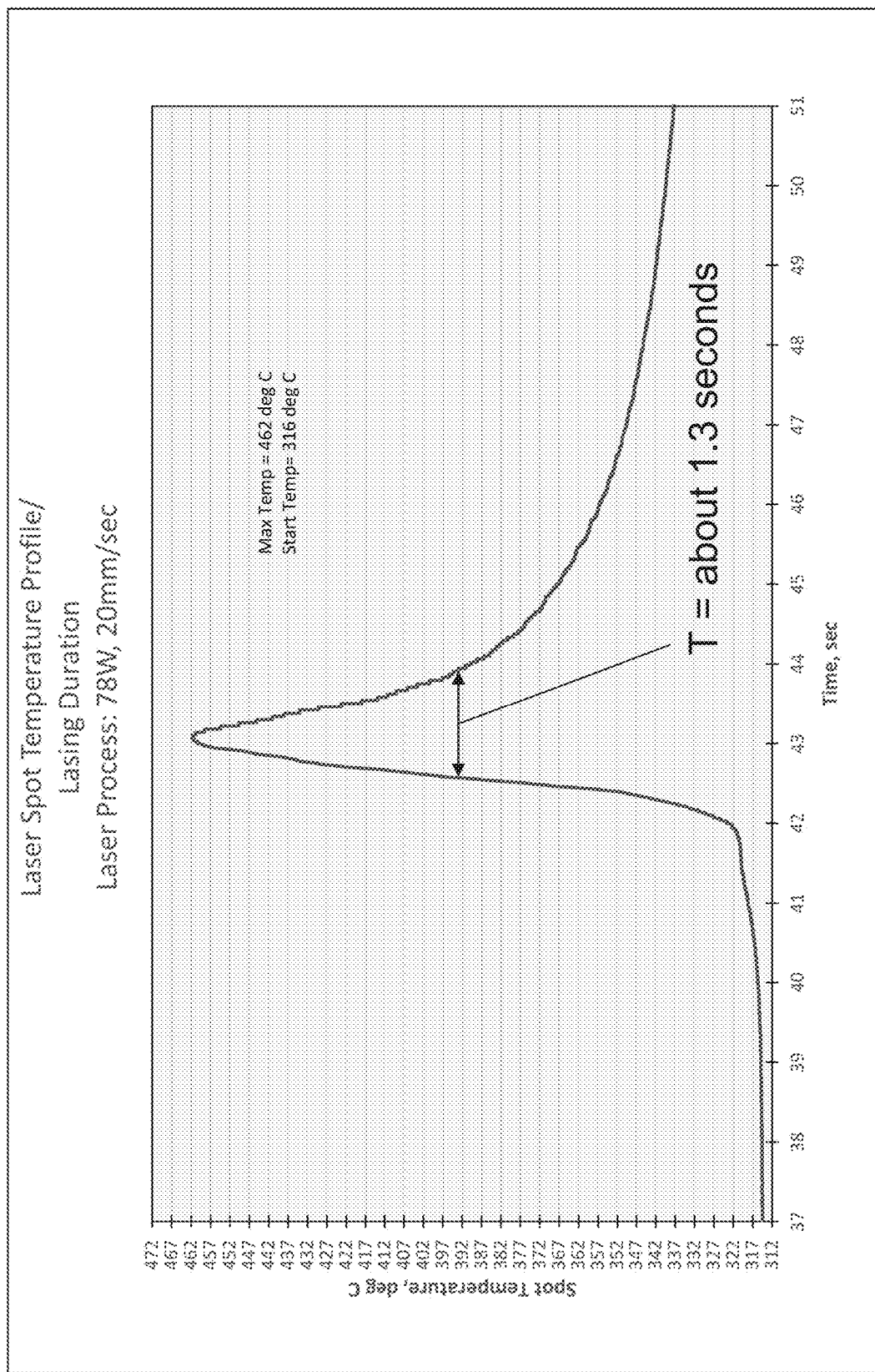
FIG. 22 is a Time (seconds) vs. Spot Temperature (degrees C.) graph plotting the temperature of a spot on the main seal layer during laser treatment thereof via an 808 nm or 810 nm continuous wave laser beam moving laterally at 20 mm/s when the main seal layer is being fired/sintered to form the edge seal, which may be used in combination with any embodiment herein including those of FIGS. 1-9, 11-20, 23-31.

Thus, from Tables 1B-1E, FIG. 12, and FIG. 30, it will be appreciated that in certain example embodiments an optimized type of laser processing (e.g., 808 or 810 nm continuous wave laser using the process in FIG. 22 and a laser beam size of about 6 mm, following a pre-heat to about 300-320 degrees C.) may be used to sinter/fire the main seal layer 30 in a manner that causes one or more, or any combination, of the following to occur during and/or as a result of the sintering/firing: (a) stoichiometry values/oxidation states of Te in the layer to change from $TeO_4 > TeO_3 > TeO_{3+1}$ prior to laser firing/sintering, to $TeO_3 > TeO_4 > TeO_{3+1}$ following laser firing/sintering of the layer 30; (b) stoichiometry values/oxidation states of Te in the layer to change from $TeO_4 > TeO_3$ prior to laser firing/ sintering, to $TeO_3 > TeO_4$ following laser firing/sintering of the layer 30; (c) stoichiometry values/oxidation states of vanadium (V) in the layer to change from $V_2O_5 > VO_2 > V_2O_3$ prior to laser firing/sintering, to $VO_2 > V_2O_5 > V_2O_3$ after laser firing/sintering of the layer 30; (d) stoichiometry values/oxidation states of V in the layer to change from $V_2O_5 > VO_2$ prior to laser firing/sintering, to $VO_2 > V_2O_5$ after laser firing/sintering of the layer 30; (e) the ratio $TeO_4:TeO_3$ to change from about 1.0 to 2.0 (more preferably from about 1.2 to 1.6, more preferably from about 1.3 to 1.5) prior to sintering/firing to from about 0.05 to 0.40 (more preferably from about 0.10 to 0.30, more preferably from about 0.13 to 0.22) after the laser sintering/firing of the layer 30; (f) the ratio $V_2O_5:VO_2$ to change from about 1.0 to 10.0 (more preferably from about 3.0 to 8.0, more preferably from about 4.5 to 7.0, with an example being 84:15=5.66) prior to sintering/firing to from about 0.10 to 0.90 (more preferably from about 0.20 to 0.80, more preferably from about 0.25 to 0.50, with an example being 25:63=0.39) after the laser sintering/firing of the layer 30; (g) a binding energy shift of the Te peak of at least about 0.15 eV, more preferably of at least about 0.20 eV, and most preferably of at least about 0.25 or 0.30 eV; and/or (h) a binding energy shift of the V peak of at least about 0.10 eV, more preferably of at least about 0.15 eV.

This main seal material(s) from Table 1 and FIGS. 11-12, 14, or substantially the same material, may also be used for the pump-out tube seal 13, with or without a primer, in certain example embodiments, although other types of seals may also be used such as vanadium oxide based ceramic sealing glass or solder glass. Other compounds may also be provided in this main seal 30 material, including but not limited to, on a weight and/or mol basis, for example one or more of: 0-15% (more preferably 1-10%) tungsten oxide; 0-15% (more preferably 1-10%) molybdenum oxide; 0-60% (or 38-52%) zinc oxide; 0-15% (more preferably 0-10%) copper oxide, and/or other elements shown in the figures.

Table 2 sets forth example ranges for various elements and/or compounds for this example tellurium oxide-based material for main seal layer 30 according to various example embodiments, for both mol % and weight %, after firing/sintering thereof and thus after hermetic edge seal 3 formation. It will be appreciated that other materials may be used together, or in place of, those shown below, and that the example percentages may be different in alternate embodiments.

TABLE 2

(example material for main seal layer 30 after laser firing/sintering)

| | General (Mol %) | More Preferred (Mol %) | Most Preferred (Mol %) | General (Wt. %) | More Preferred (Wt. %) | Most Preferred (Wt. %) |
|---|---|---|---|---|---|---|
| Tellurium oxide (e.g., TeO$_3$ and/or other stoichiometry) | 20-60% or 40-90% | 38-70% | 50-60% | 20-80% | 40-70% | 50-65% |
| Vanadium oxide (e.g., VO$_2$ and/or other stoichiometry) | 5-45% or 5-58% | 8-30% or 5-37% | 20-25% | 10-50% | 12-40% | 25-30% |
| Aluminum oxide (e.g., Al$_2$O$_3$ and/or other stoichiometry) | 0-45% or 1-25% | 5-30% or 6-25% | 8-20% | 0-45% | 3-30% | 5-15% |
| Silicon oxide (e.g., SiO$_2$ and/or other stoichiometry) | 0-50% or 0-5% | 3-30% | 5-20% | 0-50% | 1-25% | 1-10% |
| Magnesium oxide (e.g., MgO and/or other stoichiometry) | 0-50% or 0-10% | 0.1-20% | 0.5-5% | 0-50% | 0.1-12% | 0.2-5% |
| Barium oxide (e.g., BaO and/or other stoichiometry) | 0-20% | 0-10% | 0-5% | 0-20% | 0-10% | 0-5% |
| Manganese oxide (e.g., MnO and/or other stoichiometry) | 0-20% | 0-10% | 0.50-5% | 0-20% | 0-10% | 0.50-5% |

This material from Tables 1-2 and FIGS. 11-12, 14 may also be used for the pump-out tube seal 13, with or without a primer, in certain example embodiments, although other types of seals may also be used such as vanadium oxide based ceramic sealing glass or solder glass. Other compounds may also be provided in or for this main seal 30 material, including but not limited to, on a weight or mol basis, for example one or more of: 0-15% (more preferably 1-10%) tungsten oxide; 0-15% (more preferably 1-10%) molybdenum oxide; 0-60% (or 38-52%) zinc oxide; 0-15% (more preferably 0-10%) copper oxide, and/or other elements shown in the figures. Certain elements may change during firing/sintering, and certain elements may at least partially burn off during processing prior to formation of the final edges seal 3.

Referring to FIG. 12, it can be seen, for example, that the wt. % of aluminum oxide (e.g., Al$_2$O$_3$ and/or other stoichiometry) in the main seal layer 30 material was 13.93% prior to laser sintering of the layer 30, but was 7.18% after laser sintering of the main seal layer 30. The same may apply if this material is used for the pump-out tube seal. Thus, the wt % of aluminum oxide (e.g., Al$_2$O$_3$ or other suitable stoichiometry) dropped 48% due to laser sintering of the main seal layer 30, presumably due to the spike in laser heating of the material for a short period of time during such laser treatment which appears to have created different oxidation rates than what one would see in a thermal oven with a much slower thermal ramp, lower temperatures and longer duration. In a similar manner, referring to the elemental analysis in FIG. 14, the wt. % of aluminum (Al) in the main seal layer 30 material was 8.43% prior to laser sintering of the layer 30, but was 4.89% after laser sintering of the main seal layer 30. Thus, the wt % of Al dropped 42% on an elemental basis due to the laser sintering of the main seal layer 30, again presumably due to the spike in laser heating of the material for a short period of time during such laser treatment. The same applied to the pump-out tube seal material, shown in the central section of FIG. 14. Referring to the elemental analysis in FIG. 14, the wt. % of aluminum (Al) in the pump-out tube seal layer 13 was 7.29% prior to laser sintering of the pump-out tube seal layer, but dropped to 4.63% after laser sintering of the pump-out tube seal layer 13. Thus, the wt % of Al dropped 36% on an elemental basis due to the laser sintering of the pump-out tube layer 13, again presumably due to the spike in laser heating of the material for a short period of time during such laser treatment. In certain example embodiments, optimized laser sintering may cause the wt % of aluminum oxide in main seal layer 30 and/or pump-out seal 13 (e.g., Al$_2$O$_3$ or other suitable stoichiometry) to decrease by at least about 20%, more preferably by at least about 30%, and most preferably by at least about 40%. And in certain example embodiments, optimized laser sintering may cause the wt % of elemental Al to decrease by at least about 20%, more preferably by at least about 30%, and most preferably by at least about 35%, in the main seal layer 30 and/or the pump-out tube seal layer 13. The final main seal material 30 and/or pump-out seal material may comprise from about 4-8% aluminum (on an elemental wt % basis), more preferably from about 4-6% or from about 3-5%. This is technically advantageous in that it results in a seal layer 30 and/or a pump-out tube seal layer 13 that is more dense, which reduces porosity and improves hermiticity and strength of the seal. In certain example embodiments, the laser processing of the seal material is designed to densify aluminum (and/or its compound(s)), thereby resulting for example in such a reduction in Al due to laser sintering in order to provide for improved seal density.

The same may apply to Mg for example, as shown in FIGS. 12 and 14. In certain example embodiments, processing including optimized laser sintering may cause the wt % of elemental Mg to decrease by at least about 20%, more preferably by at least about 50%, and most preferably by at least about 75%, in the main seal layer 30 and/or the pump-out tube seal layer 13. In certain example embodiments, processing including optimized laser sintering may cause the wt % of Mg oxide (MgO or other stoichiometry) to decrease by at least about 20%, more preferably by at least about 50%, and most preferably by at least about 75%, in the main seal layer 30 and/or the pump-out tube seal layer 13. The final main seal material 30 and/or pump-out seal 13 material may comprise from about 0.1-3% Mg (on an elemental wt % basis), more preferably from about 0.1-1.5%; and/or from about 0.1-3% Mg oxide (on a wt % basis), more preferably from about 0.1-1.5%, and most preferably from about 0.2 to 0.6%

In certain example embodiments, particle size for the material of the main seal layer 30 may be optimized for reduced particle size (e.g., for the D50 distribution) to improve material density and moisture resistance, and/or to improve thermal diffusivity. Traditional ceramic sealing glass materials have a D50 in the range of about 60.0 um to about 90.0 um which is acceptable for a thermal oven sintering process as an example, but has been found to experience some issues for laser processing. For laser processing, it has been found that improved results can be achieved by reducing particle size of the main seal layer 30. In certain example embodiments, the average D50 particle size and PSD mean may be significantly lower than traditional ceramic sealing glasses, as particle size is related to a thermal diffusivity rate of the ceramic sealing glass materials. Moreover, it has surprisingly been found that if the particle size is too large, then the density of the layer 30 tends to decrease and porosity tends to increase, and the layer becomes more susceptible to water and/or air leakage and seal failure. It has also been found that too large of a particle size may contribute to significant de-tempering of the glass during edge seal formation, e.g., due to increasing lasing temperature and/or duration. Thus, small particle size may be used for layer 30 (and one or more of layers 31-32) in certain example embodiments. In certain example embodiments, before and/or after edge seal formation, the main seal layer 30 may have an average particle/grain size (D50) of from about 5-25 μm, more preferably from about 5-20 μm, more preferably from about 5-15 μm, and most preferably from about 10-15 μm. These same particle sizes may also be used for one or both primer layers 31 and/or 32, and/or tube seal material 13, before and/or after firing/sintering.

In certain example embodiments, the material for the main seal layer 30 may include filler. The amount of filler may, for example, be from 1-25 wt. % and may have an average grain size (d50) of 5-30 μm, for example an average d50 grain size from about 5-20 μm, more preferably from about 5-15 μm, and most preferably less than about 10 μm. Mixtures of two or more grain size distributions (e.g., coarse: d50=15-25 μm and fine: d50=1-10 μm) may be used. The filler may, for example, comprise one or more of zirconyl phosphates, dizirconium diorthophosphates, zirconium tungstates, zirconium vanadates, aluminum phosphate, cordierite, eucryptite, ekanite, alkaline earth zirconium phosphates such as (Mg,Ca,Ba,Sr) $Zr_4 P_5 O_{24}$, either alone or in combination. Filler in a range of 20-25 wt. % may be used in layer 30 in certain example embodiments. Main seal layer 30, and/or the primer layer(s) 31 and/or 32, is/are lead-free and/or substantially lead-free in certain example embodiments.

Table 3 sets forth example ranges for various elements for this example tellurium oxide based main seal 30 material according to various example embodiments, using elemental analysis (non-oxide analysis) for both mol % and weight %, prior to firing/sintering thereof and thus prior to hermetic edge seal 3 formation. FIG. 14 also provides an elemental analysis for various example seal materials, including for Te oxide based main seal and/or pump-out tube seal layers 30 and 13. In certain example embodiments, the main seal layer 30 and/or the pump-out seal layer 13 may comprise mol % and/or wt. % of the following elements in one or more of the following orders of magnitude: Te>V>Al, Te>V>Si, Te>V>Al>Mg, Te>O>V, Te>O>V>Al, and/or Te>V>Si>Mg, before and/or after firing/sintering of the layer (e.g., see also FIG. 14). It will be appreciated that other materials may be used together, or in place of, those shown below, and that the example percentages may be different in alternate embodiments. The elemental Te/V ratio in the main seal layer 30 and/or seal layer 13, after sintering/firing and in terms of weight %, may be from about 1.5:1 to 5:1, more preferably from about 2:1 to 4:1, and most preferably from about 2.5:1 to 3.5:1. The elemental Te/Al ratio in the main seal layer 30 and/or seal layer 13, after firing/sintering thereof and in terms of weight %, may be from about 5:1 to 35:1, more preferably from about 8:1 to 20:1, and most preferably from about 9:1 to 15:1. The elemental Si/Mg ratio in the main seal layer 30 and/or seal layer 13, after firing/sintering thereof and in terms of weight %, may be from about 1:1 to 35:1, more preferably from about 2:1 to 10:1, and most preferably from about 3:1 to 7:1. It has been found that one or more of these ratios is technically advantageous for achieving desirable melting points, softening points, and/or thermal diffusivity.

TABLE 3

(elemental analysis - example main seal 30 material prior to firing/sintering)

|    | General (Mol %) | More Preferred (Mol %) | Most Preferred (Mol %) | General (Wt. %) | More Preferred (Wt. %) | Most Preferred (Wt. %) |
|----|----|----|----|----|----|----|
| Te | 5-40% | 8-25% | 10-20% | 20-70% | 30-60% | 40-50% |
| O  | 30-75% | 40-70% | 50-60% | 10-40% | 15-35% | 20-30% |
| V  | 3-30% | 5-15% | 7-13% | 5-40% | 10-25% | 12-17% |
| Al | 5-40% | 8-25% | 10-15% | 2-30% | 3-20% | 5-11% |
| Si | 2-30% | 3-15% | 5-10% | 1-20% | 2-10% | 3-7% |
| Mg | 0-15% | 1-7% | 1-5% | 20-70% | 30-60% | 40-50% |
| Mn | 0-20% | 0.1-5% | 0.5-2% | 0-20% | 0.1-5% | 0.5-2% |

This material may also be used for the pump-out seal 13, with or without a primer, in certain example embodiments, although other types of seals may also be used such as vanadium oxide based ceramic sealing glass or solder glass. Other compounds may also be provided in this material (e.g., see FIG. 14).

Table 4 sets forth example ranges for various elements for this example tellurium oxide based main seal 30 material according to various example embodiments, using elemental analysis (non-oxide analysis) for both mol % and weight %, after firing/sintering thereof and thus after formation of the hermetic edge seal 3 (e.g., see also FIG. 14). It will be appreciated that other materials may be used together, or in place of, those shown below, and that the example percentages may be different in alternate embodiments.

TABLE 4

(elemental analysis - example main seal 30 material after firing/sintering)

|    | General (Mol %) | More Preferred (Mol %) | Most Preferred (Mol %) | General (Wt. %) | More Preferred (Wt. %) | Most Preferred (Wt. %) |
|----|-----------------|------------------------|------------------------|-----------------|------------------------|------------------------|
| Te | 10-60%          | 20-40%                 | 25-30%                 | 20-90%          | 40-80%                 | 50-70%                 |
| O  | 20-60%          | 25-50%                 | 30-40%                 | 3-22%           | 5-16%                  | 7-12%                  |
| V  | 3-30%           | 5-15%                  | 7-13%                  | 5-40%           | 10-25%                 | 12-17%                 |
| Al | 3-40%           | 6-25%                  | 8-15%                  | 1-20%           | 2-12%                  | 4-8%                   |
| Si | 0.5-10%         | 1-6%                   | 2-4%                   | 0.5-10%         | 1-6%                   | 1-3%                   |
| Mg | 0-10%           | 0.1-5%                 | 0.5-3%                 | 0-10%           | 0.01-5%                | 0.1-3%                 |
| Mn | 0-20%           | 0.5-6%                 | 1-3%                   | 0-20%           | 0.5-6%                 | 1-3%                   |

This material may also be used for the pump-out seal 13, with or without a primer, in certain example embodiments, although other types of seals may also be used such as vanadium oxide based ceramic sealing glass or solder glass. Other compounds may also be provided in this material (e.g., see FIG. 14).

FIGS. 13-14 illustrate an example material(s) that may be used for the primer layer(s) 31 and/or 32 in various example embodiments, including for example in any of the embodiments of FIGS. 1-9. However, other suitable materials, such as solder glass, other materials comprising bismuth oxide, and so forth, may be used for one or both primer layers 31 and/or 32 in various example embodiments. FIG. 13 is a table/graph showing weight % and mol % of various compounds/elements in a primer seal 31 and/or 32 material according to an example embodiment (measured via carbon detecting XRF), before and after laser treatment for edge seal formation, which primer material may be used in combination with any embodiment herein (e.g., for one or both primer layers); and the right side of FIG. 14 sets forth a table/graph showing an elemental analysis (non-oxide analysis) of weight % and mol % of various elements in an example primer material, before and after laser treatment for edge seal formation. This primer material, shown in FIGS. 13-14, was used for primer layers 31 and 32 in examples tested for obtaining data herein for various figures/tables herein unless otherwise specified. This primer material, shown in FIGS. 13-14, for example may be considered to have a melting point (Tm) of 620 degrees C., a softening point (Ts) of 551 degrees C., and a glass transition point (Tg) of 486 degrees C.

Table 5 sets forth example ranges for various elements and/or compounds for this example primer material according to various example embodiments, for both mol % and weight %, prior to firing/sintering. In certain example embodiments, one or both of the primer layers 31 and/or 32 may comprise mol % and/or wt. % of the following compounds in one or more of the following orders of magnitude: boron oxide>bismuth oxide>silicon oxide, bismuth oxide>silicon oxide>boron, boron oxide>bismuth oxide>silicon oxide>titanium oxide, bismuth oxide>silicon oxide>boron oxide>titanium oxide, boron oxide>silicon oxide>titanium oxide>bismuth oxide, and/or silicon oxide>boron oxide>bismuth oxide, before and/or after formation of the hermetic edge seal 3. It will be appreciated that other materials may be used together, or in place of, those shown below, and that the example percentages may be different in alternate embodiments.

TABLE 5

(example primer material prior to firing/sintering

|  | General (Mol %) | More Preferred (Mol %) | Most Preferred (Mol %) | General (Wt. %) | More Preferred (Wt. %) | Most Preferred (Wt. %) |
|---|---|---|---|---|---|---|
| bismuth oxide (e.g., $Bi_2O_3$ and/or other stoichiometry) | 0.5-50% | 1-10% | 2-5% | 5-50% or 55-95% | 10-40% or 70-80% | 15-25% or 70-80% |
| boron oxide (e.g., $B_2O_3$ and/or other stoichiometry) | 10-50% | 20-40% | 25-35% | 10-50% | 20-40% | 25-35% |
| Silicon oxide (e.g., $SiO_2$ and/or other stoichiometry) | 0-50% or 0-15% | 5-30% or 5-15% | 15-25% | 0-50% | 5-30% | 15-25% |
| Titanium oxide (e.g., $TiO_2$ and/or other stoichiometry) | 0-20% | 1-10% | 3-7% | 0-20% | 1-10% | 3-7% |

It is noted that "stoichiometry" as used herein covers, for example, oxygen coordination and oxygen state. Other compounds may also be provided in the primer material (e.g., see FIGS. 13-14). For example, on a weight basis, the primer material for one or both layers 31 and/or 32 may further comprise one or more of: 2-20% (or 2-7%) zinc oxide; 0-15% (or 2-7%) aluminum oxide; 0-10% (or 0-5%) magnesium oxide; 0-10% (or 0-5%) chromium oxide; 0-10% (or 0-5%) iron oxide; carbon dioxide; and/or other elements shown in the figures.

Table 6 sets forth example ranges for various elements and/or compounds for this example primer layer 31 and/or 32 material according to various example embodiments, for both mol % and weight %, after firing/sintering thereof and after hermetic edge seal 3 formation. It will be appreciated that other materials may be used together, or in place of, those shown below, and that the example percentages may be different in alternate embodiments.

TABLE 6

(example primer material after edge seal formation)

|  | General (Mol %) | More Preferred (Mol %) | Most Preferred (Mol %) | General (Wt. %) | More Preferred (Wt. %) | Most Preferred (Wt. %) |
|---|---|---|---|---|---|---|
| bismuth oxide (e.g., $Bi_2O_3$ and/or other stoichiometry) | 0.5-50% | 1-12% | 4-9% | 5-70% or 55-95% | 20-50% or 70-80% | 30-40% or 70-80% |
| boron oxide (e.g., $B_2O_3$ and/or other stoichiometry) | 10-50% | 15-40% | 20-30% | 5-50% | 10-35% | 15-25% |
| Silicon oxide (e.g., $SiO_2$ and/or other stoichiometry) | 0-50% or 0-15% | 15-35% or 5-15% | 22-30% | 0-50% | 5-35% | 15-30% |
| Titanium oxide (e.g., $TiO_2$ and/or other stoichiometry) | 0-20% | 3-12% | 4-11% | 0-20% | 3-12% | 4-11% |

Other compounds may also be provided in this primer material, as discussed above and/or shown in the figures. Certain elements may change during firing/sintering, and certain elements may at least partially burn off during processing prior to formation of the final edges seal 3. It will be appreciated that, as with other layers discussed herein, other materials may be used together, or in place of, those shown above and/or below, and that the example weight/mol percentages may be different in alternate embodiments. The ceramic sealing glass primer materials for layer(s) 31 and/or 32 are lead-free and/or substantially lead-free in certain example embodiments.

In various example embodiments, materials for the ceramic sealing glass primer layers 31 and/or 32 may be selected to produce a high degree of hermeticity on the order of, for example, $10^{-8}$ cc/m$^2$ per day for air penetration and/or $10^{-8}$ cc/m2 per day for water penetration. Such a high degree of hermeticity may in part be achieved by reducing the PSD mean particle size (e.g., to less than about 20 μm, more preferably less than about 15 μm) and selecting a binder resin that burns out substantially uniformly to create a primer layer with a high degree of homogeneity. In certain example embodiments, one or both of the primer layers 31 and/or 32 may have one or more of: an average D50 particle size from about 2-15 μm (more preferably from about 3-8 μm), an average D10 from about 0.10-4.0 μm, an average D90 particle size from about 15-25 μm and an example of about 25 um, and/or an average D95 particle size less than about 30.0 μm.

Table 7 sets forth example ranges for various elements for the example primer material according to various example embodiments, using elemental analysis (non-oxide analysis) for both mol % and weight %, after firing/sintering thereof and thus after hermetic edge seal 3 formation. FIG. 14 also provides an elemental analysis for various example seal materials, including the primer material at the right side thereof. In certain example embodiments, one or both of primer layers 31 and/or 32 may comprise mol % of the following elements in one or more of the following orders of magnitude: B>Bi, O>B>Bi, O>B>C, O>B>Si>Bi, and/or B>Si>Bi>Ti, before and/or after firing/sintering of the layer and formation of the edge seal 3 (e.g., see also FIG. 14). It will be appreciated that other materials may be used together, or in place of, those shown below, and that the example percentages may be different in alternate embodiments.

TABLE 7

(elemental analysis - example primer material after firing/sintering and after edge seal formation)

|  | General (Mol %) | More Preferred (Mol %) | Most Preferred (Mol %) | General (Wt. %) | More Preferred (Wt. %) | Most Preferred (Wt. %) |
|---|---|---|---|---|---|---|
| Bi | 1-40% | 2-15% | 3-7% | 10-70% | 20-50% | 30-40% |
| Si | 3-40% | 4-20% | 6-13% | 3-40% | 4-20% | 6-13% |
| B | 3-40% | 5-30% | 10-20% | 1-30% | 2-20% | 4-10% |
| Ti | 0-20% | 1-10% | 2-5% | 1-30% | 3-20% | 4-9% |
| O | 30-80% | 40-70% | 50-60% | 10-55% | 20-45% | 30-40% |

The primer materials in FIGS. 13-14 and Table 7 may be considered to be boron-based, given that excluding oxygen, silicon, and carbon, boron has the largest magnitude in terms of mol % before and/or after firing/sintering. While other materials (e.g., bismuth based primers, solder glass, etc.) may be used for layer(s) 31 and/or 32 in certain example embodiments, boron-based material such as in FIGS. 13-14 and Table 7 may be desirable for use as primer layer(s) 31 and/or 32 in certain example embodiments, for example when laser heating is used for sintering/firing the main seal layer 30, as follows. Bismuth based primers, with little to no boron in terms of mol %, have been found to block large amounts of energy from the laser 41 so that it does not reach main seal layer 30 during firing/sintering of that layer. It has been found that by reducing Bi, and increasing B, in terms of mol %, the primer layer(s) 31 and/or 32 can be more transmissive of certain laser energy (e.g., from a near-IR laser, such as 808 or 810 nm) thereby allowing the main seal layer 30 to be more efficiently and quickly heated and sintered/fired without significantly de-tempering the glass substrate(s) 1 and/or 2. Thus, the boron-based (mol %)

material(s) of FIGS. 13-14 and Table 7 may be used for one or both primer layer 31 and/or 32 in certain example embodiments, for instance when laser heating is used that impinges upon a primer layer. In certain example embodiments, one or both primer layer(s) 31 and/or 32 may comprise, in terms of mol %, the material of Table 7. In certain example embodiments, on an elemental basis (not including oxides) and in terms of mol %, primer layer(s) 31 and/or 32 may have a ratio B/Bi, of boron (B) to bismuth (Bi), of from about 1.1 to 10.0, more preferably from about 2.0 to 6.0, and most preferably from about 2.5 to 4.5 (with an example being about 3.7), after firing/sintering of the main seal layer 30 and/or primer(s). In certain example embodiments, in terms of mol % after sintering/firing of layer 30, primer layer(s) 31 and/or 32 may comprise at least two times as much B as Bi, more preferably at least about three times as much B as Bi, and/or may comprise at least about two time as much B oxide as Bi oxide, more preferably at least about three times as much B oxide as Bi oxide. Such a primer (e.g., 31) is thus able to allow sufficient near-IR energy from the laser (e.g., at 808 or 810 nm) to pass so that the main seal layer 30 can be efficiently and quickly fired/sintered, without significantly de-tempering glass and/or inducing significant transient thermal stress.

Figure 15:
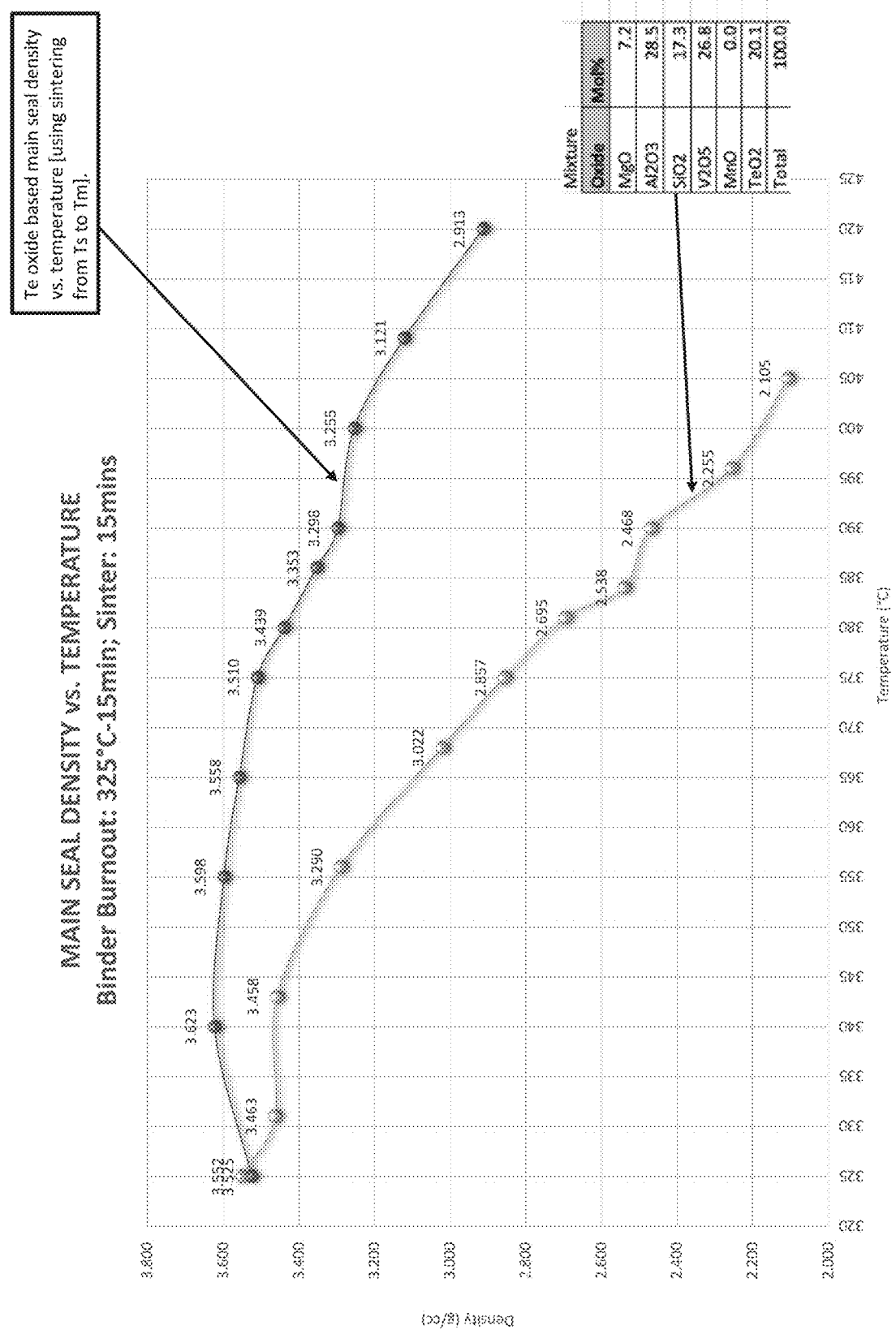
FIG. 15 is a table/graph showing density (g/cm$^3$) vs. temperature (degrees C.) for two different example main seal materials according to example embodiments, which seal material(s) may be used in combination with any embodiment herein including those of FIGS. 1-9, 11-13, 16-31.

FIG. 15 is a table/graph showing density (g/cm$^3$) vs. temperature (degrees C.) for two different example ceramic frit main seal layer 30 materials according to example embodiments, which seal material(s) may be used in combination with any embodiment herein including those of FIGS. 1-9. The upper curve in FIG. 15 is for a Te oxide based main seal 30 material as shown in FIGS. 11-12 and 14, whereas the lower curve in FIG. 15 is for a vanadium oxide-based seal 30 material the composition of which is illustrated in FIG. 15. The data in FIG. 15, for these two different example main seal layers 30, was taken after a binder burnout at about 325 degrees C. for about 15 minutes and sintering for about 15 minutes.

As shown in FIG. 15, it has been surprisingly found that the density of main seal layer 30 is a function of processing temperature. Higher density for the main seal layer 30 is desirable, because lower density results in increased porosity and an increased likelihood of moisture/air leakage through the seal. Thus, it can be seen that the Te oxide based main seal layer 30 material performed significantly better than the vanadium oxide based main seal layer 30 material, with respect to resulting density as shown in FIG. 15. The higher the density of the main seal layer 30, the better. For example, the 2.10 g/cm$^3$ density for the vanadium oxide-based seal material (the lower curve in FIG. 15) when that material is exposed to sintering at around 405 degrees C. is a low density which can lead to the seal material being porous, poor water resistance, poor mechanical adhesion, difficulties maintaining hermiticity, and/or seal failures. Meanwhile, using essentially the same 405 degrees C. processing/sintering temperature, the Te oxide based main seal layer material (the upper curve in FIG. 15) had a much higher density of 3.20 g/cm$^3$ which high density is excellent and provided for less porosity, good water resistance, good mechanical adhesion strength, and good hermiticity. Thus, while both materials may be used for example, it has been found that the Te oxide-based material is advantageous, due at least to a higher density, for main seal layer 30.

In certain example embodiments, main seal layer 30, after edge seal formation (e.g., via laser sintering), may have a density of at least about 2.75 g/cm$^3$, more preferably of at least about 2.80 g/cm$^3$, more preferably of at least about 2.90 g/cm$^3$, more preferably of at least about 3.00 g/cm$^3$, even more preferably of at least about 3.10 g/cm$^3$, and most preferably of at least about 3.20 g/cm$^3$. In certain example embodiments, the main seal layer 30, after edge seal formation (e.g., via laser sintering), may have a density of from about 2.80-4.00 g/cm$^3$, more preferably from about 2.90-3.90 g/cm$^3$, and most preferably from about 3.10-3.70 g/cm$^3$ or 3.15-3.40 g/cm$^3$. In certain example embodiments, these main seal layer 30 density ranges, preferably with a substantially lead-free ceramic material, may be in combination with a maximum processing temperature of the main seal layer 30 (e.g., during sintering and formation of the edge seal) during edge seal formation of no more than about 520 degrees C., more preferably no more than about 500 degrees C., and most preferably no greater than about 480 degrees C. For example, the main seal layer 30 may be of or include a material characterized by the above density ranges, after being processed at about 405 degrees C. for about 15 minutes. As explained above, such high densities advantageously provide for less porosity, good water resistance, good mechanical adhesion strength, and good hermiticity for the edge seal.

In certain example embodiments, one or both primer layer(s) 31 and/or 32 may have, after edge seal formation (e.g., via laser sintering), a density of at least about 2.75 g/cm$^3$, more preferably of at least about 3.20 g/cm$^3$, more preferably of at least about 3.40 g/cm$^3$, more preferably of at least about 3.50 g/cm$^3$, even more preferably of at least about 3.60 g/cm$^3$. In certain example embodiments, one or both primer layers may have a density higher than the density of the main seal layer 30. The high density of the primer layer(s) is advantageous for improving hermiticity of the overall edge seal. In certain example embodiments, primer layer 31 and/or primer layer 32 may have a density of from about 3.0-4.2 g/cm$^3$, more preferably from about 3.3-4.0 g/cm$^3$, more preferably from about 3.5-3.8 g/cm$^3$, more preferably from about 3.6-3.7 g/cm$^3$. In certain example embodiments, primer layer 31 and/or primer layer 32 may have a density of at least about 0.20 g/cm$^3$ higher (more preferably at least about 0.30 higher, more preferably at least about 0.40 higher) than a density of the main seal layer 30. For example, the main seal layer 30 may have a density of about 3.22 g/cm$^3$ and the primer layers 31 and 32 may each have a density of about 3.66 g/cm$^3$.

Regarding laser beam speed across the panel when firing/sintering the main seal layer 30 to form the edge seal 3, it has surprisingly and unexpectedly been found that adjusting the lateral speed of the laser beam across the panel is technically advantageous. For example, adjusting the speed of the laser beam 40 across the panel into a desirable range can result in one or more of: less de-tempering of the glass, improved adhesion of the seal materials, less induced transient thermal stress in the main seal material and/or the glass substrate and thus a stronger panel, and/or a stronger panel less like to suffer seal failure.

Figure 16:
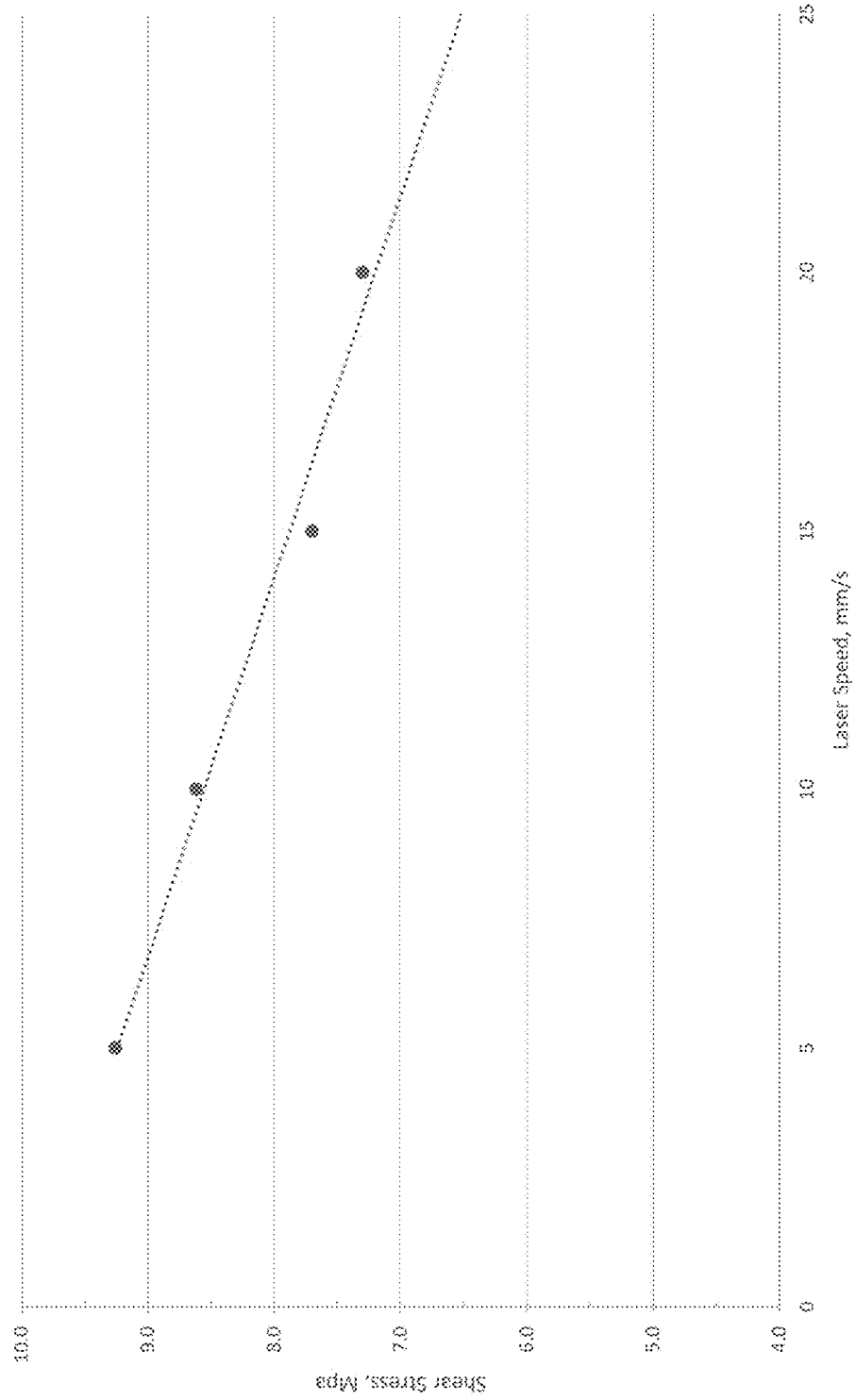
FIG. 16 is a laser speed (mm/second) vs. shear stress (MPa) graph illustrating that shear stress in a vacuum insulating panel is a function of laser speed of the laser beam across the panel, which laser speed may be used in combination with any embodiment herein including those of FIGS. 1-9, 11-15, 17-31.

FIG. 16 is a laser speed (mm/second) vs. shear stress (MPa) graph illustrating that shear stress in the panel is a function of lateral speed of the laser beam 40 across the panel 100 when firing/sintering main seal layer 30 to form the edge seal 3. FIG. 16, utilizing a single continuous wave laser beam at 808 or 810 nm for sintering a main seal layer 30 between primers 31 and 32, shows that the faster the laser beam 40 traverses the panel the lower the shear stress/strength of the resulting panel/edge seal. Stated another way, for example, the longer the laser beam heats the main seal layer 30 above its melting point (the slower the speed along path 42 across the panel), the higher the shear strength of the resulting edge seal 3 and panel 100. Thus, it will be appreciated that running the laser beam 40 too fast across the panel along path 42 during sintering of the main seal layer 30 can be disadvantageous and may result in a low shear strength which may lead to seal failures.

Figure 17:
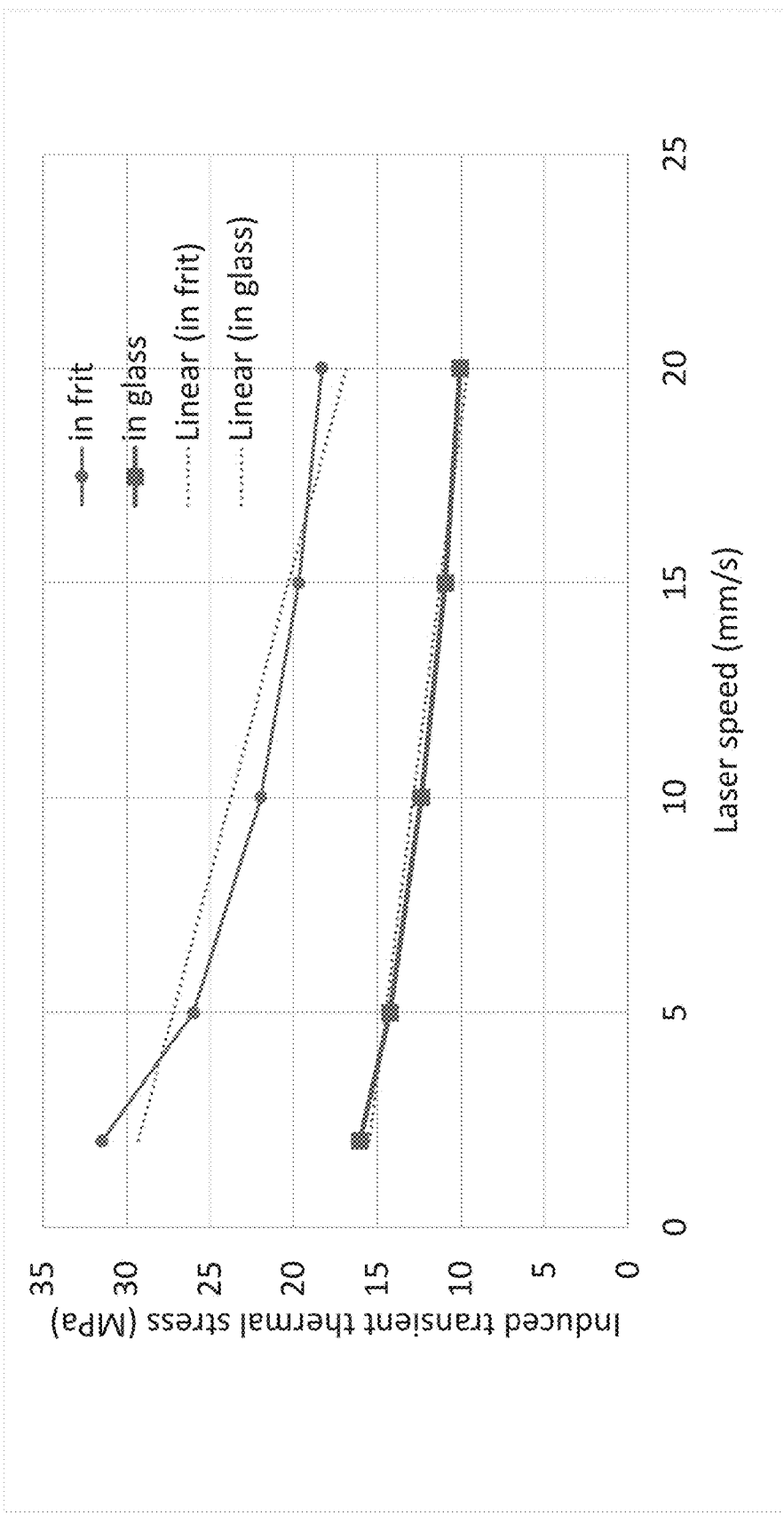
FIG. 17 is a laser speed (mm/second) vs. induced transient thermal stress (MPa) graph illustrating stress calibration curves for the ceramic frit main seal layer and the glass substrate, demonstrating that induced transient thermal stress in the main seal layer and the glass is a function of laser beam speed, which may be used in combination with any embodiment herein including those of FIGS. 1-9, 11-16, 18-31.

On the other hand, FIG. 17 is a laser speed (mm/second) vs. induced transient thermal stress (MPa) graph illustrating stress calibration curves for the ceramic frit main seal layer 30 and the glass substrate 1 and/or 2, demonstrating that induced transient thermal stress in the main seal layer 30 and the glass 1 and/or 2 is a function of the lateral speed of the laser beam 40 across the panel when firing/sintering main seal layer 30 to form the edge seal 3. FIG. 17, utilizing a single continuous wave laser beam at 808 or 810 nm for firing/sintering a main seal layer 30 between primers 31 and 32 after a pre-glaze to about 230 degrees C., shows that the slower the laser beam 40 traverses the panel along path 42 the higher the induced transient thermal stress in the main seal layer 30 and the glass substrate. Stated another way, for example, the longer the laser beam heats the main seal layer 30 above its softening and/or melting point (the slower the lateral speed of the beam across the panel 100), the higher the induced transient thermal stress in the resulting edge seal 3 and panel 100. Thus, the faster the beam, the lower the transient and residual stress, in this respect. This is counterintuitive compared to FIG. 16. Thus, from FIG. 17, it will be appreciated that running the laser beam 40 too slowly along path 42 across the panel during firing/sintering of the main seal layer 30 can be disadvantageous and result in undesirable transient thermal stress in the main seal layer 30 and/or the glass substrate 1 and/or 2, which may lead to seal failures.

In certain example embodiments, which may be used with any embodiment herein, the panel and/or the laser 40 may be manipulated so that the speed of the lateral laser beam 40 across the panel (e.g., along path 42 in FIG. 7) when firing/sintering the main seal layer 30 to form the edge seal may be from about 5-70 mm/s, more preferably from about 5-50 mm/s, more preferably from about 5-40 mm/s, more preferably from about 5-30 mm/s, even more preferably from about 10-30 mm/s, more preferably from about 15-30 mm/s, and most preferably from about 20-30 mm/s. It can be seen in FIG. 16 that this may keep the shear strength above 4.5 MPa, more preferably above about 5.0 MPa, more preferably above about 6.0 MPa, and most preferably above about 6.5 MPa, and it can be seen from FIG. 17 that this may keep the induced transient thermal stress in the layer 30 and/or the glass substrate(s) at low values. Example laser speeds for the beam 40 are about 10 mm/s, about 15 mm/s, about 20 mm/s, about 25 mm/s, and about 30 mm/s, in various example embodiments. In certain example embodiments, it may be desirable to operate the laser beam 40 at a speed(s) across the panel during sintering/firing of the main seal layer 30 to form the edge seal, so as to keep the induced transient thermal stress in the main seal layer 30 no greater than about 25 MPa, more preferably no greater than about 20 MPa, even more preferably no greater than about 15 MPa, and most preferably no greater than about 18 MPa, and/or so as to keep induced transient thermal stress in at least one of the glass substrate(s) 1 and/or 2 no greater than about 15 MPa, more preferably no greater than about 13 MPa, more preferably no greater than about 10 MPa, even more preferably no greater than about 8 MPa (e.g., see FIG. 17).

Regarding laser beam size when the beam 40 is traversing the panel during sintering of the main seal layer 30 to form the edge seal 3, it has surprisingly and unexpectedly been found that adjusting the size of the laser beam 40 is technically advantageous. For example, adjusting the size (e.g., diameter) speed of the laser beam 40 across the panel into a desirable range can result in one or more of: less de-tempering of the glass, improved adhesion of the seal materials, less induced transient thermal stress in the main seal material, less residual stress in the main seal layer 30 and/or primer seal layer(s), less induced transient thermal stress in the glass substrate and thus a stronger panel, and/or a stronger panel less likely to suffer seal failure. The laser beam may be substantially collimated in certain example embodiments.

Figure 19:
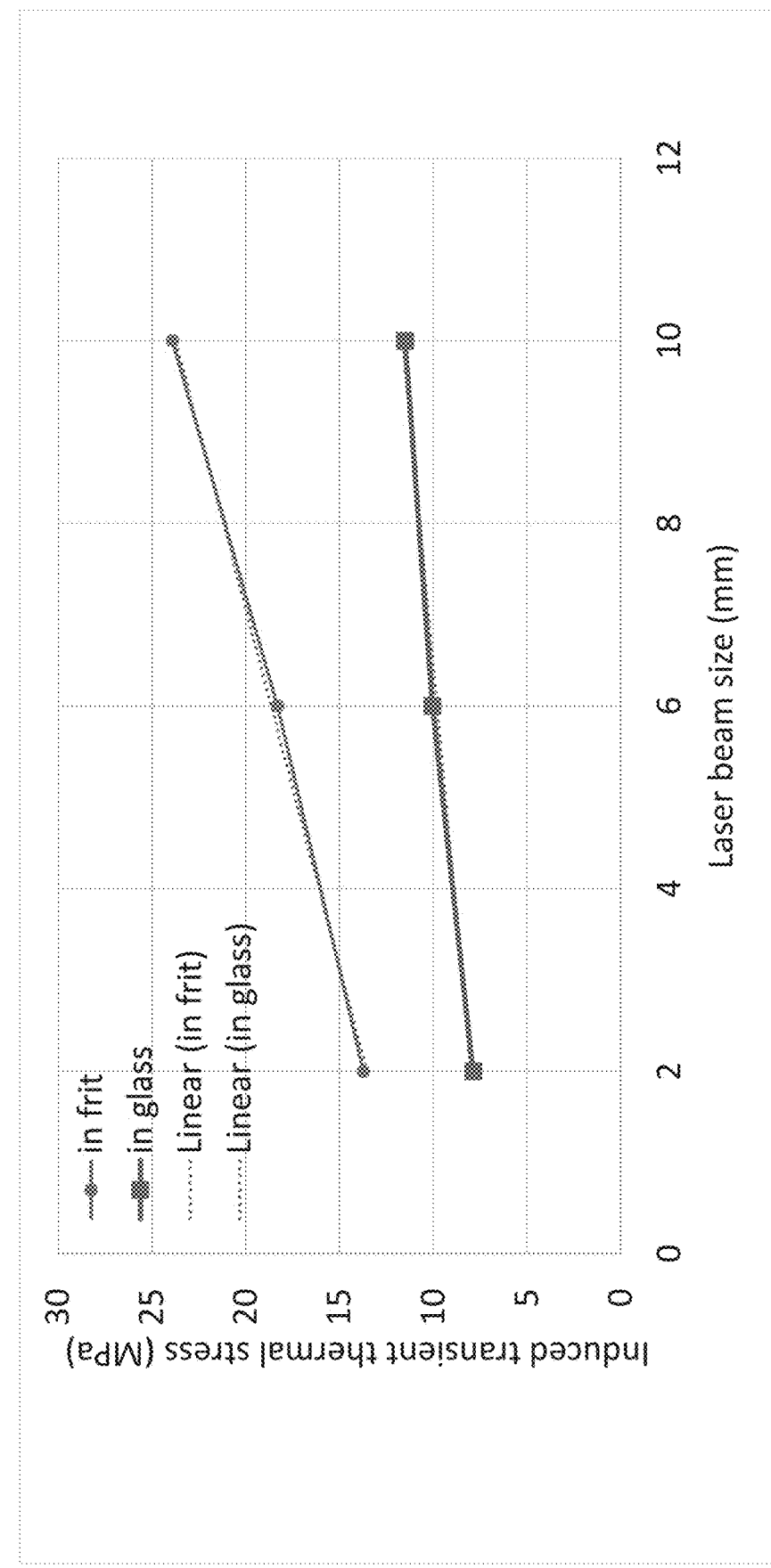
FIG. 19 is a laser beam size (mm) vs. induced transient thermal stress (MPa) graph illustrating stress calibration curves for the ceramic frit main seal layer and the glass substrate, demonstrating that induced transient thermal stress in the main seal layer and the glass is a function of the size (e.g., diameter) of the laser beam for sintering main seal layer to form the edge seal, which may be used in combination with any embodiment herein including those of FIGS. 1-9, 11-18, 20-31.

FIG. 19 is a laser beam size (mm) vs. induced transient thermal stress (MPa) graph illustrating stress calibration curves for the ceramic frit main seal layer 30 and the glass substrate 1 and/or 2, demonstrating that induced transient thermal stress in the main seal layer 30 and the glass 1 and/or 2 is a function of the size (e.g., diameter) of the laser beam 40 moving across the panel when firing/sintering main seal layer 30 to form the edge seal 3. "Size" may refer to the diameter of the beam 40 when the beam is circular in cross section, but may also refer to the largest cross-sectional size or width of the beam where the beam impinges upon the panel or edge seal material when other beam shapes are used such as rectangular, square, or oval beam cross sectional shapes or three dimensional shapes such as ellipsoidal, Gaussian, or other shapes. FIG. 19, utilizing a single continuous wave laser beam at 808 or 810 nm, with a circular cross section, for sintering a main seal layer 30 between primers 31 and 32 after a pre-glaze, shows that the larger the size of the laser beam 40 traversing the panel the higher the induced transient thermal stress in the main seal layer 30 and the glass substrate. Stated another way, for example, the more the laser beam heats the main seal layer 30 above its melting point and/or softening point (the larger the beam size), the higher the induced transient thermal stress of the resulting edge seal 3 and panel 100. For example, FIG. 19 shows that a laser beam size of 10 mm results in about 24 MPa of induced transient thermal stress in the main seal layer 30, whereas a laser beam size of 6 mm results in about 18 MPa of induced transient thermal stress in the main seal layer 30. The smaller the amount of such stress, the better. Thus, the smaller the beam size, the lower the transient and residual stress, in this respect. Thus, from FIG. 19, it will be appreciated that using too large of a laser beam size across the panel during firing/sintering of the main seal layer 30 can be disadvantageous and may result in undesirable transient thermal stress in the main seal layer 30 and/or the glass substrate 1 and/or 2, which may lead to higher residual stress in the seal and seal failures. This also relates to advantages associated with more narrow width main seal layers 30.

In certain example embodiments, which may be used with any embodiment herein, in order to reduce chances of cracking the main seal layer 30 and/or glass, the laser 41 and/or laser beam 40 for firing/sintering the main seal layer 30 and forming the edge seal 3 may be provided in a manner so that the largest cross-sectional size (e.g., diameter when a beam having a circular cross-section is used) of the laser beam 40 impinging upon the panel is from about 2-15 mm, more preferably from about 3-10 mm, even more preferably from about 4-9 mm, and most preferably from about 5-7 mm or 5-8 mm (e.g., with a main seal layer 30 width of from about 4-8 mm, more preferably from about 5-7 mm, with an example main seal layer 30 average width being about 6 mm). In certain example embodiments, the size of laser beam 40 may be from about 0.5 to 4 mm, more preferably from about 0.75 to 2.0 mm, larger than the width of the main seal layer 30 as viewed from above, so as to adequately cover same during processing. It can be seen in FIG. 19 that this helps to keep the induced transient thermal stress lower in the main edge seal layer 30 and/or glass substrates. In certain example embodiments, it may be desirable to operate the laser beam 40 at a size(s) across the panel during sintering/firing of the main seal layer 30 to form the edge seal, so as to keep the induced transient thermal stress in the main seal layer 30 no greater than about 25 MPa, more preferably no greater than about 22 MPa, even more preferably no greater than about 20 MPa, and/or so as to keep induced transient thermal stress in at least one of the glass substrate(s) 1 and/or 2 no greater than about 15 MPa, more preferably no greater than about 13 MPa, more preferably no greater than about 12 MPa, even more preferably no greater than about 8 MPa (e.g., see FIG. 19). Such laser beam sizing may be used when a single laser and laser beam are used to sinter/fire the main seal layer 30, and/or when multiple lasers and laser beams are used to sinter/fire the main seal layer.

In various example embodiments, laser beam 40 size (e.g., diameter) may be from about 30-70% (e.g., about 50%) larger than a width of main seal layer 30. For example, for a main layer 30 width of 6 mm, a laser beam diameter may be about 8 or 9 mm. In certain example embodiments, the laser beam spot size may range from about 25% to about 100% larger than the width of the main seal layer 30 if the laser power is adjusted for desired irradiation time for a given spot in the main seal layer. In certain embodiments, laser beam size (e.g., diameter) may be from between 50% and 150% larger than the width of the main seal layer 30 by optimizing laser power and/or laser optics to create a desired beam shape to achieve an irradiation spot time of less than 1 second, with an example being no more than about 0.7 or 0.5 seconds. For example, a continuous wave 810 nm laser may be used with a laser beam size (e.g., diameter) of 9 mm for a main seal layer 30, an irradiation spot size of about 7.65 mm, a main seal layer width of about 6 mm, a laser power level of about 60 watts, main layer pre-heat temperature of about 320 degrees C., linear laser rate of from about 5-40 mm/s (e.g., 14 or 20 mm per second), and/or an irradiation spot time of about 0.4 or 0.5 seconds. An example vacuum insulated panel so produced may have, for example, one or more of: U-factor of about 0.41 W/mK, R-value of at least about R-13.7, and/or a cavity vacuum pressure of about $2.45 \times 10^{-6}$ torr. Such an example vacuum insulated panel when measured using SCALP, for example, exhibited a center of glass compressive surface stress of about 14,000 psi, a central tensile stress of about 6,500 psi, and an edge of glass compressive surface stress of about 12,500 psi, thereby demonstrating that the vacuum insulated panel was (remained) tempered to ASTM standards and satisfied an example criteria of less than or no more than 2,000 psi difference between the center of glass and edge of glass compressive surface stress.

Figure 20:
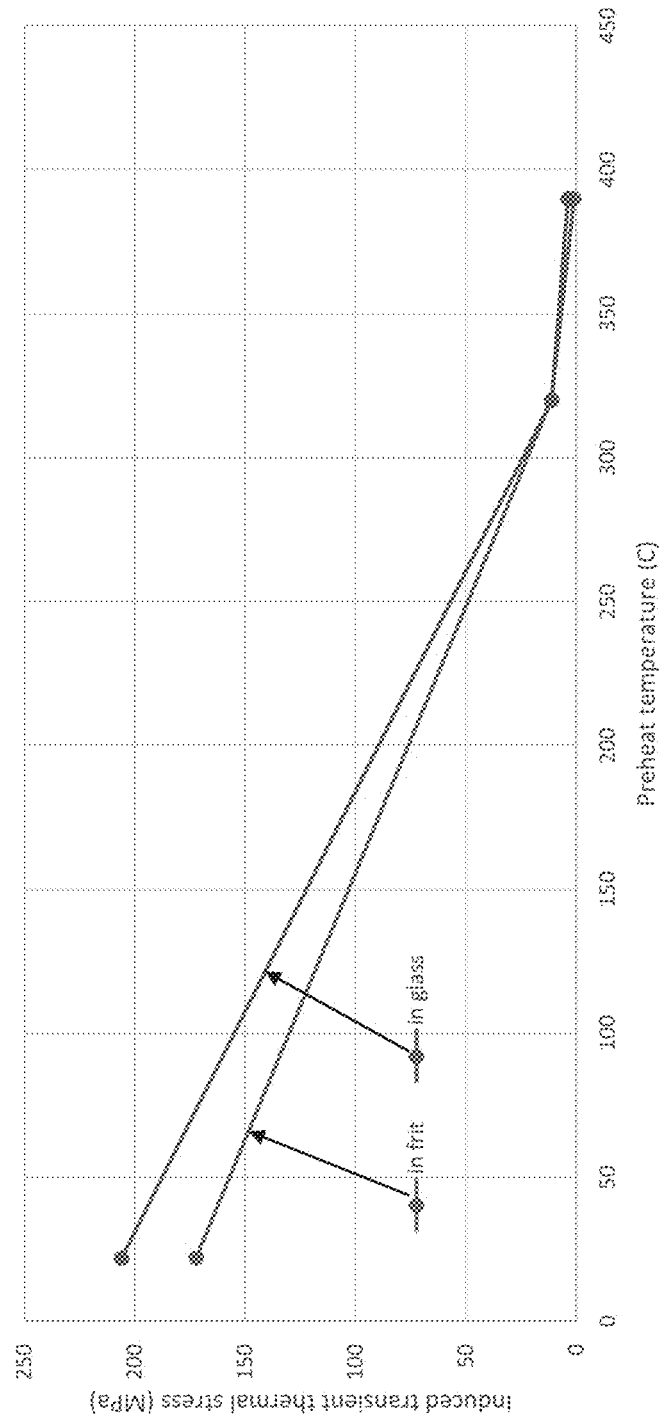
FIG. 20 is a pre-heat temperature (degrees C.) vs. induced transient thermal stress (MPa) graph plotting curves for induced transient thermal stress in both the main seal layer and glass substrate(s) as a function of this pre-heat temperature, which may be used in combination with any embodiment herein including those of FIGS. 1-9, 11-19, 21-31.

It has surprisingly and unexpectedly been found that optimizing a temperature(s) to which the panel (e.g., glass substrate(s) and/or seal layer(s)) is/are pre-heated, prior to laser sintering of the main seal layer 30, can advantageously provide for improved durability of the final vacuum insulating panel, such as less de-tempering of the glass, reduced induced transient thermal stress in the main seal layer 30 and/or glass substrates, and so forth. FIG. 20 is a pre-heat temperature (degrees C.) vs. induced transient thermal stress (MPa) graph plotting curves for induced stress in both the main seal layer 30 (referred to as "frit" in FIG. 20) and glass substrate(s) 1 and/or 2 as a function of this pre-heat temperature. For example, FIG. 20 illustrates that a pre-heat temperature to about 100 degrees C. of at least the glass substrates 1 and/or 2, and/or the main seal layer 30, prior to laser sintering of the main seal layer 30, results in induced transient thermal stress of about 130 MPa in the main seal layer 30 and about 155 MPa in the glass substrate, whereas a pre-heat temperature of at least the glass substrate and/or the main seal layer 30, to about 320 degrees C., prior to laser sintering of the main seal layer 30, results in induced transient thermal stress of about 12 MPa in the main seal layer 30 and the glass substrate. However, if the pre-heat temperature is too high, this may result in too much de-tempering of thermally tempered glass substrates as compressive surface stress of the glass substrates may be significantly reduced for example.

Thus, in certain example embodiments, it has been found that pre-heating at least one of the glass substrates 1 and 2, and/or the main seal material 30, to a temperature of from about 150-380 degrees C., more preferably from about 200-340 degrees C., more preferably from about 250-340 degrees C., more preferably from about 280-340 degrees C., more preferably from about 300-340 degrees C., more preferably from about 310-330 degrees C., with an example being about 320 degrees C. (e.g., using the main seal 30 material shown in FIGS. 11-12), prior to laser sintering of the main seal layer 30, advantageously results in the glass substrates 1 and 2 retaining most of their original temper strength and the induced transient thermal stress in the glass substrates 1, 2 and the main seal layer 30 being kept relatively low during and/or following the edge seal 3 formation. See FIG. 20 for example. This can result in improved adhesion, less chance of seal failure, a more durable vacuum insulating panel 100, and higher lasing speeds to reduce manufacturing costs. For example, this pre-heating may be carried out using radiation, convection and/or conduction type(s) of heating, for example with a bath oven, in-line oven, or using a precision hot plate incorporating convective heating to achieve the desired substantial thermal uniformity across the substrate surface and seal material. These temperature ranges may vary when other main seal materials are used.

When, for example, the laser beam 40 heats the main edge seal 30 material during sintering/firing thereof to a maximum temperature of from about 440-500 degrees C., more preferably to about 460-490 degrees C., with an example being about 470 degrees C., this pre-heating (e.g., to about 300-330 degrees C. discussed above) reduces the thermal delta between the starting glass substrate/sealing material temperature and the maximum main edge seal material temperature achieved during the sintering/firing of the main seal layer 30 (e.g., see FIG. 22 which shows an example desirable delta of 462−316=146 degrees C.), and reduces the thermal delta between the starting glass substrate temperature and the melting point (Tm) of the main seal layer 30 material which may be from about 390-410 degrees C. for example, thereby reducing resulting thermal stress in the sealing glass material. Thus, for example, the laser during sintering/firing of the main seal layer 30 may only heat the main seal layer from about 320 degrees C. to about 470 degrees C. (a total of about 150 degrees C.), whereas if there were no such pre-heating the laser during sintering/firing of the main seal layer 30 may heat the main seal layer from about 25 degrees C. to about 470 degrees C. (a total of about 445 degrees C.). The pre-heating significantly reduces the total heating of the main seal material 30 and/or the glass substrates by the laser 41 during sintering/firing of the main seal material, thereby for example reducing transient and residual stress in the main seal layer 30 and glass substrates 1, 2. For example, induced transient thermal stress in the main seal material and/or glass substrate(s) may be over 50

MPa without pre-heating to raise the ambient substrate temperature, versus no more than about 20 MPa (more preferably no more than about 10 MPa) with the glass substrate(s) and/or one or more of sealing layer(s) 30-32 being pre-heated to 320 degrees C. The example substrate pre-heat temperatures from about 280-340 degrees C., more preferably from about 300-340 degrees C., more preferably from about 310-330 degrees C., with an example being about 320 degrees C., are desirable because if the temperature is raised to high then significant de-tempering of the glass substrate(s) may occur. And if the pre-heat temperature is too low, then the thermal delta between the laser induced temperature and the pre-heat temperature becomes too large and the transient thermal stress will become too high and may result in micro-cracks, delamination, and/or other failures in the main seal layer 30 as shown in FIG. 20.

In certain example embodiments, based on the main seal material being used for main seal layer 30, pre-heating may be performed in a manner to cause at least one of the glass substrates 1 and 2, one or more of the primer layers 31-32, and/or the main seal material 30, to reach a temperature(s) prior to sintering/firing of the main seal layer 30, so that as a result of such sintering/firing the glass substrates 1 and 2 and/or the main seal layer are able to realize induced transient thermal stress of no more than about 20 MPa, more preferably no more than about 10 MPa. In certain example embodiments, based on the main seal material being used for main seal layer 30, pre-heating prior to sintering/firing of the main seal layer 30 may be performed in a manner to cause at least one of the glass substrates 1 and 2, one or more of the primer layer(s), and/or the main seal material 30, to reach a temperature(s) of from about 40-120 degrees C. (more preferably from about 50-100 degrees C., even more preferably from about 60-90 degrees C., and most preferably from about 70-80 degrees C.) less than the melting point (Tm) of the material for the main seal layer 30. In certain example embodiments, pre-heating prior to sintering/firing of the main seal layer 30 may be performed in a manner to cause at least one of the glass substrates 1 and 2, at least one of the primer layer(s), and/or the main seal material 30, to reach a temperature(s) of from about 150-450 degrees C. (more preferably from about 200-400 degrees C., even more preferably from about 250-350 degrees C.) less than the melting point (Tm) of the material for at least one of the primer layers 31 and/or 32. In certain example embodiments, based on the main seal material being used for main seal layer 30, pre-heating prior to sintering/firing of the main seal layer 30 may be performed in a manner to cause at least one of the glass substrates 1 and 2, at least one primer layer(s), and/or the main seal material 30, to reach a temperature(s) within about 70 degrees C., more preferably within about 50 degrees C., more preferably within about 30 degrees C., and more preferably within about 20 degrees C., of the softening point (Ts) of the material for the main seal layer 30. In certain example embodiments, based on the main seal material being used for main seal layer 30, pre-heating prior to sintering/firing of the main seal layer 30 may be performed in a manner to cause at least one of the glass substrates 1 and 2, at least one primer layer, and/or the main seal material 30, to reach a temperature(s) at least 5 degrees C. greater than, more preferably at least 10 degrees greater than, and most preferably at least 20 degrees greater than, the transition temperature (Tg) of the material for the main seal layer 30. For example, the example main seal material shown in FIGS. 11-12 has a Tm of about 395 degrees C., a Ts of about 320 degrees C., and a Tg of about 290 degrees C. The main seal layer 30, in certain example embodiments, may realize one or more of: reduced particle size, a $TeO_3$ and/or $TeO_4$ based or inclusive composition that results in a low-melting point material; beta eucryptite comprising lithia aluminosilicate glass to optimize CTE, low thermal melting point, small particle size, or any combination thereof. Moreover, at least layer 30 may be designed to achieve an optimal rate of thermal diffusivity by optimizing the material mass density, specific heat capacity and thermal conductivity, in certain example embodiments.

Figure 21:
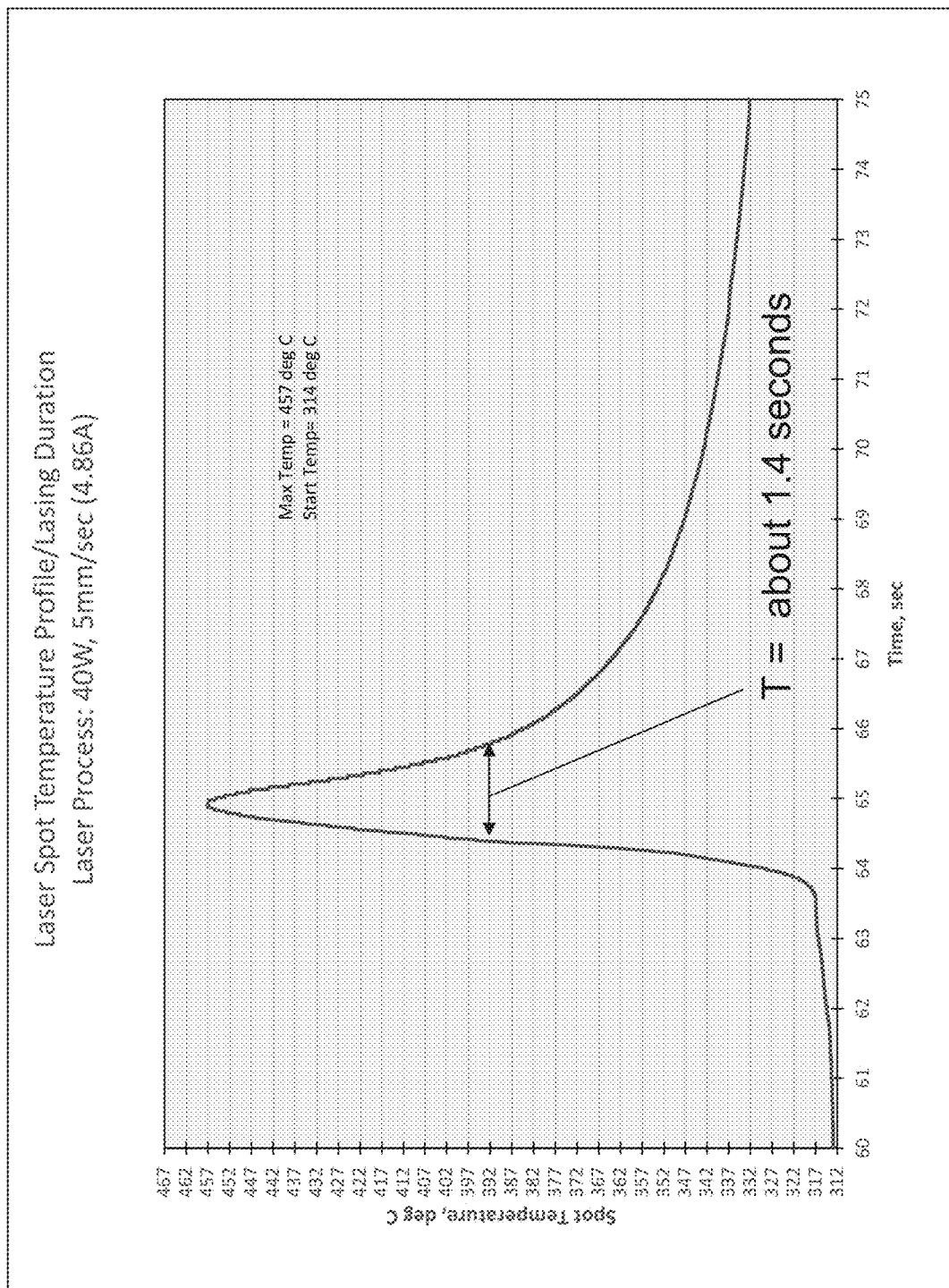
FIG. 21 is a Time (seconds) vs. Spot Temperature (degrees C.) graph plotting the temperature of a spot on the main seal layer during laser treatment thereof via an 808 nm or 810 nm continuous wave laser beam moving laterally at 5 mm/s when the main seal layer is being fired/sintered to form the edge seal, which may be used in combination with any embodiment herein including those of FIGS. 1-9, 11-20, 23-31.

FIGS. 21-22 illustrate different examples of heating the main seal layer 30 via laser beam 40 in order to fire/sinter that layer 30 during formation of the edge seal 3, according to various example embodiments. Primer layer 31 and/or 32 may of course be heated along with the main seal layer 30. FIG. 21 is an example using a laser beam speed of 5 mm/s, whereas FIG. 22 is an example using a laser beam speed of 20 mm/s (e.g., along path 42 in FIG. 7). FIG. 21 is a Time (seconds) vs. Spot Temperature (degrees C.) graph plotting the temperature of a spot on the main seal layer 30 and/or primer layer 31 during laser treatment thereof via an 808 nm or 810 nm continuous wave laser beam 41 moving laterally across the panel at 5 mm/s when the main seal layer 30 is being fired/sintered to form the edge seal 3. FIG. 22 is similar to FIG. 21, except that the lateral speed of the laser beam across the panel is 20 mm/s. In certain example embodiments, as the laser beam passes over the main seal material, a given point of the main seal material 30 and/or primer 31 may be irradiated by the laser beam 40 for an irradiation time of from about 0.15 to 4.0 seconds, more preferably from about 0.20 to 1.0 seconds, more preferably from about 0.4 to 0.6 seconds, to achieve the desired physical, chemical and/or mechanical properties including hermeticity while achieving an acceptable laser linear line rate.

Referring to FIGS. 21-22, it has surprisingly and unexpectedly been found that adjusting the time "T" that a given spot/point/location on the main seal layer 30 and/or the primer layer 31 is above the melting point (Tm) of the material for the main seal layer 30 during laser sintering/firing of the layer 30 is technically advantageous in that de-tempering of glass substrate(s) can be reduced, cracking of the seal and/or glass can be avoided or reduced, high density of the main seal layer 30 material can be achieved, and induced transient thermal stress in the main seal layer 30 can be kept to relatively low value(s). The laser beam passes through a glass substrate and primer layer 31 as shown in the figures, in certain example embodiments, so measurements of the temperature of primer layer 31 are also instructive and indicative of the temperature of layer 30. The spot temperatures of the seal in FIGS. 21-22 were measured via laser pyrometer positioned over the seal material 30-32, through the overlying glass substrate. FIGS. 21-22 illustrate that the laser heating of the main seal layer 30 and primer 31 begins at about 315-320 degrees C., after the pre-heating of the glass substrates 1, 2 and main seal 30 material discussed above. For example, the example main seal material shown in FIGS. 11-12 has a melting point (Tm) of about 395 degrees C. If the time "T" that the primer layer 31 and/or main seal layer 30 is above Tm is too long, this may result in one or more of: significant de-tempering of the glass substrate(s), cracks in the edge seal 3, a low density and thus a porous main seal layer 30 prone to leakage, large amounts of induced transient thermal stress in the main seal material 30 and/or glass substrate(s). On the other hand, if the time "T" is too short, this may result in inadequate sintering and/or inadequate bonding between the main seal layer 30 and primer(s) 31 and/or 32, or an adjacent glass substrate. In the example embodiment of FIG. 21, the time "T" that a given spot/point/location on the main seal layer 30 and/or the primer layer 31 is above the melting point (Tm) of the material for the main seal layer 30 during laser sintering/firing of the layer 30 is about 1.4 seconds, whereas in the example embodiment of FIG. 22 the time "T" is about 1.3 seconds due to the faster lateral laser beam speed in the FIG. 22 embodiment. Thus, in certain example embodiments, it is possible during sintering/firing of the main seal layer 30 to rapidly heat the main seal material in an economically efficient manner without cracking the seal material and/or glass substrate(s) based on optimizing one or more of laser beam speed, laser beam size, pre-heating temperature, temperature processing, main seal material, and/or seal width.

In certain example embodiments, laser treatment of the material for the main seal layer 30 is performed, during formation of the edge seal 3, in a manner so that the time "T" that a given spot/point/location on the main seal layer 30 and/or the primer layer 31 is above the melting point (Tm) of the material for the main seal layer 30 during laser sintering/firing of the layer 30 is no more than about 5 seconds, more preferably no more than about 3 seconds, more preferably no more than about 2 seconds, more preferably no more than about 1.5 seconds, and for example no more than about 0.75 seconds (e.g., see FIGS. 21-22). Thus, when the melting point (Tm) of the material for the main seal layer is 395 degrees C. for purposes of example, during laser sintering/firing of the layer 30 the time "T" at which a spot/point/location on the main seal layer 30 and/or the primer layer 31 is above 395 degrees C. is no more than about 3 seconds, more preferably no more than about 2 seconds, and most preferably no more than about 1.5 seconds, as shown in FIGS. 21-22.

In certain example embodiments, as shown in FIGS. 21-22 for example, in order to provide adequate sintering/firing of the main seal layer 30, the maximum temperature of the spot/point/location on the main seal layer 30 and/or the primer layer 31 (e.g., at the interface between the substrate 1 through which the laser beam passes and the adjacent seal material from layer 31 and/or 30) during laser sintering/firing of the layer 30 may be at least about 40 degrees C. above the melting point (Tm) of the material for the main seal layer, more preferably at least about 50 degrees C. above the melting point (Tm) of the material for the main seal layer, and most preferably at least about 55 or 60 degrees C. above the melting point (Tm) of the material for the main seal layer 30. In certain example embodiments, as shown in FIGS. 21-22 for example, in order to reduce de-tempering and reduce chances of seal damage, the maximum temperature of the spot/point/location on the main seal layer 30 and/or the primer layer 31 during laser sintering/firing of the layer 30 may be no more than about 110 degrees C. above the melting point (Tm) of the material for the main seal layer 30, and more preferably no more than about 100 degrees C. or no more than about 80 degrees C. above the melting point (Tm) of the material for the main seal layer 30. In certain example embodiments, this maximum temperature may be at least about 430 degrees C., more preferably at least about 440 degrees C., and most preferably at least about 450 degrees C., and/or this maximum temperature in certain example embodiments may be no greater than about 495 degrees C., more preferably no greater than about 480 degrees C., and sometimes no greater than about 470 degrees C. For example, FIG. 22 shows 462 degrees as the maximum temperature of the spot, which is 67 degrees C. above Tm given an example Tm of 395 degrees C.

Still referring to FIGS. 21-22 for example, in various example embodiments, it has been found that adjusting a relationship between the irradiation time (e.g., 0.25 to 1.0 seconds) of a given point on the main seal layer 30 and/or primer 31, and the rate of thermal decay in the ceramic sealing glass materials can be technically advantageous to achieve desired edge seal 3 hermeticity, density, porosity and/or mechanical strength without introducing microcracks from high transient thermal stress for example. It may be desirable to heat the main seal layer 30 quickly, but if it is cooled too quickly defects may be realized. It may be desirable to quickly heat the main seal layer 30 in a manner so that the main seal layer 30 only reaches temperatures above its melting point Tm for a short period of time. Thermal decay time is the area under the time/temperature curve (in FIG. 22 for example) wherein the main layer temperature is above the melting point (e.g., about 390 or 395 degrees C.) of the main seal layer 30 material. In other words, referring to FIG. 22 for example, the thermal decay time would be the area under the curve above the horizontal line at about 392/395 degrees C. In certain example embodiments, a ratio of thermal decay time to laser irradiation time via laser beam of a given point of the main seal layer 30 may be from about 2:1 to 7:1, possibly from 3:1 to 7:1, with an example being about 5:1. In certain example embodiments, as for instance, a continuous wave 810-nm laser with a laser beam diameter of about 9 mm may be used for sintering the main seal layer 30, with an irradiation spot size of 7.65 mm, a main seal layer width of about 6 mm, a laser power level of about 85 watts, pre-heat main seal layer temperature of about 320 degrees C., and a linear laser rate of about 20 mm per second to achieve an irradiation spot time of about 0.38 seconds on the main seal layer 30. To increase the irradiation spot time to at least about 0.50 seconds, the diameter of the laser beam for example may be increased to 12 mm to yield an irradiation spot size of 10 mm, or a second laser beam may be added to increase irradiation spot time.

In certain example embodiments, laser 41 may heat the main seal layer 30 to a temperature from about 370-440, 390-440 or 390-410 degrees C., with an example being about 400 degrees C., which many indicate that the laser heats the glass substrate 1 to primer 31 interface to a temperature of from about 400-475 or 420-475 degrees C., possibly from about 420-450 degrees C., with an example being about 435 degrees C. One or more of the sealing layer(s) 30-32 may be designed to have thermodynamic properties to improve or increase/maximize thermal diffusivity. In certain example embodiments, thermal heat capacity of the sealing glass materials 30-32 may be about 0.792 J/gC, hemispherical emittance about 0.92, and/or thermal diffusivity from about 0.40 mm per second to 0.70 mm per second with an example thermal diffusivity being about 0.55 mm/s. In certain example embodiments, one or more of a laser type, laser power level, laser beam shape, laser beam size (e.g., diameter), thermal conductivity, thermal diffusivity, and/or pre-heat temperature(s) may be optimized for reducing or minimizing residual and transient stress in the fired/sintered main seal layer 30 and/or the glass substrate(s).

It has surprisingly been found that designing the thermal diffusivity and/or thermal conductivity of primer layer 31 (through which the laser beam 40 passes) and/or main seal layer 30 can advantageously reduce de-tempering of the glass substrate(s) 1 and/or 2 due to laser sintering/firing of the main seal layer 30. For example, the primer layer 31 may be designed and optimized to have a high thermal diffusivity and/or high thermal conductivity to rapidly transfer heat from the laser source through the primer layer 31 to the main seal layer 30 to more quickly sinter/fire the main seal layer 30 and wet the interfaces between the main seal layer 30 and opposing primer layers 31-32, without significantly detempering the glass substrates 1 and 2. In certain example embodiments, main seal layer 30 may have one or more of: a lower thermal conductivity than traditional amorphous glass materials, e.g., 0.88 W/mK versus 1.10 W/mK, a lower specific heat capacity, e.g., 0.132 cal/gK versus 0.200 cal/gK, and/or higher mass density, e.g., 3.16 g/cm$^3$ versus 2.47 g/cm$^3$. If one knows thermal conductivity (k) and specific heat capacity of a material, an example relationship for determining thermal diffusivity is D*=k(T)/(100×p(T)×Cp (T)), where D* is thermal diffusivity, k is thermal conductivity, p is mass density, and Cp is specific heat capacity. Further example equations for thermal conductivity (TC=k) and thermal diffusivity (TD=D*) are as follows:

$$k = D^* p C_p \quad \text{(Thermal Conductivity)}$$

$$D^* = c_x (L^2/t_x) \quad \text{(Thermal Diffusivity)}$$

where k (TC) is thermal conductivity, D*(TD) is thermal diffusivity, p is mass density, $C_p$ is specific heat capacity, $c_s$ is constant (0.303520), L is material thickness, and $t_x$ is time.

According to certain example embodiments, as shown in Table 8 thermal conductivity (TC) and thermal diffusivity (TD) measurements were taken of components of example vacuum insulated panels at a reference temperature of about 25 degrees C. by laser flash method ASTM E1461 for three examples each of main seal layers 30, primer layers 31, and glass substrates 1 in a vacuum insulating panel as shown in FIGS. 2, 6-7, 9, and 11-14, after laser sintering of the main seal layer 30 via laser beam 40 through primer layer 31 and substrate 1, and after disassembly of the panels for measurement purposes. For each sample/example, laser flash thermal diffusivity (TD) measurements involved pulse heating the front side of the sample surface with a short laser pulse, and then measuring the time evolution of the back surface temperature using an IR detector; the resulting temperature profile curve was tailored using a one-dimensional heat flow model, and the sample's TD was then extracted from the model and thermal conductivity (TC) calculated using the TD, average density, and specific heat.

TABLE 8

|  | Thermal Conductivity (W/mK) | Thermal Diffusivity (cm$^2$/s) | Specific Heat (cal/gK) | Density (g/cc) |
| --- | --- | --- | --- | --- |
| Main Seal 30 Ex. 1 | 0.8760 | 0.005432 | 0.132 | 2.918 |
| Main Seal 30 Ex. 2 | 0.8829 | 0.005475 | 0.132 | 2.918 |
| Main Seal 30 Ex. 3 | 0.8880 | 0.005506 | 0.132 | 2.918 |
| Primer 31 Ex. 1 | 1.1605 | 0.005611 | 0.135 | 3.659 |
| Primer 31 Ex. 2 | 1.1479 | 0.005550 | 0.135 | 3.659 |
| Primer 31 Ex. 3 | 1.1520 | 0.005570 | 0.135 | 3.659 |
| Glass Ex. 1 | 1.1178 | 0.005398 | 0.200 | 2.473 |
| Glass Ex. 2 | 1.1022 | 0.005323 | 0.200 | 2.473 |
| Glass Ex. 3 | 1.1135 | 0.005377 | 0.200 | 2.473 |

As shown in Table 8, for the main seal layers 30 the average thermal conductivity was 0.8823 W/mK and the average thermal diffusivity was 0.005471 cm$^2$/s; for the primer seal layers 31 the average thermal conductivity was 1.1535 W/mK and the average thermal diffusivity was 0.005577 cm$^2$/s; and for the soda-lime-silica based glass substrate 1 the average thermal conductivity was 1.1112 W/mK and the average thermal diffusivity was 0.005366 cm$^2$/s. Thus, it can be seen that in certain embodiments the main seal layer 30 has a lower thermal conductivity than the glass substrates 1 and/or 2, e.g., 0.88 W/mK for the main seal layer 30 versus about 1.10 W/mK for the glass substrate(s); and that the following ratio may be met: TCml<TCg<TCpl, where TCml is the thermal conductivity of the main seal layer 30, TCg is the thermal conductivity of one or more of the glass substrates 1 and/or 2, and TCpl is the thermal conductivity of one or both primer layers 31 and/or 32.

In certain example embodiments, one or both of the ceramic sealing primer layers 31-32 of the edge seal 3, after firing/sintering, may have a thermal conductivity of from about 1.0 to 2.0 W/mK, more preferably from about 1.10 to 1.90 W/mK, more preferably from about 1.10 to 1.50 W/mK, more preferably from about 1.12 W/mK to 1.30 W/mK, even more preferably from about 1.14 W/mK to 1.25 W/mK, with other examples being from about 1.40 W/mK to 1.80 W/mK or about 1.60 W/mK. In certain example embodiments, primer layer(s) 31 and/or 32, after firing/sintering, may have a thermal conductivity of at least 1.00 W/mK, more preferably of at least 1.10 W/mK, more preferably of at least 1.12 W/mK, even more preferably of at least 1.13 W/mK, and most preferably of at least 1.14 or 1.15 W/mK. Many of these are higher than the thermal conductivity of the glass substrates 1 and 2. In certain example embodiments, main seal layer 30, after firing/sintering thereof, may have a thermal conductivity of from about 0.75 to 1.00 W/mK, more preferably from about 0.80 to 0.95 W/mK, more preferably from about 0.85 to 0.95 W/mK, even more preferably from about 0.86 to 0.90 W/mK. Thus, it will be appreciated, that in certain example embodiments the thermal conductivity of the glass substrate 1 and/or 2 is between the thermal conductivity of the main seal layer 30 and the thermal conductivity of the primer layer 31 (TCml<TCg<TCpl), with the primer layer 31 having the highest thermal conductivity of the three for more efficient heat transfer to layer 30 during edge seal formation. In certain example embodiments, the ratio TCpl/TCg of the thermal conductivity of the primer layer 31 (and/or 32) to the thermal conductivity of the glass substrate 1 and/or 2 may be at least 0.950, more preferably at least 1.00, more preferably at least 1.020, more preferably at least 1.030, even more preferably at least 1.035, with an example based on averages in Table 8 being 1.038. In certain example embodiments, the ratio TCpl/TCml of the thermal conductivity of the primer layer 31 (and/or 32) to the thermal conductivity of the main seal layer 30 may be from about 1.2 to 1.5, more preferably from about 1.25 to 1.40, and most preferably from about 1.28 to 1.33, with an example being 1.31 based on averages in Table 8.

In certain example embodiments, one or both of the ceramic sealing primer layers 31-32 of the edge seal 3, after firing/sintering, may have a thermal diffusivity of from 0.0050 to 0.0070 cm$^2$/s, more preferably from 0.0050 to 0.0065 cm$^2$/s, more preferably from 0.0054 to 0.0065 cm$^2$/s, more preferably from 0.0054 to 0.0058 cm$^2$/s, even more preferably from 0.0055 to 0.0057 cm$^2$/s, with an example being 0.0056 based on averages in Table 8. In certain example embodiments, main seal layer 30, after firing/sintering thereof, may have a thermal diffusivity of from 0.0050 to 0.0065 cm$^2$/s, more preferably from 0.0054 to 0.0058 cm$^2$/s, even more preferably from 0.0054 to 0.0056 cm$^2$/s, with an example being 0.0055 based on averages in Table 8. Glass substrate(s) 1 and/or 2 may have a thermal diffusivity of about 0.0053 to 0.0054 cm$^2$/s in certain example embodiments. Thus, it will be appreciated, that in certain example embodiments the thermal diffusivity of the glass substrate 1 and/or 2 may be less than the thermal diffusivity of the main seal layer 30 (TDg<TDml) and/or less than the thermal diffusivity of the primer layer 31 (TDg<TDpl), where TDg is the thermal diffusivity of the glass substrate(s), TDpl is the thermal diffusivity of primer layer 31 and/or 32, and TDml is the thermal diffusivity of the main seal layer 30. In certain example embodiments, TDpl>TDml. In certain example embodiments, the ratio TDpl/TDg may be at least 1.020, more preferably at least 1.030, even more preferably at least 1.035, with an example based on averages in Table 8 being 1.039. In certain example embodiments, the ratio TDpl/TDml may be at least 1.000, more preferably at least 1.010, even more preferably at least 1.015, with an example based on averages in Table 8 being 1.019.

These thermal diffusivity and/or thermal conductivity ratios and values advantageously allow(s) rapid transfer of heat from the laser source through the primer layer 31 to the main seal layer 30 to quickly sinter/fire the main seal layer 30 and wet the interfaces between the main layer 30 and opposing primer layers 31-32, without significantly de-tempering the glass substrates 1 and 2 during edge seal formation. For instance, the higher the thermal diffusivity and/or thermal conductivity of the primer layer 31 and/or main seal layer 30, (a) the less laser power needed, (b) the less chance of significant de-tempering and/or cracking of the glass substrate 1 and/or 2, and/or (c) thermal stress can be reduced or minimized. Any of these ratio(s) and/or value(s) may be used in combination with any other of these ratio(s) and/or value(s), and may be used in combination with any embodiment(s) herein.

Figure 10:
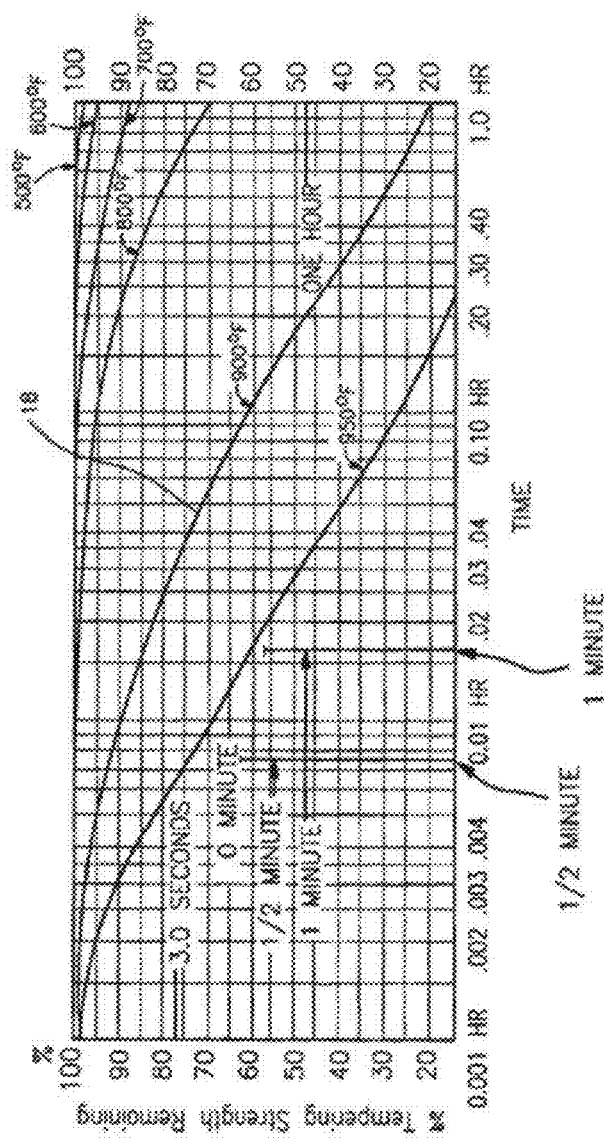
FIG. 10 is a % Tempering Strength Remaining vs. Time graph illustrating that de-tempering of glass is a function of temperature and time.
Figure 23:
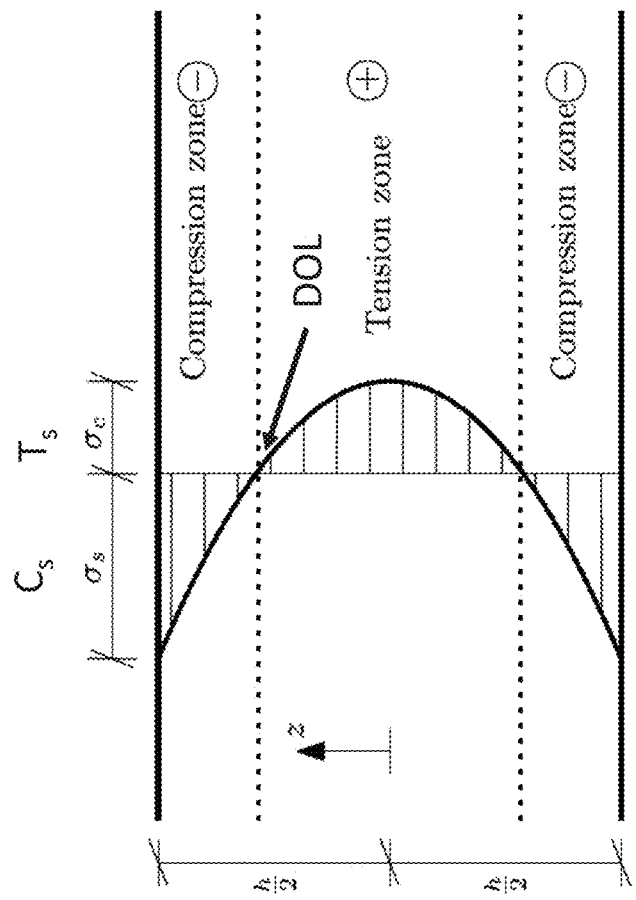
FIG. 23 is a schematic cross-sectional diagram of thermally tempered glass, which may be used for one or more of the substrates in certain example embodiments, which may be used in combination with any embodiment herein including those of FIGS. 1-9, 11-22, 24-31.

FIG. 23 is a schematic cross-sectional diagram of thermally tempered glass, which may be used for one or both glass substrates 1 and/or 2 in certain example embodiments. As known in the art, thermal tempering of glass typically involves heating the glass to a temperature of at least 585 degrees C., and sometimes to at least 600 degrees C., and then rapidly cooling the heated glass to compress the surface regions and edges of the glass to make it stronger. The glass substrates 1 and/or 2 may be thermally tempered to increase compressive surface stress and to impart safety glass properties including small fragmentation upon breakage. Thus, FIG. 23 illustrates compressive surface stress (Cs) in the surface areas/regions of the glass, while the central thickness area of the glass viewed cross-sectionally is under tension. Thus, for thermally tempered glass the compressive stress is in the surface regions, whereas tension stress is in the central region of the glass. Thermally tempered glass has surface compression of at least 10,000 psi (with examples being at least about 13,000, or about 14,000 psi surface compressive stress). Meanwhile, FIG. 10 shows that exposing thermally tempered glass to high temperatures for long periods of time can result in significant de-tempering of the glass due to the tempered glass experiencing a reduction in surface stress which weakens the glass. For example, FIG. 10 shows that heating thermally tempered glass to 482 degrees C. (900 degrees F.) for one hour can result in 82% de-tempering (18% original tempering strength remaining), which represents significant de-tempering and can lead to testing failures in vacuum insulating glass/panel applications. When thermally tempered glass substrates are used for substrates 1 and 2, it is advantageous for the final vacuum insulating panel 100 to maintain a significant amount of the original tempering strength, or stated another way, to not suffer from significant de-tempering of the glass substrates 1 and/or 2 during heat processing such as edge seal formation, getter activation, pump-out tube seal formation, or the like. In certain example embodiments, material(s) and/or process(es) may be optimized to avoid significant de-tempering of glass substrate(s) 1 and/or 2 when tempered glass is used.

For example, in various example embodiments one or more of the following may be optimized to avoid significant de-tempering of glass substrate(s) 1 and/or 2 when tempered glass is used: laser beam speed, laser beam size, laser beam power density, pre-heating, getter system design and/or processing, seal material(s) for one or more of seal layers 30-32, seal material stoichiometry, seal layer(s) width(s), seal layer(s) thickness(es), lasing duration, processing temperature(s), pump-out tube seal structure and/or processing, thermal conductivity of layer 31 and/or 32, and/or thermal diffusivity of layer 31 and/or 32, getter structure or processing, or any combination thereof. One or more, or any combination, or these may be optimized to avoid significant de-tempering of glass substrate(s) so that when tempered glass substrates 1 and 2 are used and after the vacuum insulating panel 100 has been made and hermetically sealed, one or more of the following may be realized: (i) at least one of the tempered glass substrates 1 and/or 2 maintains an average surface compressive stress (e.g., minimum surface compression) of at least about 10,000 psi, more preferably of at least about 11,000 psi, more preferably of at least about 12,000 psi, more preferably of at least about 13,000 psi, and sometimes at least about 14,000 psi (e.g., see FIG. 25 and the examples therein); (ii) at least one of the tempered glass substrates 1 and/or 2 maintains an average surface compressive stress at the center thereof as viewed from above and/or below, in the compression region (e.g., see one or both of the compression zones in FIG. 23) of at least about 10,000 psi, more preferably of at least about 11,000 psi, more preferably of at least about 12,000 psi, even more preferably of at least about 13,000 psi, and most preferably of at least about 14,000 psi (e.g., see FIG. 25 and the examples therein); (iii) at least one of the tempered glass substrates 1 and/or 2 maintains an average edge compressive stress proximate the edge of the glass as viewed from above and/or below, in the compression region (e.g., see one or both of the compression zones in FIG. 23) of at least about 9,700 psi, more preferably of at least about 10,000 psi, more preferably of at least about 11,000 psi, more preferably of at least about 12,000 psi, even more preferably of at least about 13,000 psi, and most preferably of at least about 14,000 psi (e.g., see FIG. 26 and the examples therein); (iv) at least one of the tempered glass substrates 1 and/or 2 maintains a center to edge (as viewed from above, from the center in the X and/or Y direction to the closest edge) average compressive stress gradient/change, as viewed from above and/or below, of no more than about 2,000 psi, more preferably no more than about 1500 psi, and even more preferably of no more than about 1,000 psi, and sometimes no more than about 500 psi (e.g., see FIGS. 25-26 and the examples therein); (v) at least one of the tempered glass substrates 1 and/or 2 maintains a center to corner (from center diagonally to at least one corner) average compressive stress gradient/change, as viewed from above and/or below, of no more than about 2,000 psi, more preferably no more than about 1500 psi, and even more preferably of no more than about 1,000 psi, and sometimes of no more than about 500 psi (e.g., see FIGS. 25 and 28, and the examples therein); (vi) at least one of the tempered glass substrates 1 and/or 2 maintains an average tension stress (e.g., see tension zone in FIG. 23) of at least about 5,500 psi, more preferably at least about 5,800 psi, more preferably at least about 6,000 psi, more preferably at least about 6,500 psi, and most preferably at least about 7,000 psi and/or at least about 7,500 psi, at a central region of the glass substrate viewed cross-sectionally (e.g., see FIG. 27 and the examples therein); (vii) at least one of the tempered glass substrates 1 and/or 2 has a tension stress maximum variation of no more than about 500 psi at a central region of the glass substrate viewed cross-sectionally; and/or (viii) at least one of the tempered glass substrates 1 and/or 2 maintains a ratio of center surface compressive stress/central tension stress of at least about 1.8:1, more preferably of at least about 2:1. In certain example embodiments, one or more of these may be achieved in combination with one or more of: the vacuum insulating panel 100 having a lap shear mechanical strength of at least about 40 kg per cm 2, a compression depth of layer (DOL) of about 21% of corresponding glass substrate thickness, a thermal edge strength supporting an inner to outer glass substrate asymmetric thermal stress load of at least about 70 degrees C., and/or a panel capable of maintaining structural integrity such as during extended exposure to an asymmetric thermal differential of 70 degrees C., more preferably 90 degrees C.

Figure 25:
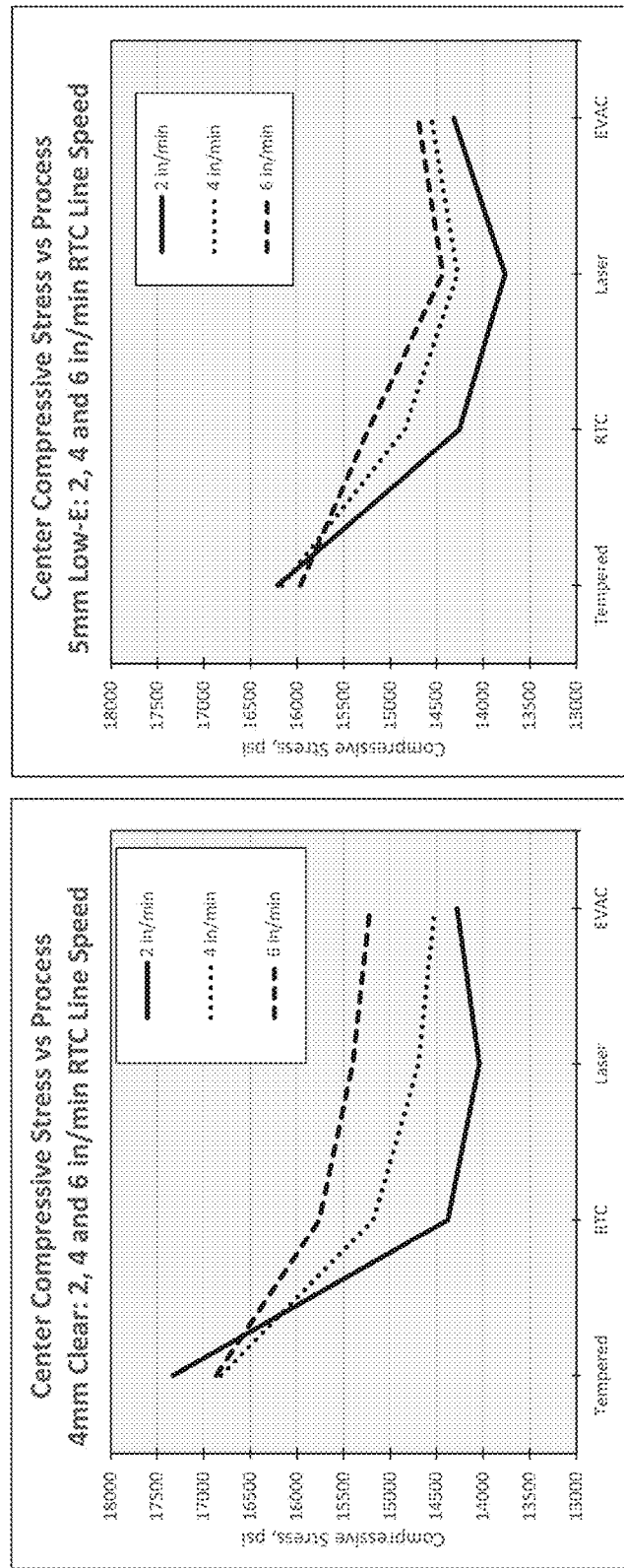
FIG. 25 illustrates graphs for both thermally tempered glass substrates of a final vacuum insulating panel according to certain example embodiments (e.g., see FIG. 2), showing average compressive stress in the center of the glass substrates as viewed from above as a function of line speed of the pre-heating oven.

FIG. 25, for example, illustrates graphs for both thermally tempered glass substrates 1 and 2 of a final vacuum insulating panel 100 according to certain example embodiments after tempering, pre-heating (RTC), laser sintering/firing of the edge seal materials, and evacuation (EVAC), showing average measured surface region compressive stress in the center of the glass substrates 1 and 2 as viewed from above, with a pre-heat temperature (e.g., see FIG. 20) of about 320 degrees C. in about an eight foot heating zone at various pre-heat oven line speeds of 2, 4, and 6 inches/minute using the materials of FIGS. 8-9 and 11-14. For example, see the compression zone(s) in FIG. 23 where compressive stress is present. Referring to FIG. 2 for example, the graph for the uncoated 4 mm thick clear glass substrate 1 is on the left in this figure, whereas the graph for the 5 mm thick glass substrate 2 having the low-E coating 7 thereon is on the right in this figure. These graphs in FIG. 25 of SCALP data, of actual examples, demonstrate that retained temper strength of the glass substrates 1 and 2 gradually decreases during processing through the pre-heating (RTC) and seal lasering steps due to the heat involved. The final temper strength retained, for the final product 100, is at the right of each graph after the evacuation (EVAC) step. It can be seen that the slowest line speed (2 inches/minute), where the substrates were pre-heated the longest, resulted in the most tempering strength being lost. However, all of these processing speeds provided for satisfactory results. These graphs in FIG. 25 show that both glass substrates 1 and 2 maintained significant temper strength of at least 13,500 psi, and did not suffer significant de-tempering, due to the processing including sintering/firing, pre-heating, etc.

Figure 26:
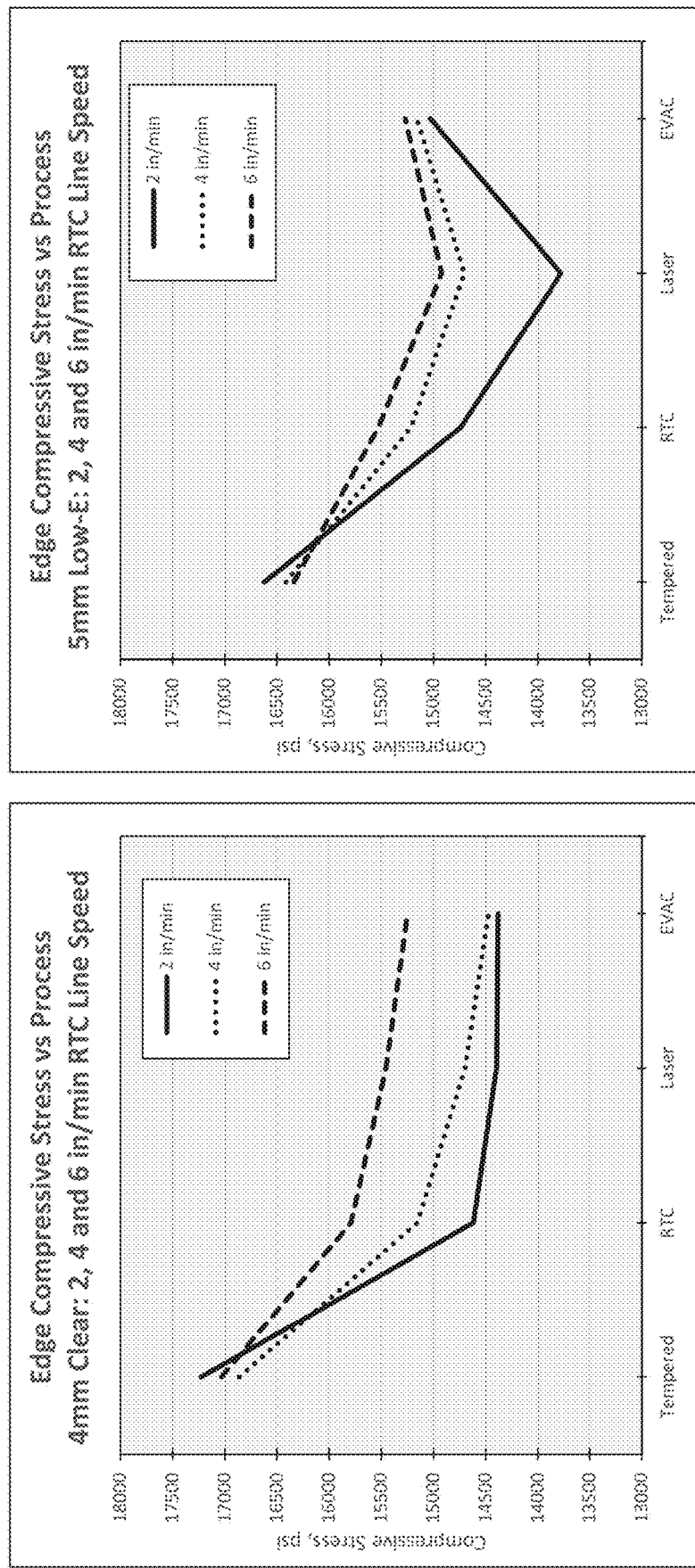
FIG. 26 illustrates graphs for both thermally tempered glass substrates of a final vacuum insulating panel according to certain example embodiments (e.g., see FIG. 2), showing average compressive stress in the edge of the glass substrates as viewed from above as a function of line speed of the pre-heating oven.

FIG. 26, for example, illustrates graphs for both thermally tempered glass substrates 1 and 2 of a final vacuum insulating panel 100 according to certain example embodiments after tempering, pre-heating (RTC), laser sintering/firing of the edge seal materials, and evacuation (EVAC), showing average measured surface region compressive stress at the edge of each of the glass substrates 1 and 2 as viewed from above, with a pre-heat temperature (e.g., see FIG. 20) of about 320 degrees C. in about an eight foot heating zone at various pre-heat oven line speeds of 2, 4, and 6 inches/minute using the materials of FIGS. 8-9 and 11-14. These are the same example vacuum insulating panels 100 from FIG. 25, except that FIG. 25 shows the data for the center of the glass substrates while FIG. 26 shows the data at the edge of the glass substrates. Referring to FIG. 2 for example, the graph for the uncoated 4 mm thick clear glass substrate 1 is on the left in this figure, whereas the graph for the 5 mm thick glass substrate 2 having the low-E coating 7 thereon is on the right in this figure. These graphs in FIG. 26 of SCALP data, of actual examples, demonstrate that retained temper strength of the glass substrates 1 and 2 gradually decreases during processing through the pre-heating (RTC) and seal lasering steps due to the heat involved. The final temper strength retained, for the final product 100, is at the right of each graph after the evacuation (EVAC) step. It can be seen that the slowest line speed (2 inches/minute), where the substrates were pre-heated the longest, resulted in the most tempering strength being lost. However, all of these processing speeds provided for satisfactory results. These graphs in FIG. 26 show that both glass substrates 1 and 2 maintained significant temper strength of at least 13,500 psi proximate the edge of the glass, and did not suffer significant de-tempering, due to the processing including sintering/firing, pre-heating, etc. The SCALP edge data was taken at locations about 20-45 mm in from the edge of the glass.

Figure 27:
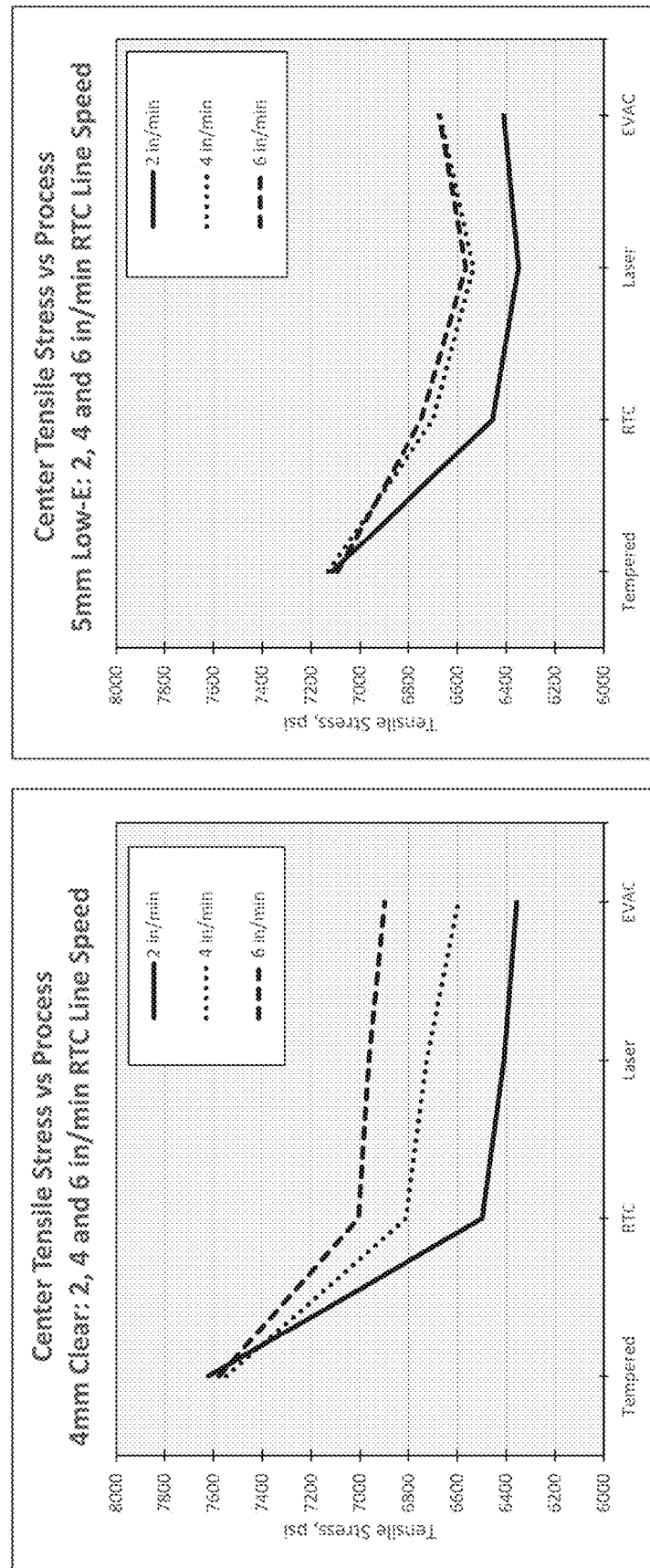
FIG. 27 illustrates graphs for both thermally tempered glass substrates of a final vacuum insulating panel according to certain example embodiments (e.g., see FIG. 2), showing average tensile stress in the central region of the glass, in the center of the glass substrates as viewed from above, as a function of line speed of the pre-heating oven.

FIG. 27 illustrates graphs for both thermally tempered glass substrates of a final vacuum insulating panel according to certain example embodiments, showing average tensile stress in the central region of the glass, in the center of the glass substrates as viewed from above, as a function of line speed of the pre-heating oven. FIG. 27 shows the tensile stress for the same examples of FIGS. 25-26, and is similar to FIGS. 25-26 except that in this figure SCALP data for tensile stress is shown. These graphs in FIG. 27 show that both glass substrates 1 and 2 maintained significant tensile stress of at least 6,000 psi in the central region of the glass (e.g., see tension zone in FIG. 23), and did not suffer significant de-tempering, due to the processing including sintering/firing, pre-heating, etc.

Figure 28:
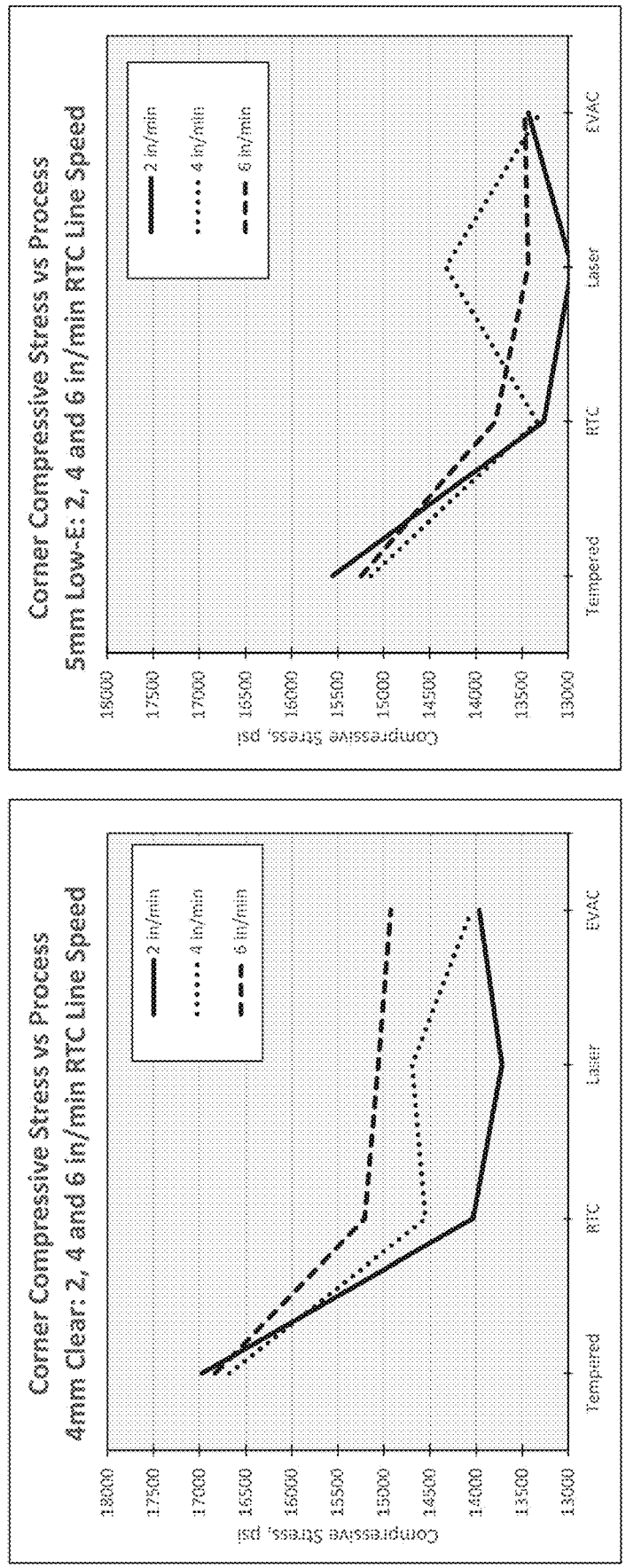
FIG. 28 illustrates graphs for both thermally tempered glass substrates of a final vacuum insulating panel according to certain example embodiments (e.g., see FIG. 2), showing average compressive stress at a corner of the glass substrates as viewed from above as a function of line speed of the pre-heating oven.

FIG. 28 illustrates graphs for both thermally tempered glass substrates of a final vacuum insulating panel according to certain example embodiments, showing average compressive stress at a corner of the glass as viewed from above, as a function of line speed of the pre-heating oven. FIG. 28 shows the compressive stress at the corner for the same examples of FIGS. 25-27, and is similar to FIGS. 25-27 except that in this figure SCALP data for average compressive stress at the corner is shown (e.g., see compression zone in FIG. 23). These graphs in FIG. 28 show that both glass substrates 1 and 2 maintained significant compressive stress of at least 12,000 psi proximate the corner of the glass, and did not suffer significant de-tempering, due to the processing including sintering/firing, pre-heating, etc. The SCALP corner data was taken, at each corner, at a location about 20-45 mm in from each edge of the glass.

At least one getter 8 may be provided on either glass substrate 1 or 2. The getter may or may not be provided over a low-E coating in certain example embodiments. FIGS. 1-6 illustrate that an example thin film getter, which may be laser-activated, coil-activated, or otherwise activated, may be positioned in a trough/recess 9 formed in the underlying substrate (e.g., substrate 2) via laser etching, laser ablating, and/or mechanical drilling. A thin film getter provides for greater relative surface area, and thus improved sorption in vacuum panel applications, compared to pill-shaped getters or other thick film getters with a thickness greater than 0.5 mm, and also its size may be easily adjusted to provided more/less sorption based on the size of the panel 100. In certain example embodiments, the depth of trough 9 may be greater than the thickness of the getter 8, as shown in FIGS. 2, 3 and 5 for example. A deep depth of the trough/pocket 9, relative to getter thickness/height, may be technically advantageous with respect to pumping speed and/or capacity (e.g., more local volume may enhance conductance around the getter and allow more getter surface area to be accessible and active). In other example embodiments, the depth of the trough may be the same as or less than the getter thickness (e.g., see FIG. 1).

Figure 24A:
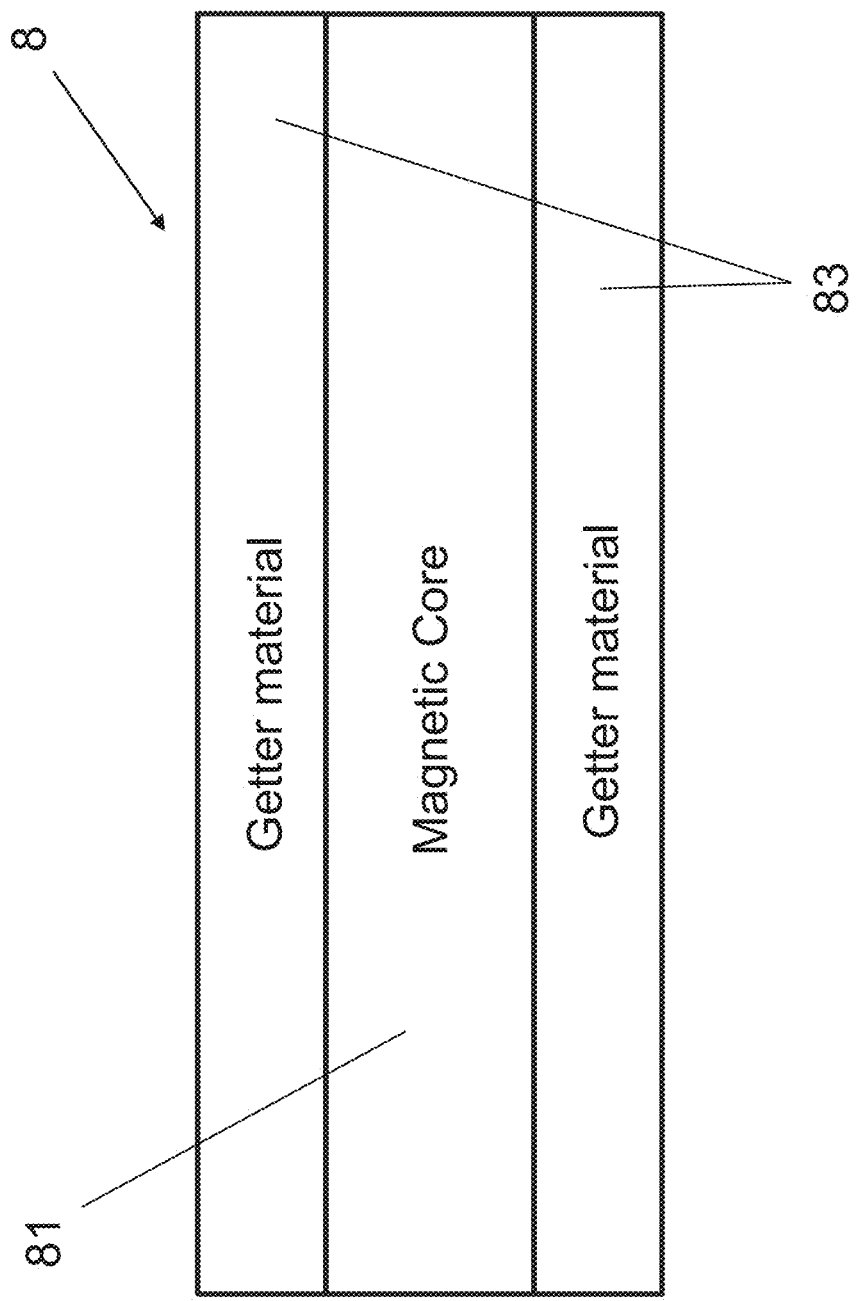
FIG. 24a is a cross-sectional view of an example getter, which may be used in combination with any embodiment herein including those of FIGS. 1-9, 11-23, 25-31.

An example thin film getter 8 is shown in FIG. 24a. Getter 8 may be a Ti-based, Ti-inclusive, V-based, V-inclusive, nickel-based, and/or nickel-inclusive getter in certain example embodiments. Thin film getter 8 may comprise a central magnetic core/base strip 81 comprising nickel plated iron for example, or the core/base 81 may be of or include a non-magnetic material such as a copper/nickel alloy. A thin layer(s)/film of getter material 83 is provided on one or both sides of the core, to at least partially cover the core. The getter material 83 may, for example, be attached to the core/base 81 by cold compression bonding without the aid of a chemical binder, or by any other suitable technique. For purposes of example, FIG. 24b illustrates elements in an example getter material 83, before and after activation, measured via EDS.

The film(s) 83 of getter material may comprise an alloy comprising one or more of Ti, Mg, Ba, V, Al, Fe, Zr, and/or Si, or any combination thereof (e.g., a Ti—V—Al—Fe—Si alloy), for example. In certain example embodiments, one or both film(s) of getter material 83 may comprise (e.g., measured via EDS elemental analysis, after being laser activated) in terms of weight %, from about 30-85% Ti (more preferably from about 50-75%, and most preferably from about 60-69%), from about 1-25% V (more preferably from about 5-17%, and most preferably from about 9-14%), from about 1-25% Si (more preferably from about 4-18%, and most preferably from about 8-14%), from about 0.5-10% Al (more preferably from about 1-7%, and most preferably from about 1-5%), and/or from about 1-25% Fe (more preferably from about 3-15%, and most preferably from about 6-12%). In certain example embodiments, in terms of wt. %, the largest % elemental presence in the getter material 83 may be Ti and V, in this order, in certain example embodiments. In certain other example embodiments, in terms of wt. %, the largest % elemental presence in the getter material 83 may be Zr, V and Fe, in this order, in certain example embodiments. In certain example embodiments, the getter material 83 may include one or more of the following elements in the following order of magnitude presence, by weight or mol percentage: Ti>V>Fe, Ti>V>Si, Ti>V>Fe>Si, Ti>V>Fe>Al, Ti>V>Fe>Si>Al, and/or Ti>V>Si>Fe. The active getter material 83 may have a high degree of porosity of about 1500 $cm^2$/grams to ensure high sorption performance in certain example embodiments.

In certain example embodiments, a thin film getter 8 may have a total thickness of from about 75-500 μm thick, more preferably from about 200-400 μm thick, more preferably from about 250-350 μm thick (an example being about 300 μm), and the core 81 may be from about 80-190 μm thick, more preferably from about 110-150 μm thick (an example being about 120 or 130 μm). Each film 83 of gettering material may be from about 40-200 μm thick, more preferably from about 70-110 μm thick (an example being from about 70-85 μm thick) in certain example embodiments. Using a magnetic core 81 in the getter 8 is advantageous for vacuum insulating panel applications, because during laser activation of the getter the magnetic core may function as a heat sink to absorb a significant amount of heat so that significant heat does not transfer to the glass substrate; this may allow significant de-tempering of the glass substrate to be avoided. In certain example embodiments the core 81 may comprises at least 40% by weight iron, more preferably at least about 50% by weight iron, and most preferably at least about 60% by weight iron, and may be coated with a metal(s) such as Ni and/or the like, or oxide(s) thereof. As viewed from above, the getter 8 may be substantially rectangular in shape (e.g., see FIG. 7), or may be otherwise shaped in other example embodiments.

In certain example embodiments, heat in excess of the softening point of the glass substrate may be used to activate the getter 8. This can lead to glass de-tempering. Certain example embodiments address this via thin film getter design (e.g., using a thin film getter, including a magnetic core), use of laser activation, and/or providing the getter 8 in trough 9. Laser ablation of the float glass is an example technique to form trough 9 in the glass substrate to accommodate the thin film getter strip with no pressure, or substantially no pressure, on the glass. Similar to the magnetic core, this reduces heat transfer to the glass during getter activation. The getter may merely rest in the trough/pocket 9, so that no pressure, or substantially no pressure, is provided on the getter by the glass. For example, a pulsed laser may be used. Example laser parameters to form the trough/pocket 9 may include one or more of, in certain example instances, a laser frequency of 60 Hz, average power of about 10 W, pulse width of about 10-14 s, and pulse energy of about 0.1-0.3 (e.g., about 0.2) mJ. For activation, the getter strip may be laser heated by rastering a beam, such as in a spiral or other suitable pattern for example, around a rectangular path sized for the getter 8. The ablation or removal rate can be from about 0.25-8.0 $mm^3$/sec, (more preferably from about 1.0-5.0 $mm^3$/sec, and most preferably from about 1.5-3.0 $mm^3$/sec), in certain example embodiments.

Figure 24C:
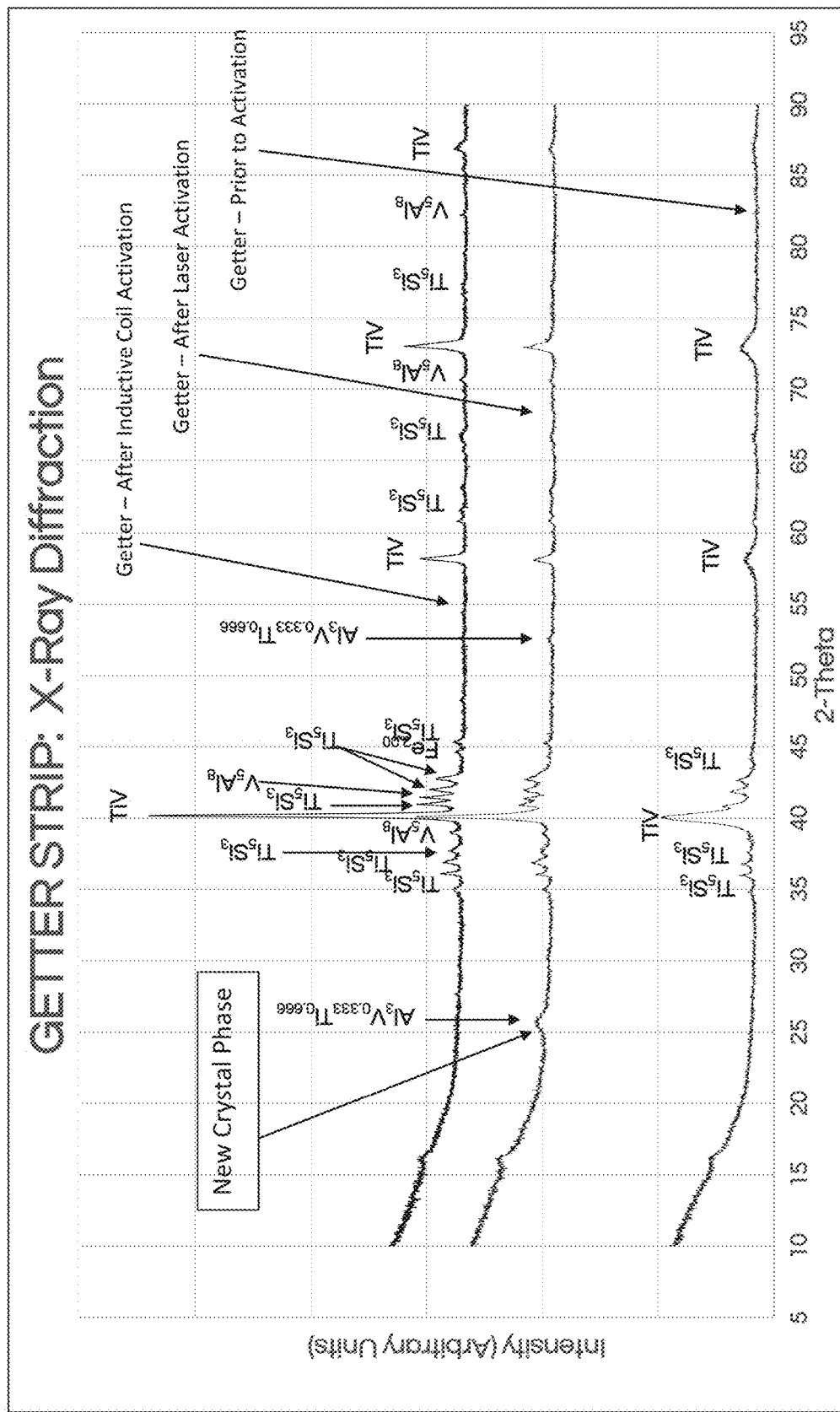
FIG. 24c is an X-ray Diffraction (XRD) graph illustrating measured data for an example getter material (a) prior to activation, in the bottom plot, (b) after laser activation, in the middle plot, and (c) after inductive coil activation, in the top plot.

Activation may take about 30 seconds or less, and the process may be designed for example to ramp the temperature of the getter to from about 600-900 degrees C. (e.g., to about 800° C.) in about 5-15 seconds (e.g., about 10 seconds). Laser spot time on the getter may be no more than about 10 seconds in certain example embodiments. In certain example embodiments, the pre-laser activated getter may comprise two major functional components—TiV and $Ti_5Si_3$—as detailed in Table 9. It has surprisingly and unexpectedly been found that optimized laser activation of the getter 8 creates two new crystallite materials, $Al_3V_{0.333}Ti_{0.667}$ and $V_5Al_8$, that are not present in the thin film getter material 83 prior to laser activation. FIG. 24c, for example, illustrates X-ray Diffraction data for an example getter strip (a) prior to activation, in the bottom plot, (b) after laser activation, in the middle plot, and (c) after inductive coil activation, in the top plot. It can be seen in FIG. 24c that the laser activation of the getter 8 causes the two new crystallite materials, $Al_3V_{0.333}Ti_{0.667}$ and $V_5Al_8$, to be formed that were not present in the thin film getter material 83 prior to laser activation, whereas the inductive coil activation does not cause this new Ti—Al—V phase (e.g., $Al_3V_{0.333}Ti_{0.667}$) crystallite material to be formed. In certain example embodiments, when there are two getter material layers 83 (e.g., see FIG. 24a), the new Ti—Al—V phase may be formed in one of the getter material layers 83 (e.g., the layer on the side where the laser beam impinges for getter activation), but need not form in the other layer 83 (e.g., backside layer).

For example, as shown in FIG. 24c and in Table 9, the formation via laser activation of the $Al_3V_{0.333}Ti_{0.667}$ material in a getter material layer 83 with a crystallite size D of about 20.3 nm, a Beta value (FWHM in radians) of about 0.0070 and two theta degree of about 25.64; and the $V_5Al_8$ with a crystallite size D of about 126.9 nm, a Beta value (FWHM in radians) of about 0.0012, and two theta degree of about 41.37, is technically advantageous in that it has been found to improve sorption efficiency of the getter 8. The XRD pattern of laser activated getter shows the peaks of $Al_3Ti_{0.666}V_{0.333}$ (e.g., at about 25.63° and 52.5°) and $V_5Al_8$ (e.g., at 38.92°, 41.37°, and 70.65°). Thus, it has been found that the laser activation is technically advantageous because it forms the new Ti—Al—V phase which results in improved sorption. As shown in FIG. 24c, in certain example embodiments, for the getter after laser activation, in a layer 83 of getter material (e.g., the layer 83 upon which the laser beam impinged during activation), at least one of the new peaks for $Al_3Ti_{0.666}V_{0.333}$ (e.g., see the peak at about 25.63°) is higher than at least one peak for $V_5Al_8$, and/or is higher than at least one peak for TiV. For example, in the laser activated getter layer 83, the new peak for $Al_3Ti_{0.666}V_{0.333}$ at about 25.630 is higher than the peak(s) for $V_5Al_8$ at about 38.92° and is higher than the peak for TiV at about 87°, as shown in FIG. 24c.

Crystallite size of materials may be calculated from XRD patterns with Debye-Scherrer Equation $D=k\lambda/\beta \cos\theta$, where D is crystallite size, k is Debye Constant 0.98, $\theta$ is Bragg angle, $\beta$ is FWHM in radians of the material's dominant peak, and, denotes wavelength. In certain example embodiments, as measured via XRD, there was no measurable crystallite size D for $Al_3Ti_{0.666}V_{0.333}$ in the getter material prior to activation thereof. However, after laser activation, in a getter material layer 83, as shown in FIG. 24c, crystallite size D for crystalline phase $Al_3Ti_{0.666}V_{0.333}$ in the getter material was measured at about 20.3 nm. In certain example embodiments, in a getter material layer 83, after laser activation, a crystallite size D for crystalline phase $Al_3Ti_{0.666}V_{0.333}$ may be at least about 10 nm, more preferably at least about 13 nm, more preferably at least about 16 nm, and most preferably at least about 18 nm. In certain example embodiments, in a getter material layer 83, after laser activation, crystallite sizes D for the following crystalline phases may be characterized by at least one of the following based on value in nm: $Al_3Ti_{0.666}V_{0.333}<V_5Al_8$, $Al_3Ti_{0.666}V_{0.333}<Ti_5Si_3$, and/or $Al_3Ti_{0.666}V_{0.333}<TiV$. In certain example embodiments, ratios of crystallite sizes D for the following crystalline phases may be characterized by at least one of the following: $V_5Al_8/Al_3Ti_{0.666}V_{0.333}$ at least about 3.0, more preferably at least about 5.0; $Ti_5Si_3/Al_3Ti_{0.666}V_{0.333}$ at least about 3.0, more preferably at least about 5.0; and/or $TiV/Al_3Ti_{0.666}V_{0.333}$ at least about 2.0, more preferably at least about 3.0, and most preferably at least about 4.5.

In addition, Table 9 demonstrates that the crystallite size of the TiV increased by about 2 times, for example 112.3 nm, and the $Ti_5Si_3$ increased by about 1.75 times, due to the laser activation of the thin film getter 8.

TABLE 9

(Example Getter Material Before/After Laser Activation)

| GETTER | Crystal | 2θ degree | beta FWHM (in radians) | Crystallite Size D (nm) |
|---|---|---|---|---|
| Pre-Laser Activated Getter | TiV | 40.14 | 0.0029 | 50.6 |
| | $Ti_5Si_3$ | 40.83 | 0.0020 | 72.4 |
| Laser Activated | TiV | 40.09 | 0.0013 | 112.3 |
| | $Ti_5Si_3$ | 40.90 | 0.0012 | 126.7 |
| | $Al_3Ti_{0.666}V_{0.333}$ | 25.64 | 0.0070 | 20.3 |
| | $V_5Al_8$ | 41.37 | 0.0012 | 126.9 |

The laser activation of the getter modifies the surface structure of the getter 8 by altering the surface morphology of the getter. After laser activation, one or more of the following may be realized for the getter 8: (i) a root mean square (RMS) surface roughness of at least about 300 nm, more preferably of at least about 400 nm, more preferably of at least about 600 nm; (ii) an average surface roughness of at least about 300 nm, more preferably of at least about 400 nm, more preferably of at least about 500 nm, and as an example of at least about 700 nm; and/or (3) a peak to valley maximum roughness of the surface of at least about 300 nm, more preferably of at least about 400 nm, more preferably of at least about 500 nm, and as an example of at least about 600 nm.

In certain example embodiments getter 8 may be positioned adjacent the edge seal 3 (e.g., see FIGS. 1-7). This is advantageous in that it allows the getter 8 to be at least partially hidden by a window sash (not shown) around the edge of the panel in window applications, so as to be aesthetically pleasing, and the getter 8 length can be increased to accommodate vacuum insulating panels 100 with larger vision areas. Other getter approaches, such as a pill-type or disc-type getter opposing the pump-out tube on the opposite substrate so as to hide the getter behind the evacuation port sealing material and evacuation tube, may be used in certain example embodiments. However, a thin film getter 8 is more desirable in certain example embodiments. For example, a pill-type getter behind the pump-out tube with a 6 mm diameter and a 1-mm thickness may have a sorption surface area of approximately 75.6-$mm^2$ and a physical volume of approximately 28.4 $mm^3$ with a realistic sorption volume of about 14.2 $mm^3$ due to diffusion limitations of the pill getter. A thin film getter can provide increased sorption surface area, which is particularly desirable for vacuum insulating panels, e.g., to deliver up to a 20-year vacuum life due to outgassing or off-gassing of contaminants in the vacuum cavity 5 due to ultraviolet light exposure and/or temperature. With the thin film getter technology, the getter sorption surface area and volume can be scaled with unit sizes and not aesthetically change the vision area of the vacuum insulating panel. For example, a double-sided thin film getter (e.g., see FIG. 24a) with a rectangular dimension of 4.0 mm by 16 mm as viewed from above may provide about 128 $mm^2$ sorption surface area and 25.6 $mm^3$ sorption volume, which are significantly greater than pill-type getters. In certain example embodiments, one or more of the following may be realized: (a) a getter surface area of at least about 70 or 75 $mm^2$ per 1.0 meter squared of vacuum panel surface area; and/or (b) an effective getter volume of at least 20 or 25 $mm^2$ per 1.0 meter squared of vacuum panel surface area. For example, a 4 mm wide by 32 mm long double-sided getter 8 may adequately sorb gasses for units up to about 2.0 meters squared, a 4.0 mm wide by 50 mm long double-sided getter 8 may adequately sorb gasses for units up to 3.0 meters squared, a 4 mm wide by 62 mm long double-sided getter 8 may adequately sorb gasses for units up to 4 meters squared, and/or a 4 mm wide by 80 mm long double-sided getter 8 may adequately sorb gasses for units up to about 5 meters squared. In certain example embodiments, the entire getter 8, or at least part of the getter 8, may be within 4.0 mm, more preferably within about 2.0 mm, more preferably within about 1.0 mm, of an interior edge of the edge seal 3 as viewed from above. In certain example embodiments, the lengthwise direction of the thin film getter 8 may be substantially parallel (e.g., parallel+/−10 degrees) to the lengthwise direction of the adjacent edge seal 3 (e.g., see FIG. 7).

Figure 8A:
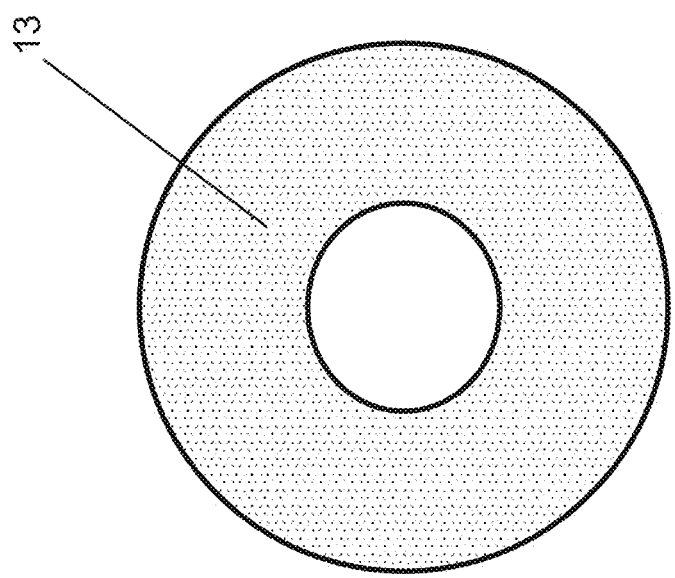
FIG. 8a is a top view of a ceramic preform to be used for a pump-out tube seal according to an example embodiment, which may be used in combination with any embodiment herein including those of FIGS. 1-7, 9, 11-31.

FIG. 8a is a top view of a ceramic substantially donut-shaped (or substantially ring-shaped) preform 13 to be used for a seal around pump-out tube 12 according to an example embodiment, which may be used in combination with any embodiment herein including those of FIGS. 1-7. FIG. 8b is a cross-sectional view of a ceramic preform seal of FIG. 8a according to an example embodiment, and FIG. 8c is a schematic cross-sectional diagram of the preform seal of FIGS. 8a-8b being laser fired/sintered around the pump-out tube, according to an example embodiment. The preform 13 may be formed substantially in a shape of a donut prior to being inserted into the countersunk recess 15 (e.g., double countersink drilled hole shown in FIGS. 1-6) surrounding the pump-out tube 12, as shown in FIGS. 1-8 for example. The donut shape is advantageous in that it increases irradiation surface area at a given geometric configuration, allowing for the preform to be quickly sintered/fired without exposing the adjacent glass to significant de-tempering. As shown in FIGS. 8b-8c, a sidewall 13a of the preform 13 may be angled to expose more surface area of the preform to impingement by a substantially donut-shaped (or substantially ring-shaped) laser beam 13b from above. Sidewall(s) 13a of the preform may or may not be angled relative to the vertical, in different example embodiments. In certain example embodiments, the acute angle which the sidewall 13a may form with the bottom surface 13c of the preform may be from about 10-85 degrees, more preferably from about 30-80 degrees, more preferably from about 40-70 degrees, and most preferably from about 45-60 degrees, with an example being 52.5 degrees as shown in FIGS. 8b-8c, to expose more seal material surface area to the laser beam 13b thereby allowing for the preform to be more quickly sintered/fired without exposing the surrounding glass to significant de-tempering. This allows heat from the laser to be more efficiently transferred to the interfaces between the tube and the preform, and between the preform and the substrate. Thus, in certain example embodiments, the size (e.g., outer diameter) of the top wall 13d of preform 13 may be smaller than the size (e.g., outer diameter) of the bottom wall 13c of the preform. Top wall 13d and bottom wall 13c are substantially parallel to each other in certain example embodiments. In certain example embodiments, the size (e.g., outer diameter) of the upper surface 13d or top wall may be from about 3-9 mm, more preferably from about 5-7 mm; an outer diameter of the pump-out tube 12 may be from about 2-6 mm, more preferably from about 2-4 mm; and/or the height/thickness of the preform 13 may be from about 0.5 to 12.0 mm, more preferably from about 0.5 to 3.0 mm, and most preferably from about 1.0 to 1.4 mm.

Pump-out tube seal preform 13 may be of or including the same material discussed herein used for main seal layer 30 in certain example embodiments, although it may be made of different materials (e.g., see example materials for preform seal 13 in FIGS. 11, 12 and 14, and in Tables 1A-1E and Table 2 above). Alternatively, the pump-out tube seal preform 13 may be of or including the material shown in FIG. 29 in other example embodiments, which is also based on tellurium oxide and vanadium oxide. For example, in certain example embodiments, the main seal layer 30 may utilize at least polypropylene (PP) carbonate as a binder, whereas the perform 13 may instead utilize material such as ethyl cellulose as a binder due to its cold pressing and preform nature. Perform 13 may be inserted into recess 15, with or without a previously inserted primer layer similar to 31 and/or 32, although in certain example embodiments no primer is used so that the preform 13 directly contacts the glass at the bottom of the recess 15. The seal 13 may be made of other suitable materials.

The material for the pump-out tube seal may be cold pressed to form the substantially disc-shaped preform 13, with the cold pressed preform 13 then being inserted into the recess 15 together with, before, or after, the pump-out tube 12. Preform 13 may be partially melted to the adjacent glass substrate in the countersunk recess/hole 15 during a main binder burnout and/or pre-glaze step. Thereafter, the main seal layer 13 may be sintered. Before or after sintering/firing of main seal layer 30, preform 13 may be sintered/fired via laser sintering or other type(s) of heating. In certain example embodiments, the laser sintering/firing of the preform 13 may be done in multiple steps, such as a first step (e.g., 3.47 A/power 26 W) from about 20-40 seconds, and a second step (e.g., 3.65 A/power 28 W) for about 3-10 seconds. In an example embodiment, the preform 13 may be laser fired/sintered using an example lasing time (e.g., 53 W at 5.98 A) via a dwell time of from about 20-80 seconds, for an example preform thickness(es) of from about 1 to 2.5 mm, and/or shear strength test results were well above a threshold of 1.0 MPa for samples with no stressor and/or water immersion stressor. In an example embodiment, preform seal 13 may be sintered/fired using a different laser than used for sintering seal layer 30, such as a laser used with optics to allow a substantially collimated donut-shaped laser beam 13b (e.g., having a cross-section substantially in the form of the preform shown in FIG. 8) to heat the preform 13 without significantly heating the tube. In certain example embodiments, as shown in FIG. 8c, the donut-shaped laser beam 13b may be spaced apart from and not directly impinge upon the pump-out tube 12. After the main seal layer 30 and perform seal 13 have been sintered/fired, the mated unit may be evacuated to low pressure via pump-out tube 12, the getter 8 activated such as via laser, and the tip of pump out tube 12 may be closed off/sealed via heating such as via laser. The mated unit may then be cooled and a protective cap 14 may be applied over the sealed tube 12.

Figure 31:
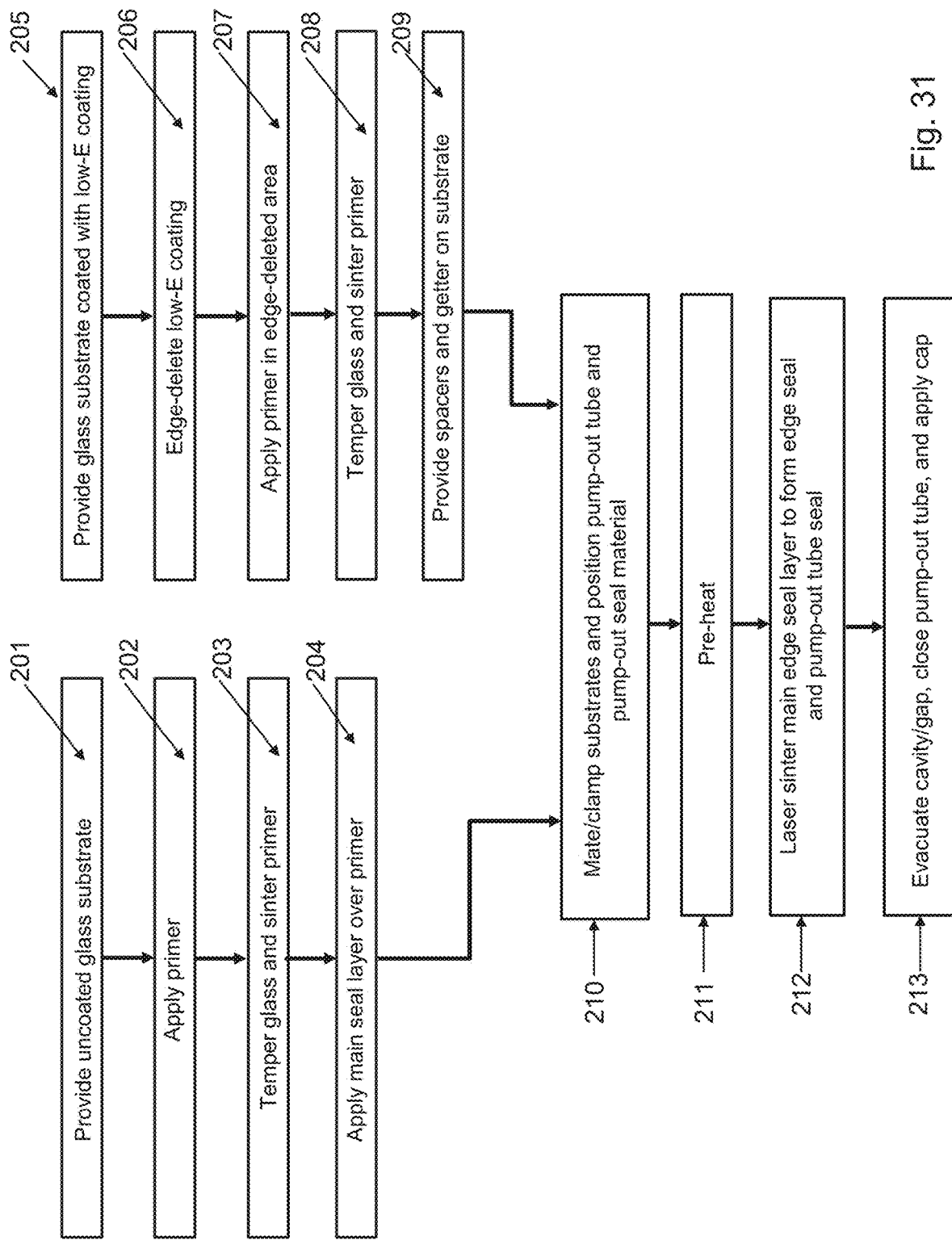
FIG. 31 is a flowchart illustrating example steps in making a vacuum insulating panel according to various example embodiments, which may be used in combination with any embodiment herein including those of FIGS. 1-9, 11-28.

FIG. 31 is a flowchart illustrating example steps in making a vacuum insulating panel according to various example embodiments, which may be used in combination with any embodiment herein. Steps 201-204 apply to one of the two substrates, while steps 205-209 apply to the other one of the substrates, and steps 210-213 apply when the substrates are mated to each other via clamping, sealing, and/or the like.

A substrate (e.g., substrate 1 in FIG. 2) is provided in step 201, and another substrate (e.g., substrate 2 in FIG. 2) is provided in step 205. The substrate in step 205 may have a low-E coating 7 provided thereon, which may be edge-deleted in step 206. A primer layer (e.g., 31 in FIG. 2) may be applied to the corresponding substrate (e.g., substrate 1 in FIG. 2) in step 202, whereas the other primer layer (e.g., 32 in FIG. 2) may be applied to the other substrate (e.g., substrate 2 in FIG. 2) in step 207. In various example embodiments, one or both ceramic sealing glass primer layers 31-32 may be boron oxide inclusive and/or bismuth oxide inclusive, and may be applied using silk screen printing, digital printing, pad printing, extrusion coating, ceramic spray coating or nozzle dispense methods. The primer layer(s) 31 and/or 32 may be deposited to achieve a sintered width of about 10 mm around the periphery of the substrates. In certain example embodiments, one or both primer layers may be applied to the glass surface at a thickness from about 40% to 60% higher than the desired target thickness. In an example embodiment, each primer layer as initially deposited may have a solids content of about 75 wt %, solvent about 24 wt. %, and binder about 1 wt. %. The substrates, with respective primers thereon, may then be thermally heated to remove solvents in the material using one of the following substrate heating methods or a combination thereof: radiation, convection, induction, microwave or conduction. The substrates may be heated between 100 degrees C. to 250 degrees C. for 30 seconds to ten minutes to remove the solvents from the sealing glass material with an example temperature being 180 degrees C. for about 4 minutes. Substrates may then be thermally heated to remove organic resin materials in the sealing glass primer material using one of the following substrate heating methods or a combination thereof; radiation, convection, induction, microwave or conduction, such as for example to from 275 degrees C. to 400 degrees C. for 30 seconds to ten minutes with an example temperature being about 320 degrees C. for 6 minutes. The removal of the organic resin material from the primers may be referred to as ceramic sealing glass binder burnout. In steps 203 and 208, the substrates may then be thermally heated for thermally tempering the glass substrates and to sinter and fire the ceramic primer material to the desired physical thickness and material properties using one of the following substrate heating methods or a combination thereof: radiation, convection, induction, microwave or conduction. For example, the substrates 1 and 2 may be heated to from between 575 degrees C. to 700 degrees C. for 30 seconds to five minutes depending on the thickness of the substrates with an example temperature being 625 degrees C. at a rate of 30 seconds per mm of uncoated glass thickness and 60 second per mm of Low-E coated glass thickness. Thus, the primer layers 31-32 are fired/sintered when the corresponding glass substrates 1 and 2 are thermally tempered, in certain example embodiments, in steps 203 and 208. When heat strengthen glass is used instead of tempered glass, in certain example embodiments, the primer layers 31 and/or 32 may be sintered in a step that does not involve tempering. Thus, the primer layers may be dried at a temperature of about 180 degrees C. to substantially remove solvents in the sealing glass matrix using thermal heat, and then be thermally heated a temperature of about 320 degrees C. to burn out the resin binders that provide the carrier vehicle for the sealing glass paste material, and then be sintered at 625 degrees C. while the glass substrates 1, 2 are thermally tempered to achieve desired properties.

In certain example embodiments, the sintered/fired primer layers 31-32 may be opaque or semi-opaque to visible light with an optical density>0.80 or >0.250. In an example embodiment, a sinter/fired primer may have a physical thickness between about 20 to 240 microns, more preferably from about 160 microns to about 240 microns, with an example thickness(es) of about 145 or 200 microns for primer layer 32, and about 45 microns for primer layer 31. The primer layer on one substrate may be deposited substantially thicker than the primer layer on the other substrate. The primer layer(s) may be opaque or substantially opaque to laser energy over the spectral range of 370 nm to 1500 nm above a minimum thickness, but may transmit a reasonable amount of laser energy at thicknesses below 60 microns for example. The total perimeter seal thickness may be about 280 microns. The thicknesses of the thick primer layer 32, thin primer layer 31 and main seal layer 30 can be optimized to attain desired processing conditions.

In certain example embodiments, in steps 203 and 208, the primer layers 31 and 32 may bond to and/or diffuse into the respective glass substrates upon which they are located since the glass substrates 1, 2 are above the glass softening point, and create a high adhesion strength to the glass substrates. Interdiffusion of the primer layer(s) into the respective glass substrate(s) results in a high adhesion strength to the glass substrates, as for example $SiO_2$ in the primer layer(s) bond to a silicon-rich layer in a soda lime silicate float glass in certain example embodiments. For example, adhesion strength using lap shear mechanical test methods may be from about 60-120 kg per $cm^2$, which is higher than the modulus of rupture of soda lime silicate glass substrates. The primer layers may have a high degree of hermeticity, e.g., less than $1\times10^{-8}$ $cc/m^2/day$ of vacuum loss, low moisture vapor transmission rates, and/or provide high levels of mechanical adhesion to the glass substrates, in certain example embodiments. The primer layers may have a CTE of about $8.0-8.80\times10^{-6}$ or about $8.2-8.35\times10^{-6}$, and may act as a CTE buffer between the glass substrates with a CTE of about 8.8-9.2 (e.g., about $9.0\times10^{-6}$) and the main seal layer 30 with a CTE of about $7.2-8.0\times10^{-6}$ or $7.4-8.0\times10^{-6}$ (e.g., about $7.60\times10^{-6}$) in certain example embodiments.

In step 204, the ceramic sealing glass main layer 30 (e.g., which may be Te oxide based or inclusive) may then applied to one of the glass substrates over the primer layer (e.g., over primer 31, or over primer 32), such as via silkscreen printing, ceramic spray, extrusion coating, digital printing, pad printing, nozzle dispense or other commercially available ceramic sealing material application methods. The layer 30 may have tellurium oxide as a material with the highest weight percentage and vanadium oxide as a material with the second highest weight percentage, in certain example embodiments. Layer 30 may initially be applied at a thickness that is 30-60% higher (or 40-60% higher) than the desired target thickness for the layer. The main seal layer 30 may then be thermally dried to remove solvents in the sealing glass matrix. The substrate may be thermally heated to remove solvents in the material using one of the following substrate heating methods or a combination thereof, radiation, convection, induction, microwave and/or conduction. The substrate may be heated between 100 degrees C. to 250 degrees C. for 30 seconds to ten minutes to remove the solvents from the material with an example temperature being about 180 degrees C. for about 4 minutes.

After the spacers are provided on a substrate in step 209, the two glass substrates 1 and 2 may then be mated together and clamped around the periphery of the vacuum insulated unit to create a mated unit in step 210. The pump-out tube 12 and preform 13 may be applied to the substrate having recess 15 between steps 210 and 211 in certain example embodiments. The mated unit may then be thermally heated to burn out the resin binders that provide the carrier vehicle for the sealing glass paste material and then pre-glazed at a temperature of about 370 degrees C. to impart mechanical strength properties and performance between the main layer and primer layer(s). For example, mechanical adhesion strength after the mated unit has been pre-glazed may be about 30 kg per $cm^2$ and can be up to 100 kg per $cm^2$. For example, the perimeter of the vacuum insulated glass unit may be physically clamped with a controlled pressure to assist in setting the final thickness/height of the edge seal 3. The substrates may then be thermally heated to remove organic resin materials in the main sealing glass material 30 using one of the following substrate heating methods or a combination thereof; radiation, convection, induction, microwave or conduction. The binder burnout duration may be optimized so that much or substantially all binder is removed from the main layer 30 and the target density and/or porosity may be achieved. After binder burnout of the main layer 30, the physical thickness may be about 10% to 20% thicker than the target final thickness. In various example embodiments, a heating ramp rate(s) may be provided for the binder burn-out, so that air pores or air sinks may be removed from the main layer 30 to create a sealing glass layer with a high density and/or controlled/limited porosity. An example temperature ramp rate may be between about 4 degrees C. per minute and 20 degrees C. per minute, between the initial binder burnout temperature and the main layer glass transition temperature to burn out binder to a given level, as residual carbon in the main layer may impact vacuum cavity pressure. The mated unit may be heated between 250 degrees C. to 350 degrees C. for 30 seconds to twenty minutes with an example material temperature of 320 degrees C. and a duration of 8 minutes, in certain example embodiments; and/or heated between 340 degrees C. to 390 degrees C. for 30 seconds to ten minutes with an example material temperature of 370 degrees C. and a duration of 8 minutes. The mated unit may be heated to about 370 degrees C. to pre-glaze the main layer 30 in certain example embodiments. The pre-glaze may one or more of: (1) create a strong mechanical bond between the primer layer(s) and the main seal layer; (2) the main seal layer may reach or substantially reach its target thickness so the mechanical clamps may be removed prior to laser sintering; and/or (3) reduce process requirements for the laser to enable high linear rates. For example, prior attempts to use laser sintering for vacuum insulated glass have been problematic because the laser used to pre-glaze the material, wet the interfaces, sinter the material and melt the material to remove air pores; most sealing glass materials have a pre-glaze temperature in the range of 420 to 460 degrees C. which is too high and will de-temper the glass during processing. In certain example embodiments, we are able to use a low-temperature sealing glass that is pre-glazed for a short duration (e.g., at 370 degrees C.) thereby significantly reducing processing requirements for laser wetting, sintering and/or melting. In certain example embodiments, main seal layer 30 pre-glaze density may be from 3.0-4.0 or 3.2-3.8 grams per $cm^2$, with an example being about 3.6 grams per $cm^2$. In certain example embodiments, mechanical adhesion strength after the mated unit has been pre-glazed may be about 30 kg per $cm^2$ and can be up to at least 100 kg per $cm^2$.

In step 211, the mated unit may then be pre-heated to an ambient temperature of about 320 degrees C. (e.g., see pre-heating discussion above). The mated unit can be pre-heated using radiation, convection and/or conduction for example, with an example being a precision hot plate incorporating convective heating to achieve desired thermal uniformity across the substrate surfaces. The mated pair may be heated to 320 degrees C. to minimize or reduce the thermal delta between the glass substrate temperature and the sintering/melting point of the main seal layer 30 (e.g., which may be from about 390 degrees C. to 410 degrees C.) in certain example embodiments, so as to reduce transient thermal stress in the sealing glass materials. For example, transient thermal stress may be about 50 MPa without pre-heating to raise the ambient substrate temperature versus less than 10 MPa with pre-heating the glass substrates to about 320 degrees C.

In step 212, a laser (e.g., an 800 nm, 808 nm, 810 nm, or 940 nm continuous wave laser) 41 may then be used to locally and selectively sinter/fire the main seal layer 30. For example, the laser 41 and/or laser beam 40 may move around the periphery of the vacuum insulated unit using an XYZ gantry robot at a defined linear rate to wet the interface between the fully sintered primer layers 31, 32 and the pre-glazed main seal layer 30, sinter the main seal layer 30 to its final state (e.g., thickness, density and porosity) and to melt or partially melt the material to reduce the size of air pores in the main seal layer 30 and/or at the main layer to primer interface. The laser linear speed, laser power, laser beam size, laser irradiation time, and/or laser thermal decay time may be optimized to achieve desired physical, chemical and/or mechanical properties. For example, the main seal layer 30 may be processed to achieve a sintered width of about 6 mm around the periphery of the vacuum insulated unit. In certain example embodiments, the main layer may be sintered and/or melted using the principle of thermal diffusivity, instead of direct photopic radiation. The glass substrates 1 and 2 may be substantially transparent to the laser energy for example, with around 80% of the laser energy reaching the thin primer layer 31. The thin primer layer 31 at a thickness of 40 microns for example, may act as a graded absorbing layer wherein around 20% of the photopic radiation reaches the primer layer 31 to main seal layer 30 interface. The thickness of the thin primer layer 31 and main seal layer 30 may be optimized to allow the main layer to be sintered and/or melted at a given laser linear rate, power level, beam size, irradiation spot time and/or spot temperature using the principle of thermal diffusivity. The thin primer layer 31 and main seal layer 30 thermal conductivity and density may be designed to increase or maximize the thermal diffusivity rate between the two layers. The seal 13 around the pump-out tube 12 may be laser sintered/fired using the same or a different laser. In various example embodiments, a continuous wave 808-nm or 810-nm laser may be used to one or more of: (1) wet the surface or interface between the thin primer layer 31 and main seal layer 30 and the thick primer layer 32 and the main seal layer 30 to achieve for example a target 40 $kg/cm^2$ mechanical adhesion; (2) locally sinter/fire the main seal layer 30 to densify material; and/or (3) locally melt the main layer material to fill in air voids/pores at the main seal layer 30 to primer layer(s) interface(s) that were generated during the main seal layer application process. While any type of laser may be used in various embodiments for sintering layer 30, a continuous wave laser may be preferred over a scanning/rastering laser scanning lasers may involve multiple pulses at a given irradiation spot resulting in a series of heating and cooling events that can increase transient stress and raise the final residual stress, which could result in micro-cracks that result in no or poor hermeticity. The sintered main seal layer 30 may have an example density of about 3.16 g/cc (g/$cm^3$) which is considerably higher than the soda lime silicate base glass, 2.50 g/cc, and a porosity of less than 0.02%.

In various example embodiments, wetting, sintering and/or melting may be achieved using localized laser energy to raise the main seal layer 30 material from the ambient substrate temperature (e.g., 320 degrees C.) to an example target temperature range of about 390 degrees C. to about 410 degrees C., based on using thermal diffusivity based on Fourier's Law to transfer heat from the laser power source to the main sealing glass layer 30 passing through a semi-transparent glass substrate, opaque to semi-transparent thin primer layer 31, and the semi-opaque or opaque main layer 30, as opposed to direct photopic radiation from the laser beam itself. In various example embodiments, the overall thickness of the thin primer layer 31 and the main seal layer 30 may be based on the thermal diffusivity rate and/or irradiation time. In various embodiments, the laser beam 40 shape may be Gaussian with the area above an example target temperature range of 425 degrees C. to 450 degrees C. possibly comprising at least 70% of the Gaussian profile or preferably at least 85% of the Gaussian profile. The laser beam shape may be a rectangular or plateau shaped beam with at least 80% of the profile above an example target temperature range of 425 degrees C. to 450 degrees C., for example 90% of the profile being above an example target temperature range of 425 degrees C. to 450 degrees C. In various example embodiments, the laser may heat the main seal layer 30 material to a temperature between 370 degrees C. and 430 degrees C., for example from about 390 degrees C. and 410 degrees C., to sinter the main layer sealing glass material. The laser peak temperature at the glass substrate may be between 425 degrees C. and 450 degrees C., with an example of about 435 degrees C. as measured by pyrometer, in certain example embodiments. The ceramics sealing glass temperature may, for instance, be represented by the following formula in certain example embodiments:

$$T=KP/(a^2 \times \mathrm{SQRT}(v \times D \times e \times L))$$

Where K=Scaling Coefficient; P=Laser Power; a=beam diameter; D heat diffusivity; e=laser radiation absorption in the sealing glass material(s); and L=sealing glass height. In certain example embodiments, the vacuum insulated glass unit may be heated on a hot plate over a temperature range of 275 degrees C. and 350 degrees C. (e.g., 320 degrees C.) for the pre-heating. Preheating of the vacuum insulated glass unit may lead to a noticeable decrease of laser energy demand for the forming of reliable joining of the two substrates. Preheating may increase the process window relative to too much energy demand causing cracks in the ceramic sealing glass materials and/or insufficient energy demand resulting in delamination sites due to insufficient mechanical bonding between the main seal ceramic sealing glass material and the primer(s). Laser power levels may be reduced up to 50 percent with elevated substrate temperatures and there may be marked reduction in ceramic sealing glass micro-cracking during the cooling phase of the process.

In step 213, the vacuum insulating panel is then evacuated to a low pressure using the pump-out tube 12, the tube closed off, and a cap 14 may be applied thereto. For example, the vacuum insulating panel may have one or more of: a compressive surface stress of at least about 12,000 psi, a central tensile stress of at least about 6,000 psi, a center to edge stress gradient of no more than about 2,000 psi, a glass edge stress greater than about 9,700 psi, a high degree of hermeticity of about $1 \times 10^{-8}$ cc/m$^2$/day, a lap shear mechanical strength of at least 30 kg per cm$^2$, a high thermal edge strength supporting an inner to outer glass substrate asymmetric thermal stress load of at least 70 degrees C., and/or any combination thereof.

In certain example embodiments, there may be provided a thermally insulating glass panel comprising: first and second spaced apart glass substrates defining a low pressure space therebetween having a pressure less than atmospheric pressure; a plurality of spacers disposed between at least said first and second glass substrates for spacing said substrates from one another in order to maintain said low pressure space therebetween; and a hermetic edge and/or peripheral seal including at least one sealing material. In certain example embodiments, one or more of a range of primer and/or main seal layer thicknesses, transparent and/or opaque primer layers, laser wavelengths, and/or laser processing conditions, or any combination thereof, may be provided to achieve desired physical, chemical and/or mechanical properties, and vacuum insulated unit end product configurations. Certain example embodiments may relate to vacuum insulating panels optimized for high-speed manufacturing utilizing one or more of thermal pre-glazing, localized laser sintering, and/or localized laser melting of the perimeter main sealing glass material(s).

In an example embodiment, there may be provided a vacuum insulating panel comprising: a first substrate (e.g. 1 or 2); a second substrate (e.g., the other of 1 or 2); a plurality of spacers (e.g., 4) provided in a gap (e.g., 5) between at least the first and second substrates, wherein the gap (e.g., 5) is at a pressure less than atmospheric pressure; a seal (e.g., 3) provided between at least the first and second substrates, wherein the seal may comprise a first seal layer (e.g., 30) and a second seal layer (e.g., 31 or 32); and wherein the first seal layer (e.g., 30) may have a density of from about 2.8-4.0 g/cm$^3$, the second seal layer (e.g., 31 or 32) may have a density of from about 3.0-4.2 g/cm$^3$, and wherein the density of the second seal layer may be at least about 0.20 g/cm$^3$ greater, more preferably at least about 0.30 g/cm$^3$ greater, more preferably at least about 0.40 g/cm$^3$ greater, than the density of the first seal layer.

In the vacuum insulating panel of the immediately preceding paragraph, the density of the first seal layer may be at least about 3.00 g/cm$^3$, more preferably at least about 3.20 g/cm$^3$.

In the vacuum insulating panel of any of the preceding two paragraphs, the density of the first seal layer may be from about 3.10-3.70 g/cm$^3$, and/or the density of the second seal layer may be from about 3.3-4.0 g/cm$^3$.

In the vacuum insulating panel of any of the preceding three paragraphs, the density of the first seal layer may be from about 3.15-3.40 g/cm$^3$ and/or the density of the second seal layer may be from about 3.5-3.8 g/cm$^3$.

In the vacuum insulating panel of any of the preceding four paragraphs, the first and second seal layers may comprise ceramic and/or may be substantially lead-free.

In the vacuum insulating panel of any of the preceding five paragraphs, the first seal layer may comprise from about 20-80 wt. % tellurium oxide. The tellurium oxide may comprise $TeO_4$ and $TeO_3$, and the first seal layer may comprise more $TeO_3$ than $TeO_4$ by wt. %.

In the vacuum insulating panel of any of the preceding six paragraphs, from about 60-95% (more preferably from about 70-90%) of Te in the first seal layer may be in a form of $TeO_3$.

In the vacuum insulating panel of any of the preceding seven paragraphs, the first seal layer may comprises from about 40-70 wt. % tellurium oxide.

In the vacuum insulating panel of any of the preceding eight paragraphs, the first seal layer may comprise from about 10-50 wt. % vanadium oxide, and wherein the first seal layer by wt. % may comprise more tellurium oxide than vanadium oxide. The vanadium oxide may comprise $VO_2$ and $V_2O_5$, and the first seal layer may comprise more $VO_2$ than $V_2O_5$.

In the vacuum insulating panel of any of the preceding nine paragraphs, from about 50-75% of the V in the first seal layer may be in a form of $VO_2$.

In the vacuum insulating panel of any of the preceding ten paragraphs, the first seal layer may comprise from about 12-40 wt. % vanadium oxide and from about 3-30 wt. % aluminum oxide.

In the vacuum insulating panel of any of the preceding eleven paragraphs, the first seal layer may be a main seal layer and/or the second seal layer may be a primer layer.

In the vacuum insulating panel of any of the preceding twelve paragraphs, the second seal layer may comprise bismuth oxide and/or boron oxide. The second seal layer may comprise from about 1-40 mol % bismuth and from about 3-40 mol % boron on an elemental basis, and comprises at least two times more boron (B) than bismuth (Bi) on an elemental basis in terms of mol %.

In the vacuum insulating panel of any of the preceding thirteen paragraphs, the seal may further comprise a third seal layer, wherein the first seal layer may be located between at least the second and third seal layers; for at least one location of the seal the first seal layer may have a first thickness, the second seal layer may have a second thickness, and the third seal layer may have a third thickness, wherein the first thickness may be greater than the second thickness and less than the third thickness. The third seal layer may be a primer seal layer and may comprise bismuth oxide and/or boron oxide.

In the vacuum insulating panel of any of the preceding fourteen paragraphs, the first seal layer may have an average particle size (D50) of from about 5-25 µm, more preferably from about 5-20 µm, more preferably from about 10-15 µm.

In the vacuum insulating panel of any of the preceding fifteen paragraphs, a thickness of the first seal layer (e.g., 30) may be at least about 30 µm thinner than a thickness of the second seal layer (e.g., 31).

In the vacuum insulating panel of any of the preceding sixteen paragraphs, for at least one location of the seal, a width of the first seal layer may be less than a width of the second seal layer by at least about 1 mm.

In the vacuum insulating panel of any of the preceding seventeen paragraphs, the seal may be an edge seal of the vacuum insulating panel.

In the vacuum insulating panel of any of the preceding eighteen paragraphs, for at least one location of the seal as viewed cross-sectionally, an outer lateral edge of the first seal layer may be spaced inwardly from an outer lateral edge of the second seal layer by an offset distance of at least about 0.5 mm, more preferably by at least about 1.0 mm.

In the vacuum insulating panel of any of the preceding nineteen paragraphs, the first and second substrates may comprise heat strengthened glass substrates or tempered glass substrates.

In the vacuum insulating panel of any of the preceding twenty paragraphs, the seal may comprise a third seal layer, wherein the first seal layer may be located between at least the second and third seal layers, and for at least one location of the seal the first seal layer may have a first thickness, the second seal layer may have a second thickness, and the third seal layer may have a third thickness, wherein the first thickness may be greater than the second thickness and less than the third thickness.

In the vacuum insulating panel of any of the preceding twenty-one paragraphs, the panel may be configured for use in a window.

In the vacuum insulating panel of any of the preceding twenty-two paragraphs, the seal may be a hermetic edge seal.

A vacuum insulating panel of any of the preceding twenty-three paragraphs may be made via a method of making a vacuum insulating panel, where the method may comprise: having a first glass substrate; having a second glass substrate; providing a plurality of spacers in a gap between at least the first and second glass substrates; forming a hermetic edge seal, comprising a first seal layer, between at least the first and second substrates, wherein the first seal layer may comprise tellurium oxide and vanadium oxide, and wherein the first seal layer may comprise, on a wt. %, more tellurium oxide than vanadium oxide, and wherein the tellurium oxide may comprise $TeO_4$ and $TeO_3$, and the vanadium oxide may comprise $VO_2$ and $V_2O_5$, wherein the first seal layer may comprise more $VO_2$ than $V_2O_5$ by wt. %, and more $TeO_3$ than $TeO_4$ by wt. %; and wherein said forming the hermetic edge seal may comprise using a laser (e.g., near-IR laser) to fire and/or sinter the first seal layer, so that after evacuation of the gap to a pressure less than atmospheric pressure the first seal layer may have a density of from about 2.8-4.0 $g/cm^3$.

In an example embodiment, there may be provided a vacuum insulating panel comprising: a first substrate; a second substrate; a plurality of spacers provided in a gap between at least the first and second substrates, wherein the gap is at a pressure less than atmospheric pressure; a seal provided between at least the first substrate and the second substrate, the seal comprising a first seal layer; wherein the first seal layer may comprise tellurium oxide and vanadium oxide; wherein the first seal layer may comprise, on a wt. %, more tellurium oxide than vanadium oxide, and may have a density of from about 2.8-4.0 $g/cm^3$.

In the vacuum insulating panel of the immediately preceding paragraph, the density of the first seal layer may be at least about 3.00 $g/cm^3$, preferably from about 3.10-3.70 $g/cm^3$.

In the vacuum insulating panel of any of the preceding two paragraphs, the density of the first seal layer may be at least about 3.20 $g/cm^3$.

In the vacuum insulating panel of any of the preceding three paragraphs, the seal may further comprise second and third seal layers, the first seal layer being located at least partially between at least the second and third seal layers, and wherein the density of the first seal layer may be from about 3.15-3.40 $g/cm^3$, a density of the second seal layer may be from about 3.5-3.8 $g/cm^3$, and a density of the third seal layer may be from about 3.5-3.8 $g/cm^3$.

In the vacuum insulating panel of any of the preceding four paragraphs, the first seal layer may be a ceramic seal layer, the seal may be substantially lead-free.

In the vacuum insulating panel of any of the preceding five paragraphs, the first seal layer may comprise from about 20-80 wt. % tellurium oxide. The tellurium oxide may comprise $TeO_4$ and $TeO_3$, and wherein the first seal layer may comprise more $TeO_3$ than $TeO_4$ by wt. %.

In the vacuum insulating panel of any of the preceding six paragraphs, from about 60-95% of Te in the first seal layer may be in a form of $TeO_3$, more preferably from about 70-90% of Te in the first seal layer may be in a form of $TeO_3$.

In the vacuum insulating panel of any of the preceding seven paragraphs, the first seal layer may comprise from about 40-70 wt. % tellurium oxide.

In the vacuum insulating panel of any of the preceding eight paragraphs, the first seal layer may comprise from about 10-50 wt. % vanadium oxide, and the vanadium oxide may comprise $VO_2$ and $V_2O_5$, and wherein the first seal layer may comprise more $VO_2$ than $V_2O_5$ by wt. %.

In the vacuum insulating panel of any of the preceding nine paragraphs, from about 50-75% of V in the first seal layer may be in a form of $VO_2$.

In the vacuum insulating panel of any of the preceding ten paragraphs, the first seal layer may comprise from about 12-40 wt. % vanadium oxide and from about 3-30 wt. % aluminum oxide.

In the vacuum insulating panel of any of the preceding eleven paragraphs, the first seal layer may have an average particle size (D50) of from about 5-20 µm.

In the vacuum insulating panel of any of the preceding twelve paragraphs, the seal may be a hermetic edge seal of the vacuum insulating panel.

In the vacuum insulating panel of any of the preceding thirteen paragraphs, the first and second substrates may comprise heat strengthened glass substrates, or tempered glass substrates.

In the vacuum insulating panel of any of the preceding fourteen paragraphs, the panel may be configured for use in a window.

It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "A, B, or C," each of which may include any one of the items listed together in the corresponding one of the phrases, or all possible combinations thereof. Terms such as "first", "second", or "first" or "second" may simply be used to distinguish the component from other components in question, and do not limit the components in other aspects (e.g., importance or order). Terms, such as "first", "second", and the like, may be used herein to describe various components. Each of these terminologies is not used to define an essence, order or sequence of a corresponding component but used merely to distinguish the corresponding component from other component(s). For example, a "first" component may be referred to as a "second" component, and similarly, the "second" component may be referred to as the "first" component. "Or" as used herein may cover both "and" and "or."

It should be noted that if it is described that one component is "connected", "coupled", or "joined" to another component, at least a third component(s) may be "connected", "coupled", and "joined" between the first and second components, although the first component may be directly connected, coupled, or joined to the second component. Thus, terms such as "connected" and "coupled" cover both direct and indirectly connections and couplings.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or populations thereof.

The word "about" as used herein means the identified value plus/minus 5%.

"On" as used herein covers both directly on, and indirectly on with intervening element(s) therebetween. Thus, for example, if element A is stated to be "on" element B, this covers element A being directly and/or indirectly on element B. Likewise, "supported by" as used herein covers both in physical contact with, and indirectly supported by with intervening element(s) therebetween.

Each embodiment herein may be used in combination with any other embodiment(s) described herein.

While the disclosure has been illustrated and described with reference to various example embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in combination with any other embodiment(s) described herein.

The invention claimed is:

1. A vacuum insulating panel comprising:
a first substrate;
a second substrate;
a plurality of spacers provided in a gap between at least the first and second substrates, wherein the gap is at a pressure less than atmospheric pressure;
a seal provided at least partially between at least the first and second substrates, the seal comprising a first seal layer having a Te/V ratio of at least about 1.5:1 in terms of wt. % and comprising from about 20-80 wt. % tellurium oxide, and a second seal layer; and
wherein the first seal layer has a density of from about 2.8-4.0 g/cm$^3$, the second seal layer has a density of from about 3.0-4.2 g/cm$^3$, and wherein the density of the second seal layer is at least about 0.20 g/cm$^3$ greater than the density of the first seal layer.

2. The vacuum insulating panel of claim 1, wherein the density of the first seal layer is at least about 3.00 g/cm$^3$.

3. The vacuum insulating panel of claim 1, wherein the density of the first seal layer is from about 3.10-3.70 g/cm$^3$.

4. The vacuum insulating panel of claim 1, wherein the density of the first seal layer is at least about 3.20 g/cm$^3$.

5. The vacuum insulating panel of claim 1, wherein the density of the second seal layer is at least about 0.30 g/cm$^3$ greater than the density of the first seal layer.

6. The vacuum insulating panel of claim 1, wherein the density of the second seal layer is from about 3.3-4.0 g/cm$^3$.

7. The vacuum insulating panel of claim 1, wherein the density of the first seal layer is from about 3.15-3.40 g/cm$^3$ and the density of the second seal layer is from about 3.5-3.8 g/cm$^3$.

8. The vacuum insulating panel of claim 1, wherein the first and second seal layers comprise ceramic and are substantially lead-free.

9. The vacuum insulating panel of claim 1, wherein the tellurium oxide comprises TeO$_4$ and TeO$_3$, and wherein the first seal layer comprises more TeO$_3$ than TeO$_4$ by wt. %.

10. The vacuum insulating panel of claim 9, wherein from about 60-95% of the Te in the first seal layer is in a form of TeO$_3$.

11. The vacuum insulating panel of claim 9, wherein from about 70-90% of the Te in the first seal layer is in a form of TeO$_3$.

12. The vacuum insulating panel of claim 1, wherein the first seal layer comprises from about 40-70 wt. % tellurium oxide.

13. The vacuum insulating panel of claim 1, wherein the first seal layer further comprises from about 10-50 wt. % vanadium oxide, and wherein the first seal layer by wt. % comprises more tellurium oxide than vanadium oxide.

14. The vacuum insulating panel of claim 13, wherein the vanadium oxide comprises VO$_2$ and V$_2$O$_5$, and wherein the first seal layer comprises more VO$_2$ than V$_2$O$_5$.

15. The vacuum insulating panel of claim 14, wherein from about 50-75% of the V in the first seal layer is in a form of VO$_2$.

16. The vacuum insulating panel of claim 1, wherein the first seal layer further comprises from about 12-40 wt. % vanadium oxide and from about 3-30 wt. % aluminum oxide.

17. The vacuum insulating panel of claim 1, wherein the first seal layer is a main seal layer and the second seal layer is a primer layer.

18. The vacuum insulating panel of claim 1, wherein the second seal layer comprises bismuth oxide and/or boron oxide.

19. The vacuum insulating panel of claim 18, wherein the second seal layer comprises from about 1-40 mol % bismuth and from about 3-40 mol % boron on an elemental basis, and comprises at least two times more boron (B) than bismuth (Bi) on an elemental basis in terms of mol %.

20. The vacuum insulating panel of claim 1, wherein the first seal layer has an average particle size (D50) of from about 5-25 μm.

21. The vacuum insulating panel of claim 1, wherein the first seal layer has an average particle size (D50) of from about 5-20 μm.

22. The vacuum insulating panel of claim 1, wherein the first seal layer has an average particle size (D50) of from about 10-15 μm.

23. The vacuum insulating panel of claim 1, wherein a thickness of the first seal layer is at least about 30 μm thinner than a thickness of the second seal layer.

24. The vacuum insulating panel of claim 1, wherein, for at least one location of the seal, a width of the first seal layer is less than a width of the second seal layer by at least about 1 mm.

25. The vacuum insulating panel of claim 1, wherein the seal is an edge seal of the vacuum insulating panel.

26. The vacuum insulating panel of claim 1, wherein the first and second substrates comprise heat strengthened glass substrates.

27. The vacuum insulating panel of claim 1, wherein the first and second substrates comprise tempered glass substrates.

28. The vacuum insulating panel of claim 1, wherein the seal comprises a third seal layer, wherein the first seal layer is located between at least the second and third seal layers, and for at least one location of the seal the first seal layer has a first thickness, the second seal layer has a second thickness, and the third seal layer has a third thickness, wherein the first thickness is greater than the second thickness and less than the third thickness.

29. The vacuum insulating panel of claim 1, wherein the panel is configured for use in a window.

30. The vacuum insulating panel of claim 1, wherein the seal is a hermetic edge seal.

31. A vacuum insulating panel comprising:
a first substrate;
a second substrate;
at least one spacer provided in a gap between at least the first and second substrates, wherein the gap is at a pressure less than atmospheric pressure;
a seal provided at least partially between at least the first and second substrates, the seal comprising a first seal layer and a second seal layer;
wherein the first seal layer has a density of from about 2.8-4.0 g/cm$^3$, the second seal layer has a density of from about 3.0-4.2 g/cm$^3$, and wherein the density of the second seal layer is at least about 0.20 g/cm$^3$ greater than the density of the first seal layer; and
wherein the seal further comprises a third seal layer, wherein the first seal layer is located between at least the second and third seal layers; wherein for at least one location of the seal the first seal layer has a first thickness, the second seal layer has a second thickness, and the third seal layer has a third thickness, and wherein the first thickness is greater than the second thickness and less than the third thickness.

32. The vacuum insulating panel of claim 31, wherein the third seal layer is a primer layer and comprises bismuth oxide and/or boron oxide.

33. The vacuum insulating panel of claim 31, wherein the first seal layer comprises from about 20-80 wt. % tellurium oxide.

34. The vacuum insulating panel of claim 31, wherein the first seal layer comprises from about 20-80 wt. % tellurium oxide.

35. The vacuum insulating panel of claim 34, wherein the second seal layer comprises bismuth oxide and/or boron oxide.

36. The vacuum insulating panel of claim 31, wherein the density of the first seal layer is at least about 3.00 g/cm$^3$.

37. The vacuum insulating panel of claim 31, wherein the first seal layer comprises from about 40-70 wt. % tellurium oxide and from about 10-50 wt. % vanadium oxide, and wherein the first seal layer by wt. % comprises more tellurium oxide than vanadium oxide.

38. The vacuum insulating panel of claim 31, wherein the first seal layer comprises from about 20-80 wt. % tellurium oxide, from about 12-40 wt. % vanadium oxide, and from about 3-30 wt. % aluminum oxide, and wherein the second seal layer comprises bismuth oxide and/or boron oxide.

39. A vacuum insulating panel comprising:
a first substrate;
a second substrate;
at least one spacer provided in a gap between at least the first and second substrates, wherein the gap is at a pressure less than atmospheric pressure;
a seal provided at least partially between at least the first and second substrates, the seal comprising a first seal layer and a second seal layer;
wherein the first seal layer has a density of from about 2.8-4.0 g/cm$^3$, the second seal layer has a density of from about 3.0-4.2 g/cm$^3$, and wherein the density of the second seal layer is at least about 0.20 g/cm$^3$ greater than the density of the first seal layer; and
wherein, for at least one location of the seal, an outer lateral edge of the first seal layer is spaced inwardly from an outer lateral edge of the second seal layer by an offset distance of at least about 0.5 mm.

40. The vacuum insulating panel of claim 39, wherein the first seal layer comprises from about 20-80 wt. % tellurium oxide.

41. The vacuum insulating panel of claim 40, wherein the second seal layer comprises bismuth oxide and/or boron oxide.

42. The vacuum insulating panel of claim 39, wherein the density of the first seal layer is at least about 3.00 g/cm$^3$.

43. The vacuum insulating panel of claim 39, wherein the first seal layer comprises from about 40-70 wt. % tellurium oxide and from about 10-50 wt. % vanadium oxide, and wherein the first seal layer by wt. % comprises more tellurium oxide than vanadium oxide.

44. The vacuum insulating panel of claim 39, wherein the first seal layer comprises from about 20-80 wt. % tellurium oxide, from about 12-40 wt. % vanadium oxide, and from about 3-30 wt. % aluminum oxide.

45. A vacuum insulating panel comprising:
a first substrate;
a second substrate;
a plurality of spacers provided in a gap between at least the first and second substrates, wherein the gap is at a pressure less than atmospheric pressure;
a seal provided between at least the first and second substrates, the seal comprising a first ceramic seal layer, a second ceramic seal layer, and a third ceramic seal layer, and wherein the seal is substantially lead-free;

wherein the first seal layer has a density of from about 2.9-3.9 g/cm³, the second seal layer has a density of from about 3.0-4.2 g/cm³, and the third seal layer has a density of from about 3.0-4.2 g/cm³, and wherein the density of the second seal layer is at least about 0.20 g/cm³ greater than the density of the first seal layer;

wherein, for at least one location of the seal, the first seal layer has a first thickness, the second seal layer has a second thickness, and the third seal layer has a third thickness; and wherein the first thickness is greater than the second thickness and less than the third thickness.

46. The vacuum insulating panel of claim 45, wherein the first seal layer comprises from about 20-80 wt. % tellurium oxide.

47. The vacuum insulating panel of claim 46, wherein the second seal layer comprises bismuth oxide and/or boron oxide.

48. The vacuum insulating panel of claim 45, wherein the density of the first seal layer is at least about 3.00 g/cm³.

49. The vacuum insulating panel of claim 45, wherein the first seal layer comprises from about 40-70 wt. % tellurium oxide and from about 10-50 wt. % vanadium oxide, and wherein the first seal layer by wt. % comprises more tellurium oxide than vanadium oxide.

50. A vacuum insulating panel comprising:
  a first substrate;
  a second substrate;
  a plurality of spacers provided in a gap between at least the first and second substrates, wherein the gap is at a pressure less than atmospheric pressure;
  a seal provided at least partially between at least the first and second substrates, the seal comprising a first seal layer comprising at least 45 wt. % tellurium oxide and a second seal layer; and
  wherein the first seal layer has a density of from about 2.8-4.0 g/cm³, the second seal layer has a density of from about 3.0-4.2 g/cm³, and wherein the density of the second seal layer is at least about 0.20 g/cm³ greater than the density of the first seal layer.

* * * * *